(12) United States Patent
Bortz et al.

(10) Patent No.: US 9,853,740 B1
(45) Date of Patent: *Dec. 26, 2017

(54) ADAPTIVE COMMUNICATIONS FOCAL PLANE ARRAY

(71) Applicant: SUREFIRE LLC, Fountain Valley, CA (US)

(72) Inventors: John C. Bortz, Fountain Valley, CA (US); Narkis Shatz, Fountain Valley, CA (US)

(73) Assignee: SUREFIRE LLC, Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,826

(22) Filed: Jun. 6, 2017

Related U.S. Application Data

(63) Continuation of application No. 15/615,819, filed on Jun. 6, 2017.

(51) Int. Cl.
  *H04B 10/08* (2006.01)
  *H04B 10/00* (2013.01)
  (Continued)

(52) U.S. Cl.
  CPC .............. *H04B 10/691* (2013.01); *G02F 1/31* (2013.01); *H04B 1/60* (2013.01);
  (Continued)

(58) Field of Classification Search
  CPC ........................ H04B 10/691; H04B 10/07953; H04B 10/11; G02F 1/31; G11B 7/06; G11B 7/094; H04J 14/0221; H04J 14/0204
  (Continued)

(56) References Cited

U.S. PATENT DOCUMENTS

| | | |
|---|---|---|
| 3,761,184 A | 9/1973 | McLaughlin, Jr. |
| 3,987,297 A | 10/1976 | Brienza |

(Continued)

FOREIGN PATENT DOCUMENTS

| | | |
|---|---|---|
| GB | 2499693 | 8/2013 |
| WO | 2000004660 | 8/2001 |

(Continued)

OTHER PUBLICATIONS

AleksandarJovicic,PrincipalEngineerQualcom-mFlarionTechnologies,"Qualcomm® Lumicas™: Ahighaccuracyindoorpositioningsystembasedonvisiblelightcommunication",Apr. 2016.

(Continued)

*Primary Examiner* — Ken N Vanderpuye
*Assistant Examiner* — Abbas H Alagheband
(74) *Attorney, Agent, or Firm* — Sheppard Mullin; Daniel Yannuzzi; Hector Agdeppa

(57) ABSTRACT

Adaptive communications focal plane arrays that may be implemented in, e.g., a specially-configured camera that can be utilized to receive and/or process information in the form of optical beams are presented. A specialized focal plane array (FPA) having a plurality of optical detectors is utilized, where one or more optical detectors are suppressed such that data is not allowed to be output from the one or more suppressed optical detectors, and only a significantly smaller number or subset of optical detectors receiving optical beams are allowed to output data. In this way, the rate at which data is to be output by an adaptive communications FPA (ACFPA) can be significantly reduced.

24 Claims, 18 Drawing Sheets

(51) Int. Cl.
*H04B 10/69* (2013.01)
*H04B 10/079* (2013.01)
*H04B 10/11* (2013.01)
*G02F 1/31* (2006.01)
*H04B 1/60* (2006.01)
*H04B 10/116* (2013.01)

(52) U.S. Cl.
CPC ....... *H04B 10/07953* (2013.01); *H04B 10/11* (2013.01); *H04B 10/116* (2013.01)

(58) Field of Classification Search
USPC .......................................................... 398/26
See application file for complete search history.

(56) References Cited

U.S. PATENT DOCUMENTS

| | | | |
|---|---|---|---|
| 4,114,592 A | 9/1978 | Winston | |
| 4,600,843 A | 7/1986 | Kizu | |
| 5,005,040 A * | 4/1991 | Norita | G02B 7/346 |
| | | | 250/201.2 |
| 5,029,195 A | 7/1991 | Danos | |
| 5,359,446 A | 10/1994 | Johnson | |
| 5,475,253 A | 12/1995 | Look | |
| 5,475,523 A | 12/1995 | Shinada | |
| 5,566,022 A | 10/1996 | Segev | |
| 5,596,452 A | 1/1997 | Yamakawa | |
| 5,598,281 A | 1/1997 | Zimmerman | |
| 5,604,630 A | 2/1997 | Palmer | |
| 5,610,753 A | 3/1997 | Kessler | |
| 5,717,510 A * | 2/1998 | Ishikawa | H04B 10/0795 |
| | | | 398/147 |
| 5,777,768 A | 7/1998 | Korevaar | |
| 5,778,256 A | 7/1998 | Darbee | |
| 5,835,199 A * | 11/1998 | Phillips | G01S 7/4802 |
| | | | 356/28.5 |
| 5,894,195 A | 4/1999 | McDermott | |
| 5,896,217 A * | 4/1999 | Ishikawa | H04L 7/0037 |
| | | | 398/1 |
| 5,947,587 A | 9/1999 | Keuper | |
| 5,999,294 A | 12/1999 | Petsko | |
| 6,019,493 A | 2/2000 | Kuo | |
| 6,065,880 A | 5/2000 | Thompson | |
| 6,104,513 A | 8/2000 | Bloom | |
| 6,122,084 A | 9/2000 | Britz | |
| 6,229,631 B1 * | 5/2001 | Sato | H04B 10/0775 |
| | | | 398/147 |
| 6,260,763 B1 | 7/2001 | Svetal | |
| 6,292,283 B1 | 9/2001 | Grandbois | |
| 6,324,013 B1 | 11/2001 | Nakai | |
| 6,381,055 B1 | 4/2002 | Javitt | |
| 6,410,942 B1 | 6/2002 | Thibeault | |
| 6,501,581 B1 | 12/2002 | Snyder | |
| 6,504,632 B1 | 1/2003 | Watanabe | |
| 6,529,329 B2 | 3/2003 | Dang | |
| 6,559,993 B2 | 5/2003 | Doucet | |
| 6,560,038 B1 | 5/2003 | Parkyn | |
| 6,568,627 B1 | 5/2003 | Jones | |
| 6,594,090 B2 | 7/2003 | Kruschwitz | |
| 6,643,068 B2 | 11/2003 | Mandella | |
| 6,653,551 B2 | 11/2003 | Chen | |
| 6,657,790 B2 | 12/2003 | Kim | |
| 6,822,634 B1 | 11/2004 | Kemp | |
| 6,829,439 B1 | 12/2004 | Sidorovich | |
| 6,859,326 B2 | 2/2005 | Sales | |
| 6,868,237 B2 | 3/2005 | Willebrand | |
| 6,910,780 B2 | 6/2005 | Vail | |
| 7,021,797 B2 | 4/2006 | Miñano | |
| 7,035,546 B2 | 4/2006 | Keller | |
| 7,058,316 B2 | 6/2006 | Vilnrotter | |
| 7,079,774 B2 | 7/2006 | Sidorovich | |
| 7,099,649 B2 | 8/2006 | Patterson | |
| 7,106,973 B2 | 9/2006 | Kube | |
| 7,116,661 B2 | 10/2006 | Patton | |
| 7,120,363 B2 | 10/2006 | Andreu-vonEuw | |
| 7,130,505 B2 * | 10/2006 | Shen | G02B 6/12019 |
| | | | 385/24 |
| 7,170,600 B2 | 1/2007 | Nishii | |
| 7,186,004 B2 | 3/2007 | Powell | |
| 7,203,424 B2 | 4/2007 | Alwan | |
| 7,221,910 B2 | 5/2007 | Ishii | |
| 7,223,315 B2 | 5/2007 | Chen | |
| 7,245,798 B2 | 7/2007 | Graves | |
| 7,308,194 B2 | 12/2007 | Iizuka | |
| 7,319,822 B2 | 1/2008 | Lo | |
| 7,324,271 B2 | 1/2008 | Winterot | |
| 7,375,804 B2 | 5/2008 | Liebman | |
| 7,382,103 B2 | 6/2008 | Shirazee | |
| 7,390,129 B2 | 6/2008 | Yonekubo | |
| 7,401,948 B2 | 7/2008 | Chinniah | |
| 7,450,857 B2 * | 11/2008 | Dress | G06E 3/006 |
| | | | 398/164 |
| 7,480,101 B2 | 1/2009 | Lubart | |
| 7,495,837 B2 | 2/2009 | Smith | |
| 7,508,588 B2 | 3/2009 | Nakajima | |
| 7,538,879 B2 | 5/2009 | Power | |
| 7,554,076 B2 | 6/2009 | Wang | |
| 7,583,901 B2 | 9/2009 | Nakagawa | |
| 7,587,141 B2 | 9/2009 | Fisher | |
| 7,630,648 B2 * | 12/2009 | Dress | G06E 3/006 |
| | | | 398/164 |
| 7,639,948 B2 | 12/2009 | Gilbert | |
| 7,657,182 B2 | 2/2010 | Hase | |
| 7,663,501 B2 | 2/2010 | Hyun | |
| 7,699,229 B2 | 4/2010 | Bennett | |
| 7,715,723 B2 | 5/2010 | Kagawa | |
| 7,734,181 B2 | 6/2010 | Bahar | |
| 7,800,541 B2 | 9/2010 | Moshfeghi | |
| 7,806,547 B2 | 10/2010 | Benitez | |
| 7,810,963 B2 | 10/2010 | Peck | |
| 7,883,226 B2 | 2/2011 | Li | |
| 7,884,931 B2 | 2/2011 | Achal | |
| 7,885,547 B2 | 2/2011 | Nakaso | |
| 7,889,998 B2 | 2/2011 | Son | |
| 7,907,345 B2 | 3/2011 | Paulussen | |
| 7,918,583 B2 | 4/2011 | Chakmakjian | |
| 7,953,326 B2 | 5/2011 | Farr | |
| 7,970,279 B2 * | 6/2011 | Dress | G06E 3/006 |
| | | | 398/168 |
| 8,000,018 B2 | 8/2011 | Benitez | |
| 8,029,167 B2 | 10/2011 | Ikeda | |
| 8,031,414 B1 | 10/2011 | Liu | |
| 8,032,016 B1 | 10/2011 | Duling | |
| 8,036,244 B2 | 10/2011 | Naoe | |
| 8,075,147 B2 | 12/2011 | Chaves | |
| 8,081,876 B2 * | 12/2011 | Dress | G06E 3/006 |
| | | | 398/164 |
| 8,103,167 B2 | 1/2012 | Tidhar | |
| 8,148,663 B2 | 4/2012 | Adams | |
| 8,152,327 B2 | 4/2012 | Brands | |
| 8,204,383 B2 | 6/2012 | Shin | |
| 8,246,210 B2 | 8/2012 | Angelini | |
| 8,269,971 B1 | 9/2012 | Marsh | |
| 8,304,733 B2 | 11/2012 | Alameh | |
| 8,406,427 B2 * | 3/2013 | Chand | H04K 3/25 |
| | | | 380/255 |
| 8,417,058 B2 | 4/2013 | Tardif | |
| 8,422,119 B1 | 4/2013 | Keaton | |
| 8,452,182 B2 | 5/2013 | Davidson | |
| 8,488,244 B1 | 7/2013 | Li | |
| 8,526,403 B1 | 9/2013 | Nadji | |
| 8,582,973 B2 | 11/2013 | Takahashi | |
| 8,593,647 B2 | 11/2013 | Charny | |
| 8,611,754 B2 | 12/2013 | Templ | |
| 8,639,106 B1 | 1/2014 | Gleason | |
| 8,687,965 B2 | 4/2014 | Pederson | |
| 8,706,815 B2 | 4/2014 | Redmond | |
| 8,780,446 B2 | 7/2014 | Lee | |
| 8,805,192 B2 | 8/2014 | Eide | |
| 8,829,392 B2 | 9/2014 | Adams | |
| 8,831,427 B2 * | 9/2014 | Grubor | H04B 10/1143 |
| | | | 398/115 |
| 8,848,059 B2 | 9/2014 | Tiscareno | |

(56) References Cited

U.S. PATENT DOCUMENTS

| | | |
|---|---|---|
| 8,908,074 B2 | 12/2014 | Oshima |
| 8,922,666 B2 | 12/2014 | Oshima |
| 8,923,701 B2 | 12/2014 | D'Errico |
| 8,948,601 B2 | 2/2015 | Shar |
| 8,965,214 B2 | 2/2015 | Weckwerth |
| 8,965,215 B2 | 2/2015 | Na |
| 9,022,601 B2 | 5/2015 | Lu |
| 9,066,084 B2 | 6/2015 | Zalevsky |
| 9,066,087 B2 | 6/2015 | Shpunt |
| 9,118,420 B2 | 8/2015 | Kwon |
| 9,134,538 B1 | 9/2015 | Augst |
| 9,143,232 B2 | 9/2015 | Bhide |
| 9,146,103 B2 | 9/2015 | Rousseau |
| 9,166,683 B2 | 10/2015 | Jovicic |
| 9,167,138 B2 | 10/2015 | Shpunt |
| 9,203,524 B2 * | 12/2015 | Simpson ............... H04B 13/02 |
| 9,210,376 B2 | 12/2015 | Yu |
| 9,215,032 B2 | 12/2015 | Zhang |
| 9,225,427 B2 | 12/2015 | Jung |
| 9,250,355 B2 | 2/2016 | Deng |
| 9,252,875 B2 | 2/2016 | Bae |
| 9,264,136 B2 | 2/2016 | Vaananen |
| 9,300,398 B2 | 3/2016 | Chaffee |
| 9,317,747 B2 | 4/2016 | Jovicic |
| 9,350,448 B2 | 5/2016 | Byers |
| 9,360,185 B2 | 6/2016 | Demuynck |
| 9,360,554 B2 | 6/2016 | Retterath |
| 9,386,666 B2 | 7/2016 | Economy |
| 9,401,121 B2 | 7/2016 | Chen |
| 9,420,264 B2 | 8/2016 | Gilliland |
| 9,438,337 B2 | 9/2016 | Byers |
| 9,453,976 B2 | 9/2016 | Qian |
| 9,509,402 B2 | 11/2016 | Ryan |
| 9,520,939 B2 | 12/2016 | Jovicic |
| 9,551,914 B2 | 1/2017 | Pellman |
| 9,601,670 B2 | 3/2017 | Bhat |
| 9,654,222 B1 | 5/2017 | Shatz |
| 9,657,918 B2 | 5/2017 | Wilcox |
| 9,742,520 B1 * | 8/2017 | Way ................... H04J 14/0221 |
| 2002/0089726 A1 | 7/2002 | He |
| 2002/0109884 A1 | 8/2002 | Presley |
| 2002/0118344 A1 | 8/2002 | Fischer |
| 2002/0149822 A1 | 10/2002 | Stroud |
| 2002/0163699 A1 | 11/2002 | Kavehrad |
| 2003/0026002 A1 | 2/2003 | Lopez-Hernandez |
| 2003/0076034 A1 | 4/2003 | Marshall |
| 2003/0090765 A1 | 5/2003 | Neff |
| 2003/0151818 A1 | 8/2003 | Wagner |
| 2004/0135935 A1 | 7/2004 | Glaeser |
| 2004/0141753 A1 | 7/2004 | Andreu-von Euw |
| 2004/0156640 A1 * | 8/2004 | Dress ................... G06E 3/006 398/140 |
| 2004/0161246 A1 | 8/2004 | Matsushita |
| 2004/0208602 A1 | 10/2004 | Plante |
| 2004/0252520 A1 | 12/2004 | Martineau |
| 2004/0258414 A1 | 12/2004 | Lee |
| 2004/0263500 A1 | 12/2004 | Sakata |
| 2005/0169643 A1 | 8/2005 | Franklin |
| 2005/0226636 A1 | 10/2005 | Hiramatsu |
| 2006/0018661 A1 | 1/2006 | Green |
| 2006/0076473 A1 | 4/2006 | Wilcken |
| 2006/0153498 A1 * | 7/2006 | Shen ................... G02B 6/12019 385/24 |
| 2006/0222041 A1 | 10/2006 | Moriwaka |
| 2006/0285852 A1 * | 12/2006 | Xi ................... H04L 25/03171 398/141 |
| 2007/0070060 A1 | 3/2007 | Kagawa |
| 2007/0070834 A1 * | 3/2007 | Masui ................... G11B 7/09 369/44.11 |
| 2007/0127926 A1 | 6/2007 | Marioni |
| 2007/0133097 A1 | 6/2007 | Lubart |
| 2007/0147843 A1 | 6/2007 | Fujiwara |
| 2007/0206952 A1 | 9/2007 | Hase |
| 2007/0253716 A1 | 11/2007 | Nakaso |
| 2007/0263298 A1 | 11/2007 | El-Ghoroury |
| 2008/0008471 A1 * | 1/2008 | Dress ................... G06E 3/006 398/66 |
| 2008/0008472 A1 | 1/2008 | Dress |
| 2008/0043466 A1 | 2/2008 | Chakmakjian |
| 2008/0074752 A1 | 3/2008 | Chaves |
| 2008/0095533 A1 | 4/2008 | Lee |
| 2008/0107419 A1 | 5/2008 | Won |
| 2008/0123062 A1 | 5/2008 | Morikuni |
| 2008/0124083 A1 | 5/2008 | Esser et al. |
| 2008/0131134 A1 | 6/2008 | Dreischer |
| 2008/0138077 A1 | 6/2008 | Stretton |
| 2008/0170296 A1 | 7/2008 | Chaves |
| 2008/0218850 A1 | 9/2008 | Power |
| 2008/0240722 A1 | 10/2008 | Karaki |
| 2008/0262718 A1 | 10/2008 | Farwell |
| 2009/0028564 A1 | 1/2009 | Villarruel |
| 2009/0041459 A1 * | 2/2009 | Dress ................... G06E 3/006 398/66 |
| 2009/0103925 A1 | 4/2009 | Alpert |
| 2009/0128921 A1 | 5/2009 | Roth |
| 2009/0244716 A1 | 10/2009 | Mathai |
| 2010/0003029 A1 * | 1/2010 | Dress ................... G06E 3/006 398/66 |
| 2010/0091134 A1 * | 4/2010 | Cooke ................... H04N 5/232 348/229.1 |
| 2010/0096993 A1 | 4/2010 | Ashdown |
| 2010/0097002 A1 | 4/2010 | Shatford |
| 2010/0157434 A1 | 6/2010 | Lee |
| 2010/0188753 A1 | 7/2010 | Paulussen |
| 2010/0257569 A1 | 10/2010 | O'Hanlon |
| 2011/0026931 A1 | 2/2011 | Koizumi |
| 2011/0157566 A1 | 6/2011 | Akiyama |
| 2011/0267823 A1 | 11/2011 | Angelini |
| 2011/0270585 A1 | 11/2011 | Chen |
| 2012/0060177 A1 | 3/2012 | Stinson |
| 2012/0068913 A1 | 3/2012 | Bar-Zeev |
| 2012/0098934 A1 | 4/2012 | McKiel |
| 2012/0098945 A1 | 4/2012 | McKiel |
| 2012/0106200 A1 | 5/2012 | Yin |
| 2012/0148189 A1 | 6/2012 | Zhang |
| 2012/0287511 A1 | 11/2012 | Dross |
| 2013/0004173 A1 | 1/2013 | Maricevic |
| 2013/0061259 A1 | 3/2013 | Raman |
| 2013/0126713 A1 * | 5/2013 | Haas ................... H04B 10/116 250/208.2 |
| 2013/0216063 A1 | 8/2013 | Sherman |
| 2013/0236183 A1 | 9/2013 | Chao |
| 2013/0258216 A1 | 10/2013 | Shiue |
| 2013/0315604 A1 * | 11/2013 | LoPresti ............ H04B 10/1123 398/116 |
| 2013/0330088 A1 | 12/2013 | Oshima |
| 2014/0029494 A1 | 1/2014 | Sundaram |
| 2014/0037294 A1 | 2/2014 | Cox |
| 2014/0072119 A1 | 3/2014 | Hranilovic |
| 2014/0169796 A1 | 6/2014 | Sasaki |
| 2014/0198206 A1 | 7/2014 | Murray |
| 2014/0201400 A1 | 7/2014 | Beel |
| 2014/0225916 A1 | 8/2014 | Theimer |
| 2014/0226977 A1 | 8/2014 | Jovicic |
| 2014/0273834 A1 | 9/2014 | Merckling |
| 2014/0274150 A1 | 9/2014 | Marti |
| 2014/0301735 A1 | 10/2014 | Okada |
| 2014/0306866 A1 | 10/2014 | Miller |
| 2014/0340487 A1 * | 11/2014 | Gilliland ............... G01S 7/4863 348/48 |
| 2014/0355057 A1 | 12/2014 | Jang |
| 2014/0363168 A1 | 12/2014 | Walker |
| 2014/0368533 A1 | 12/2014 | Salter |
| 2015/0012249 A1 * | 1/2015 | Li ................... G01R 29/26 702/191 |
| 2015/0037040 A1 | 2/2015 | Lyn-Shue |
| 2015/0156568 A1 | 6/2015 | Byers |
| 2015/0177526 A1 | 6/2015 | Zhang |
| 2015/0185492 A1 | 7/2015 | Nagano |
| 2015/0188631 A1 | 7/2015 | Harbers |
| 2015/0215040 A1 | 7/2015 | Dickson |
| 2015/0244624 A1 * | 8/2015 | Asiano ................... H04L 47/12 370/235 |

(56) References Cited

U.S. PATENT DOCUMENTS

| | | | |
|---|---|---|---|
| 2015/0293228 A1 | 10/2015 | Retterath | |
| 2015/0332500 A1 | 11/2015 | France | |
| 2015/0339855 A1 | 11/2015 | Diaz | |
| 2015/0349881 A1* | 12/2015 | Byers | H04B 10/11 398/38 |
| 2015/0349892 A1 | 12/2015 | Fischer | |
| 2015/0358079 A1 | 12/2015 | Cronin | |
| 2016/0020855 A1* | 1/2016 | Guetta | H04B 10/116 398/130 |
| 2016/0021354 A1 | 1/2016 | Lan | |
| 2016/0025994 A1 | 1/2016 | Shagam | |
| 2016/0029160 A1 | 1/2016 | Theurer | |
| 2016/0033386 A1 | 2/2016 | Reed | |
| 2016/0041359 A1 | 2/2016 | Gaskin | |
| 2016/0047890 A1* | 2/2016 | Ryan | G01S 5/16 398/118 |
| 2016/0072580 A1 | 3/2016 | Wabnig | |
| 2016/0080077 A1 | 3/2016 | Joseph | |
| 2016/0087676 A1* | 3/2016 | Tanaka | H04B 3/32 398/193 |
| 2016/0087724 A1 | 3/2016 | Liu | |
| 2016/0088511 A1 | 3/2016 | Nguyen | |
| 2016/0112878 A1 | 4/2016 | Kaushik | |
| 2016/0127040 A1 | 5/2016 | Vaananen | |
| 2016/0131843 A1 | 5/2016 | Amit | |
| 2016/0164261 A1 | 6/2016 | Warren | |
| 2016/0165325 A1 | 6/2016 | Coleman | |
| 2016/0231521 A1 | 8/2016 | Smith | |
| 2016/0259038 A1 | 9/2016 | Retterath | |
| 2016/0277140 A1 | 9/2016 | Wu | |
| 2016/0294472 A1* | 10/2016 | Palmer | H04B 10/116 |
| 2016/0334510 A1 | 11/2016 | Tidwell | |
| 2016/0342297 A1 | 11/2016 | Ellwood | |
| 2016/0359563 A1 | 12/2016 | Harbers | |
| 2017/0017947 A1 | 1/2017 | Robinton | |
| 2017/0017955 A1 | 1/2017 | Stern | |
| 2017/0090047 A1* | 3/2017 | Shahar | G01T 1/247 |
| 2017/0168250 A1 | 6/2017 | Zhang | |
| 2017/0193300 A1 | 7/2017 | Shatz | |
| 2017/0195044 A1 | 7/2017 | Shatz | |
| 2017/0195045 A1 | 7/2017 | Shatz | |
| 2017/0195049 A1 | 7/2017 | Shatz | |
| 2017/0195050 A1 | 7/2017 | Shatz | |
| 2017/0195554 A1 | 7/2017 | Shatz | |
| 2017/0195644 A1 | 7/2017 | Shatz | |
| 2017/0230118 A1 | 8/2017 | Shatz | |
| 2017/0244484 A1 | 8/2017 | Shatz | |

FOREIGN PATENT DOCUMENTS

| | | |
|---|---|---|
| WO | 2002056507 | 7/2002 |
| WO | 2005055436 | 6/2005 |
| WO | 2014015353 | 1/2014 |
| WO | 2015086668 | 6/2015 |
| WO | 2015086671 | 6/2015 |
| WO | 2015168842 | 11/2015 |
| WO | 2015188948 | 12/2015 |
| WO | 2016028226 | 2/2016 |
| WO | 2015049180 | 4/2016 |
| WO | 2016086276 | 6/2016 |
| WO | 2016154470 | 9/2016 |

OTHER PUBLICATIONS

AliMansour,RaedMesleh,andMohamedAbaza,"Newchallengesinwirelessandfreespaceopticalcommunications", May 12, 2016.
AlvinAbrahamandJintuKJoseph,"Short-DistanceOpticalWirelessCommunication," M.tech,2015.
Chao Wang, Minglun Zhang, Hetian Zhu, Xujing Guo, Xiangwen Zhai and Xiaonan Bai, "Visible Light Communication Application Scenarios Based on Android Smart Devices' LED Lamp", 14th Int. Conf. on ICOCN, Jul. 2015.
DevendraJ. VaranvaandKantipudiMVVPrasad,"LEDtoLEDcommunicationwithWDMconceptforflashlightofMobilephones", IJACSAvol. 4,No. 7,2013.
GiorgioCorbellini,KaanAksit,StefanSchmid, StefanMangoldandThomasGross,"ConnectingNetworksofToysandSmartphoneswithVisibleLightCommunication", IEEECommunicationsMagazineJul. 2014.
HemaniKaushalandGeorgesKaddoum,"FreeSpaceOpticalCommunication:ChallengesandMitigationTechniques," Jun. 16, 2015.
JeffreyB.CarruthersandJosephM. Kahn,"AngleDiversityforNondirectedWirelessInfraredCommunication", IEEETransactionsonCommunications,vol. 48,No. 6,Jun. 6, 2000.
JLatal,AVanderka,PKoudelka,andMLucki,"Softwaredesignofsegmentopticaltransmitterforindoorfree-spaceopticalnetworks," 2015.
MariamM.Galal,AhmedA.AbdElAziz,HebaA. Fayed,andMoustafaHAly,"Smartphonepaymentviaflashlight: Utilizingthebuilt-inflashlightofsmartphonesasreplacementformagnetic-cards,"OpticIJLEO,Nov. 2015.
PekkaKamsula,"DesignandImplementationotaBi-directionalVisibleLightCommunicationTestBed,"Univ. ofOulu,2015.
RayanaBoubezari,HoaLeMinh,ZabihGhassemlooy,AhmedBouridane,"Noveldetectiontechniqueforsmartphonetosmartphonevisiblelightcommunications,"10thInt. SymposiumonCSNDSP,2016.
RayanaBoubezari,HoaLeMinh,ZabihGhassemlooy, AhmedBouridane,"Smartphonecamerabasedvisiblelightcommunication,"JournalofLightwaveTechnology,vol. 34, No.17,Sep. 1, 2016.
ShuchitaChaudhary,"ObticalWirelessCommunication:AFuturePersbectiveforNextGenerationWireless-Systems",IJSER, vol. 3,ISS.9,Sep. 2012.
StefanSchmid,GiorgioCorbellini,StefanMangold,andThomasR. Gross,"AnLED-to-LEDVisibleLightCommunicationSystemwithSoftware-BasedSynchronization",2012.
StefanSchmid,GiorgioCorbellini,StefanMangoldandThomasGross, "ContinuousSynchronizationforLED-to-LEDVisibleLightCommunication-Networks"InternationalWorkshoponOpticalWireless(IWOW)2014.
StefanSchmid,GiorgioCorbellini,StefanMangoldandThomasGross,"EnLighting: AnIndoorVisibleLightCommunicationSystemBasedon-NetworkedLightBulbs",InternationalConferenceonSensing, CommunicationandNetworking(SECON)2016.
V. Jungnickeletal"AEuropeanViewonthe-NextGenerationOpticalWirelessCommunicationStandard, "2015IEEEConference, Oct. 2015.
Aleksandar Jovicic, Principal Engineer Qualcomm Harlon Technologies, "Qualcomm® Lumicast™: A high accuracy indoor positioning system based on visible light communication", Apr. 2016.
Ali Mansour, Raed Mesleh, and Mohamed Abaza, "New challenges in wireless and free space optical aommunications", May 12, 2016.
Alvin Abraham and Jintu K Joseph, "Short Distance Optical Wireless Communication," M. tech, 2015.
Devendra J. Varanva and Kantipudi MVV Prasad, "LED to LED communication with WDM concept for flashlight of Mobilephones", IJACSA vol. 4, No. 7, 2013.
Giorgio Corbellini, Kaan Aksit, Stefan Schmid, Stefan Mangold and Thomas Gross, "Connecting Networks of Toys and Smartphones with Visible Light Communication", IEEE Communications Magazine Jul. 2014.
Hemani Kaushal and Georges Kaddoum, "Free Space Optical Communication: Challenges and Mitigation Techniques," Jun. 16, 2015.
Hemani Kaushal and Georges Kaddoum, "Free Space Optical Communication: Challenges andMitigation Techniques," May 16, 2015.
MariamM.Galal,AhmedA. AbdElAziz,HebakFayed,andMoustafaHAly,"Smartphonepayment-viaflashlight: Utilizingthebuilt-inflashlightofsmartphonesasreplacementformagnetic-cards,"OpticIJLEO,Nov. 2015.
Pekka Kamsula, "Design and Implementation of a Bi-directional Visible Light Communication Test Bed," Univ. of Oulu, 2015.

(56) References Cited

OTHER PUBLICATIONS

Rayana Boubezari, Hoa Le Minh, Zabih Ghassemlooy, Ahmed Bouridane, "Novel detection technique for smartphone to-smartphone visible light communications," 10th Int. Symposium on CSNDSP, 2016.

Rayana Boubezari, Hoa Le Minh, Zabih Ghassemlooy, Ahmed Bouridane, "Smartphone camera based visible light communication," Journal of Lightwave Technology, vol. 34, No. 17, Sep. 1, 2016.

Shuchita Chaudhary, "Optical Wireless Communication: A Future Perspective for Next Generation Wireless-Systems", IJSER, vol. 3, ISS.9, Sep. 2012.

Stefan Schmid, Giorgio Corbellini, Stefan Mangold, and Thomas R. Gross, "An LED-to-LED Visible Light Communication System with Software-Based Synchronization", 2012.

Stefan Schmid, Giorgio Corbellini, Stefan Mangold and Thomas Gross, "Continuous Synchronization for LED-to-LED Visible Light Communication Networks" International Workshop on Optical Wireless (IWOW) 2014.

Stefan Schmid, Giorgio Corbellini, Stefan Mangold and Thomas Gross, "EnLighting: An Indoor Visible Light Communication System Based on Networked Light Bulbs", International Conference on Sensing, Communication and Networking (SECON) 2016.

V. Jungnickel et al., "A European View on the Next-Generation Optical Wireless Communication Standard," 2015 IEEE-Conference, Oct. 2015.

* cited by examiner

ADAPTIVE COMMUNICATIONS FOCAL PLANE ARRAY

TECHNICAL FIELD

The present disclosure relates generally to wireless optical communications. Some embodiments relate to systems and methods for optical narrowcasting.

DESCRIPTION OF THE RELATED ART

Generally, mobile communications systems, both long and short-range, are based on the transmission and/or receipt of radio waves (e.g., cellular networks, WiFi networks, Bluetooth® communications, Near-Field Communications (NFC), etc.). Services, such as location-based services, may oftentimes also rely on radio-wave-based communications (e.g., Global Positioning System (GPS) positioning, WiFi triangulation, etc.).

BRIEF SUMMARY OF THE DISCLOSURE

In some embodiments, a multi-channel adaptive communications focal plane array comprises: a plurality of optical detectors, a subset of which receive one or more optical beams transmitted by one or more optical transmitter assemblies; and a plurality of signal discrimination circuits, each of which is operatively connected to a corresponding one of the plurality of optical detectors. In some embodiments, the plurality of signal discrimination circuits can perform the following: detect the presence of an optical beam that is currently being received by its corresponding optical detector; compute an estimated signal-to-noise ratio associated with an optical beam it has detected; and set the value of the estimated signal-to-noise ratio to a set value when it has not detected the presence of the optical beam.

The multi-channel adaptive communications focal plane array may further comprise a plurality of switching circuits, each of which is operatively connected to a corresponding one of the plurality of optical detectors and a corresponding one of the plurality of signal discrimination circuits. Each of the plurality of switching circuits may comprise two or more analog output ports where each analog output port corresponds to a different channel of the multi-channel adaptive communications focal-plane array. Each of the plurality of switching circuits may perform the following: control a flow of information being received in the form of an optical beam by either suppressing the flow completely or by outputting the flow to any one of the two or more analog output ports; output a location relative to the other detectors indicative of the corresponding optical detector receiving the optical beam; and output the estimated signal-to-noise ratio provided by its corresponding signal discrimination circuit.

Further still, the multi-channel adaptive communications focal plane array may further comprise an analog output detector operatively connected to a first of the two or more analog output ports of each of the plurality of switching circuits. The analog output detector can inform each of the plurality of switching circuits whether or not information being received by an optical detector from an optical beam is currently being output via the first of the two or more analog output ports of any one of the plurality of switching circuits.

In some embodiments, the plurality of optical detectors are configured in a two-dimensional array. Each of the plurality of signal discrimination circuits may distinguish between a single optical beam being received by the corresponding optical detector and two or more optical beams simultaneously being received by the corresponding optical detector. In some embodiments, each of the plurality of signal discrimination circuits outputs an indicator representative of an invalid condition upon a determination that two or more optical beams are simultaneously being received by the corresponding optical detector.

Each of the plurality of switching circuits may receive a command initializing an optical beacon receiver mode, and wherein the optical beam comprises an optical beacon. In some embodiments, the command causes each of the plurality of switching circuits to be disabled, or to remain disabled if one or more of the plurality of switching circuits is already disabled, such that a disabled switching circuit suppresses an output of an electrical signal being produced by its corresponding optical detector, preventing the electrical signal from contributing to the flow of information being output by any output channels of the multi-channel adaptive communications focal plane array.

In some embodiments, one of the plurality of switching circuits becomes enabled for output via its first analog output port when both of the following conditions are simultaneously met: one of the plurality of signal discrimination circuits corresponding to the one of the plurality of switching circuits sends the one of the plurality of switching circuits an estimated signal-to-noise ratio value that is greater than or equal to a minimum signal-to-noise ratio threshold, and the analog output detector informs the one of the plurality of switching circuits that the others of the plurality of switching circuits are all currently suppressing outputs from their respective first analog output ports. The one of the plurality of switching circuits may remain enabled for output via its first analog output port unless it receives from its corresponding signal-discrimination circuit, a value of the estimated signal-to-noise ratio that is less than the minimum signal-to-noise ratio threshold, such that upon receiving the value of the estimated signal-to-noise ratio less than the minimum estimated signal-to-noise ratio, the one of the plurality of switching circuits is disabled.

In accordance with some aspects, one or more of the plurality of switching circuits whose corresponding optical detectors are neighboring the optical detector to which the one of the plurality of switching circuits that has already been enabled is operatively connected are enabled for output via their respective first analog output ports enhancing the signal strength of the optical beacon. The one or more of the optical detectors corresponding to the plurality of switching circuits are determined to be neighboring based upon a focal area centered on the optical detector corresponding to the one of the plurality of switching circuits that has already been enabled for output via its first analog output port. The focal area may comprise one of a blur circle or blur ellipse, one or more parameters of which depends upon a size of a point-spread function of an imaging lens associated with the multi-channel adaptive communications focal plane array.

In some embodiments, the enabling of the one or more neighboring plurality of switching circuits for output via the first analog output port is initiated by receipt of a signal-to-noise ratio request and a determination that an estimated signal-to-noise ratio output from a corresponding one of the plurality of signal discrimination circuits is greater than or equal to the minimum signal-to-noise ratio threshold.

The multi-channel adaptive communications focal plane array may perform a re-centering procedure to re-center a focal area based upon recent signal-to-noise ratio estimates, the focal area being centered on the optical detector corresponding to the one of the plurality of switching circuits that has already been enabled for output via its first analog output port.

In some embodiments, the multi-channel adaptive communications focal plane array is operatively implemented within an optical receiver assembly, the optical receiver assembly monitoring and processing the optical beacon portion of an optical beam until optical beacon information embedded in the optical beacon is extracted.

In some embodiments, the optical receiver assembly outputs the optical beacon information to an augmented reality device, the augmented reality device presenting one or more aspects of the optical beacon information in an augmented reality presentation displayed to a user of the augmented reality device.

In some embodiments, all of the plurality of switching circuits except one or more of the plurality of switching circuits operatively connected to the one or more of the plurality of optical detectors receiving the optical beam are suppressed by being maintained in a disabled state until the optical beacon information has been extracted from the optical beam.

In accordance with one embodiment, one or more of the plurality of switching circuits operatively connected to another one or more of the plurality of optical detectors receiving another optical beam are enabled while outputs from all of the remaining plurality of switching circuits are suppressed by the remaining plurality of switching circuits being maintained in the disabled state until optical beacon information embedded in the other optical beam has been extracted.

In some embodiments, the optical beam comprises an optical beacon and an optical signal. One or more of the plurality of optical detectors, one or more of the plurality of signal discrimination circuits, and one or more of the plurality of switching circuits may process the optical beam to extract optical signal information embedded in the optical beam and output it to one of a plurality of output channels of the multi-channel adaptive communications focal plane array upon selection of an augmented reality representation of the optical beacon, and wherein control electronics perform a re-centering procedure periodically during the extraction to re-center a focal area from which the optical signal is being extracted based upon recent signal-to-noise ratio estimates.

In some embodiments, one of the plurality of switching circuits having corresponding ones of the plurality of optical detectors that are not receiving the optical beam are operationally suppressed during the extraction of the optical signal information.

Analog signals representative of the optical beam can be output from one or more of the plurality of switching circuits via a subsequently ordered analog output port of each of the one or more of the plurality of switching circuits and then combined to create a single analog output in a corresponding channel representative of the optical beam output, wherein the subsequently ordered analog output ports correspond to a total number of channels of the multi-channel adaptive communications focal plane array.

The multi-channel adaptive communications focal plane array may further comprise digital-signal converters, the total number of which corresponds to the total number of channels of the multi-channel adaptive communications focal plane array, adapted to convert the combined analog signals representative of the optical beam in each of the channels into digital signals representative of the optical beam. Each of the digital-signal converters may transmit the digital signals in each of the channels to an optical receiver assembly.

In some embodiments, the optical signal information is simultaneously extracted from two or more different optical beams and simultaneously output via two or more channels.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

Figure 1:
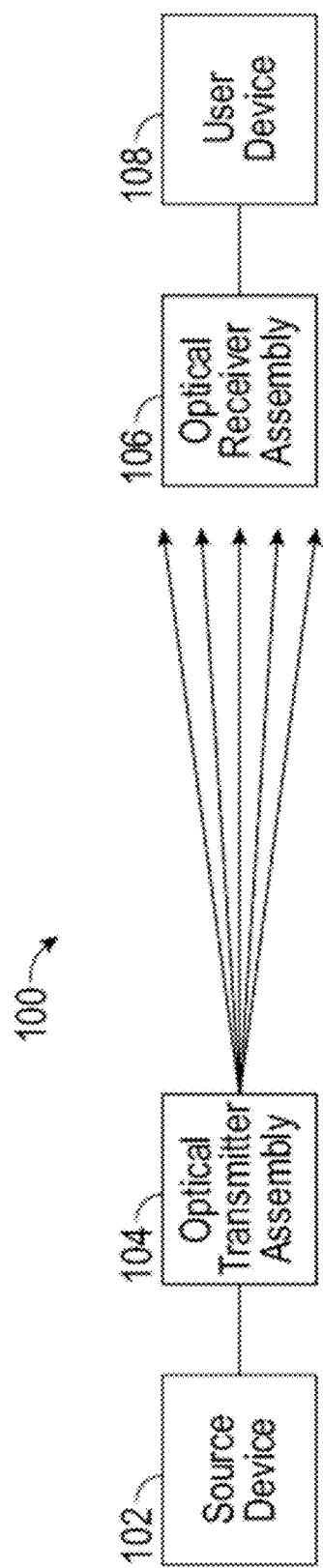
FIG. 1 illustrates an example optical narrowcasting system.

The figures are not exhaustive and do not limit the disclosure to the precise form disclosed.

DETAILED DESCRIPTION

Various embodiments of the technologies disclosed herein are directed to focal plane arrays that may be implemented in, e.g., a specially-configured camera that can be utilized to receive and/or process information in optical form as part of an optical communications system (described in greater detail below). In order to achieve optical communications in accordance with various embodiments, a specialized focal plane array (FPA), referred to herein as an adaptive communications focal-plane array (ACFPA), is utilized. An FPA of this type incorporates a plurality of optical detectors, where at any given time the majority of optical detectors are suppressed, i.e., data is not allowed to be output from them, and only a significantly smaller number/subset of optical detectors (that are actually receiving optical information) output data. In this way, the rate at which data is to be output by an FPA used in an optical communications receiver can be significantly reduced, negating the need for a conventional FPA (e.g., a video-camera FPA) that would require a frame rate equaling at least twice the rate at which data is received from a single optical transmitter. Accordingly, cameras used as optical-communications receivers in which one or more FPAs are implemented in accordance with various embodiments of the technology disclosed herein can support the high data rates associated with many optical communications systems, including optical narrowcasting systems, an example of which is disclosed in U.S. application Ser. No. 15/395,739, and is incorporated herein by reference.

Definitions

As used herein, an "optical narrowcasting system" or "ONS" is a system that can transmit information from one or more locations to one or more other locations using one or more digitally modulated optical beams transmitted through one or more propagation media. Contemplated propagation media may include, but are not limited to, air, water, glass windows, and the vacuum of space. An ONS may include one or more optical transmitter assemblies (OTAs) to transmit optical beams to one or more optical receiver assemblies (ORAS).

As used herein, an "optical beam" is a directed beam of electromagnetic radiation having wavelengths in a spectral region ranging from approximately 10 nm (e.g., extreme ultraviolet (UV) radiation) to approximately $10^6$ nm (e.g., far infrared (IR) radiation). As used herein to refer to an optical beam, the term "directed" beam can refer to energy, e.g., light energy sent in a specific range of propagation directions, but not in other directions. For example, a laser may emit a narrow directed beam of light, whereas the sun may be understood to emit undirected light that propagates outward in all possible directions.

As used herein, an "optical transmitter assembly" or "OTA" is a device including electronics, software (and/or firmware), and one or more optical transmitters (OTs). An OTA may be an element of an ONS. The OT(s) within an OTA can provide the functionality of at least one optical beacon transmitter (OBT) and/or at least one optical signal transmitter (OST). In some implementations, a single OT may function as both an OBT and an OST. In other implementations, the OBT(s) and OST(s) of an OTA can be separate devices. An OTA may also contain one or more tilt actuators allowing it to control the pointing direction(s) of the optical beam(s) output by its OT(s). An OTA's electronics and associated software (and/or firmware) may perform various useful functions, such as: providing an interface between the OTA and its user(s) (or its users' devices); supplying timing pulses and electrical power to its OT(s); controlling the operation of the OT(s) (e.g., turning them on and off, setting their data-transmission rate, etc.); transferring digital data to the OT(s) for them to output as one or more digitally modulated optical beams; and controlling one or more tilt actuators to alter the pointing direction(s) of the output optical beam(s).

As used herein, an "optical transmitter" or "OT" is a device including one or more optical sources, one or more beam-forming optics, and electronics with associated software (and/or firmware) adapted to transmit optical beams. One or more OTs may form at least part of an OTA. The optical sources may be coherent (e.g., lasers) or incoherent (e.g., light emitting diodes (LEDs)). The optical output of each optical source may be electronically modulated at a desired bit rate (or at one of a user-selectable range of bit rates) to transmit digital data in the form of a series of one-bits and zero-bits. The optical source(s) produce optical radiation in a desired optical waveband. Each beam-forming optic may collect flux emitted by one or more optical source(s) and utilize refraction, reflection, and/or diffraction to concentrate it into a transmitted beam having a desired angular intensity distribution. In some cases, the beam-forming optic may also include one or more spectral filters to minimize the amount of flux transmitted outside of the desired waveband. Multiple OTs could in some implementations be used in a single OTA to increase the solid angle of the output beam and/or to increase the output intensity in certain solid-angular regions. The electronics and associated software (and/or firmware) of an OT may perform the following functions: receive and (if necessary) modify timing pulses and electrical power sent to it by the OTA of which it is a component; receive and properly interpret various control signals sent to it from the OTA; and receive from the OTA data in digital electronic form that it will then output in digital optical form.

As used herein, an "optical beacon transmitter" or "OBT" is a type of OT that produces a beacon associated with an OTA. An "optical beacon" or "beacon" is a modulated optical beam containing information that allows an ORA to detect the presence of an OTA. An optical beacon makes a user or entity receiving optically transmitted information aware of the presence or availability of information transmitted by the OTA associated with the beacon. In addition to detecting the presence of the OTA, a beacon produced by an OBT may also contain information allowing an optical receiver assembly (ORA) to identify the entity (e.g., business, organization, private individual, product, landmark, etc.) and type (i.e., category) of entity (e.g., restaurant, department store, movie theater, etc.) with which the OTA is associated. A beacon may also be used by an OBR to determine the angular position of the OTA. In some embodiments, the angular position, e.g., horizontal and/or vertical angular position, of the OTA can be determined based on information optically transmitted within or as part of the optical beacon. For example, latitudinal, longitudinal, and altitudinal information indicative of the location of an OTA may be transmitted in a beacon. In some embodiments, one or more measurements made by an OBR of the propagation direction of an optical beacon can be used by the OBR to derive, calculate, or otherwise determine an angular position of the OTA within the FOV of the OBR. As mentioned previously, a single OT within an OTA may function as both an OBT and an OST, or the OBT(s) and OST(s) within an OTA may be separate devices.

As used herein, an "optical signal transmitter" or "OST" is a type of OT that produces an optical signal associated with an OTA. An "optical signal" is a modulated optical beam containing information, other than information contained in an optical beacon, which the operators of an OTA desire to transmit to optical receiver assemblies (ORAS). The purpose of an OST is to transmit information to ORAs that have already detected the OTA of which the OST is a component. In some instances, the ORAs may have also identified and determined the angular location of the OTA prior to receiving optical signals transmitted by the OTA. A single OT within an OTA may function as both an OBT and an OST, or the OBT(s) and OST(s) within an OTA may be separate devices.

A modulated optical beam produced by an OTA may contain both optical beacons and optical signals. Alternatively, a modulated optical beam may contain only one or more optical beacons and no optical signals, or it may contain only one or more optical signals and no optical beacons. For example, an OTA may simultaneously output two separate optical beams, one being an optical beacon and another being an optical signal, where the optical beacon has a different wavelength spectrum than the optical signal.

As used herein, the term "optical information" generally refers to information extracted from a modulated optical beam or used to modulate an optical beam. Optical information may include identification data extracted from or contained in an optical beacon (e.g., identifying a particular OTA and/or source of the OTA) and descriptive data extracted from or contained in an optical signal (e.g., an advertisement or other message). This data may comprise machine-readable and/or human-readable data, such as text, video, audio, metadata, or other types of information.

As used herein, an "optical receiver assembly" or "ORA" is a device including electronics, software (and/or firmware), and one or more optical receivers (OR). The OR(s) within an ORA can provide the functionality of at least one optical beacon receiver (OBR) and/or at least one optical signal receiver (OSR). An ORA may be an element of an ONS. In some cases, an ORA may also contain one or more tilt actuators allowing it to control the directions from which its OBR(s) and OSR(s) can receive modulated optical beams. An ORA can perform one or more of the following functions. It may detect the presence of beacons transmitted by OTAs. It may extract information from beacons, such as the identities of the entities (e.g., businesses, organizations, private individuals, products, landmarks, etc.) with which OTAs are associated. It may determine the angular positions of OTAs by sensing the direction of incidence of beacons or extracting positioning information therefrom. It may receive and/or extract data from optical signals transmitted by OTAs. An ORA's electronics and associated software (and/or firmware) perform various useful functions, such as: providing an interface between the ORA and its user(s) (or its users' devices); supplying timing pulses and electrical power to its OBR(s) and OSR(s); controlling the operation of its OBR(s) and OSR(s) (e.g., turning them on and off, setting their data-reception rate, etc.); receiving and transferring to users (or to users' devices) information, such as identifying information and angular position, obtained by its OBR(s) regarding OTAs that have been detected; receiving and transferring to users (or to users' devices) data received from OTAs by its OSR(s); and controlling one or more tilt actuators to alter the pointing direction(s) of one or more OBRs and one or more OSRs.

As used herein, an "optical beacon receiver" or "OBR" is a device that may make up at least part of an ORA, and that is adapted to receive an optical beacon. An OBR may detect the presence of one or more OTAs. An OBR may also identify the entities (e.g., businesses, organizations, or private individuals) with which OTAs are associated through, e.g., information contained within an optical beacon, as well as determine the angular positions of OTAs. As noted previously, the angular positions of OTAs may be derived from measurement(s) of the propagation direction of a beacon and/or determined from information contained within the beacon. An OBR may include, for example: one or more optical detectors or detector arrays (e.g., FPAs); one or more collection optics, each including one or more optical components (e.g., lenses, reflectors, and/or diffractive optical elements); and control electronics with associated software (and/or firmware). A spectral filter may be included in each collection optic to reduce to low levels the out-of-band flux incident on the detector(s). The optical detectors are capable of detecting optical flux in the waveband and at the bit rates of beacons which the OBR is designed to receive. In some cases an OBR could share some or all of its detectors, collection optics, electronic hardware, and software/firmware with one or more OSRs within the ORA of which it is a part. The electronics and associated software (and/or firmware) of an OBR perform at least the following functions: providing the capability of receiving and (if necessary) modifying timing pulses and electrical power sent to it by the ORA of which it is a part; receiving and properly interpreting various control signals sent to it by the ORA; and transferring to the ORA information (e.g., identifying information and angular position) it has obtained regarding beacons it has detected and from which it has received information.

As used herein, an "optical signal receiver" or "OSR" is a device adapted to receive optical signals and to convert the data they contain into digital or electronic form. An OSR may include one or more optical detectors or detector arrays (e.g., FPAs), one or more collection optics, and control electronics with associated software (and/or firmware). The optical detectors are capable of detecting optical flux in the waveband and at the bit rates of optical signals the OSR is designed to receive. Each collection optic can collect incident in-band flux over its entrance pupil and within its specified field of view (FOV), and utilizes refraction, reflection, and/or diffraction to concentrate it onto one or more of the optical detectors. A spectral filter may also be included in the optical train to reduce to low levels the out-of-band flux incident on the detectors. In some cases, an OSR may share some or all of its detectors, collection optics, electronic hardware, and software/firmware with one or more OBRs within the ORA of which it is a part. The electronics and associated software (and/or firmware) of an OSR can perform one or more of the following functions: receive and (if necessary) modify timing pulses and electrical power sent to it by the ORA (of which it is a part); receive and properly interpret various control signals sent to it by the ORA; and transfer to the ORA, digital data extracted from optical signals it has received.

As used herein, an "adaptive communications FPA" or "ACFPA" is an FPA comprising a plurality of optical detectors that can suppress the output of one or more of those optical detectors adapted to receive optical beacons and/or signals to allow the receipt of information at "high" data rates (e.g., 1 Mbit per second or higher) associated, e.g., with the transmission of optical information contained in descriptive data extracted from or contained in an optical signal (e.g., an advertisement or other message). In some embodiments, an ACFPA may be adapted to receive both optical beacons and optical signals. An ACFPA is adapted to take advantage of the fact that the number of OTAs found within the FOV of an optical communications camera (discussed below) will generally be very small relative to the number of its optical detectors. The rate at which data is to be output by the ACFPA can therefore be substantially reduced by only outputting data from detectors that are actually receiving signal beams from OTAs, or from a subset of such detectors.

As used herein, an "optical communications camera" or "OCC" can refer to a device comprising an imaging lens with an ACFPA in its focal plane that is capable of serving as an OBR, an OSR, or as both an OBR and an OSR. As discussed above with regard to OBRs and OSRs, an OCC may include a spectral filter in its optical train to suppress out-of-band flux/background radiation.

Disclosed herein are systems and methods of communication that utilize non-radio-wave-based communications channels. That is, communications may be achieved through the transmission and/or receipt of information in the form of modulated optical beams. In this way, a user or entity, such as a business wishing to transmit information, e.g., advertising information, may do so by utilizing an OTA that can convert a digital representation of the information into one or more modulated optical beams for transmission. It should be noted that the information transmitted may include information disseminated by businesses and other organizations, including government agencies, for example, and by individuals. Personal content, such as messages, photos, and videos shared by individuals within a social media context are other examples of information that may be transmitted.

A characteristic of the optical communications methods and systems disclosed herein is that a user of an ORA designed to receive information sent by one or more OTAs may not know ahead of time what specific optical transmitters will be sending information of interest to him/her or where they will be located. For this reason, one aspect of various embodiments is that an ORA may be equipped with one or more components adapted to detect the presence of optically transmitted information prior to receiving that information.

A user wishing to receive the information transmitted in the form of one or more modulated optical beams may utilize an ORA implemented within or in conjunction with a user device, such as a smartphone, to scan for and detect the presence of available optical beacons, extract the identifying information contained in the beacons, and display the identifying information through, e.g., an augmented reality (AR) interface. Upon selecting a specific OTA using information extracted from its associated beacon and displayed on the AR interface, the user, if he/she so desires, may further obtain some or all of the information contained within or represented by the optical signal associated with said OTA through the AR interface or other information-presentation mechanism, such as a media player (e.g., advertising information in the form of digital video).

Advantages can be realized by using such an optical communications system, referred to herein as an optical narrowcasting system. These advantages include the fact that optical narrowcasting systems such as those disclosed herein may have long-range, high-bandwidth capabilities and may avoid regulatory limitations (optical transmissions are thus far unregulated by the Federal Communications Commission (FCC) or any other regulatory body). Another advantage of optical narrowcasting systems is that they can provide users with the ability to utilize existing hardware and/or software technologies that are enhanced by extremely compact non-imaging optical components that have low power needs and are energy efficient. The operable range of an optical narrowcasting system can be approximately 400 m (e.g., during the day) to approximately 1200 m (e.g., during nighttime) compared to that of WiFi that is effective within approximately 50 m. Moreover, optical narrowcasting systems are able to direct information in one or more desired directions using, e.g., beamforming. This can be accomplished through the use of the aforementioned non-imaging optics, whereas directionality using WiFi is not practical given the need (of WiFi routers) to use expensive and bulky directional antennas. Regarding efficiency, optical narrowcasting networks can be up to 300 times more energy efficient than WiFi networks. Further still, the security that can be achieved in an optical narrowcasting network is much higher than that possible in a WiFi® network, due to the directionality of the transmitted optical beams.

FIG. 1 illustrates an example optical narrowcasting system 100. Transmitting and/or receiving an optical beam(s) may be accomplished using an OTA, e.g., optical transmitter assembly 104, and an ORA, e.g., optical receiver assembly 106. An noted previously, "optical transmitter assembly," or "OTA," may refer to an optical narrowcasting element adapted to transmit one or more optical beams, and can include certain electronics and/or circuitry, software and/or firmware, and one or more optical transmitters, which will be described in greater detail below with reference to FIG. 2. As illustrated in FIG. 1, optical transmitter assembly 104 may transmit one or more optical beams into a medium, such as air. As alluded to previously, an optical beam may comprise one or more of an optical beacon and an optical signal.

Optical transmitter assembly 104 may receive, modulate, convert, and/or otherwise process digital information into an optical format for transmission as an optical beam to be received by optical receiver assembly 106. The digital information may be received by optical transmitter assembly 104 from one or more sources, e.g., source device 102. Source device 102 may be a computer tablet, smartphone, data server, or other information source.

Optical transmitter assembly 104 may be installed on various fixed structures, such as buildings, billboards, road signs, and the like. It may also be installed on vehicles such as automobiles and buses. It should be understood that these installations are merely examples and not limiting in any way. Optical transmitter assembly 104 may also be incorporated into portable and/or handheld devices, such as smartphones, tablet computers, and head mounted displays, or it may be incorporated into devices intended to be attached to, or kept in close proximity to, portable and/or handheld devices, such as smartphone cases and cases for tablet computers. It should be understood that the devices mentioned here are merely examples and not limiting in any way. Moreover, although optical transmitter assembly 104 is illustrated as being associated with a single source device 102, optical transmitter assembly 104, in some embodiments, may be associated with and/or receive digital information from additional source devices.

Optical receiver assembly 106 may be installed on various fixed structures, such as buildings, billboards, road signs, and the like. It may also be installed on vehicles such as automobiles and buses. It should be understood that these installations are merely examples and not limiting in any way. Optical receiver assembly 106 may also be incorporated into portable and/or handheld devices, such as smartphones, tablet computers, and head mounted displays, or it may be incorporated into devices intended to be attached to, or kept in close proximity to, portable and/or handheld devices, such as smartphone cases and cases for tablet computers. It should be understood that the devices mentioned here are merely examples and not limiting in any way. Moreover, although optical receiver assembly 106 is illustrated as being associated with a single user device 108, optical receiver assembly 106, in some embodiments, may be associated with, controlled by, and/or share digital information with additional user devices.

Optical receiver assembly 106 may be an optical narrowcasting element adapted to receive one or more optical beams, and can include certain electronics and/or circuitry, software and/or firmware, and one or more optical receivers, a more detailed description of which is provided in U.S. patent application Ser. No. 15/395,739 which is incorporated herein by reference in its entirety. Optical receiver assembly 106 may receive an optical beam and demodulate, convert, and/or otherwise process the optical beam back into digital information. Optical receiver assembly 106 may transmit or forward the digital information to a receiving device, such as user device 108. User device 108 may be a computer tablet, smartphone, network server, or other device capable of receiving and/or utilizing the digital information or data. Optical receiver assembly 106 may be integrated with user device 108 or optical receiver assembly 106 may be operatively attached to user device 108. It should be noted that optical receiver assembly 106 need not be associated with only a single user device. In some embodiments, optical receiver assembly 106 may transmit or forward received digital information to more than one user device, e.g., via broadcasting, multicasting, etc.

It should be noted that although FIG. 1 depicts one-way communications between optical transmitter assembly 104 and optical receiver assembly 106, an optical narrowcasting system may also involve two-way communications. For example, source device 102 and user device 108 may each have respective optical transmitter and optical receiver assemblies integrated therein or operatively attached thereto. Optical beams may, in some cases, be in the visible or near-IR bands. Optical beams may be produced using either incoherent sources (e.g., light emitting diodes (LEDs)), lasers, or other appropriate light sources. Depending on the application, different angular beam widths can be used. Optical beams may either propagate from an optical transmitter assembly directly to an optical receiver assembly along an unobstructed line of sight (LOS), or optical beams may propagate along an indirect, non-LOS path, utilizing diffuse reflections from ceilings, walls, or other structures, for example, or from suspensions of small particles (e.g., airborne dust) or liquid droplets (e.g., clouds or fog). It should be noted that two or more identical modular transmitter-optics units may be used to produce combined beams having increased horizontal and/or vertical angular beam widths, and/or increased intensity within certain solid-angular regions.

An ad hoc network (e.g., a communications network established directly between two or more computers or other devices) need not rely on a base station or other centralized access point. Such communications networks are generally established on a temporary basis between a small number of participants in close physical proximity for a specific common purpose, such as sharing a set of documents being written by the participants or playing multi-player computer games. In some embodiments, two or more user devices (one embodiment of which can be user device 108) may each comprise optical transmitter assemblies and optical receiver assemblies (embodiments of which can be optical transmitter assembly 104 and optical receiver assembly 106 of FIG. 1). The two or more user devices may be used to transmit and receive data via optical beams, thereby creating an ad hoc optical narrowcasting network.

Figure 2A:
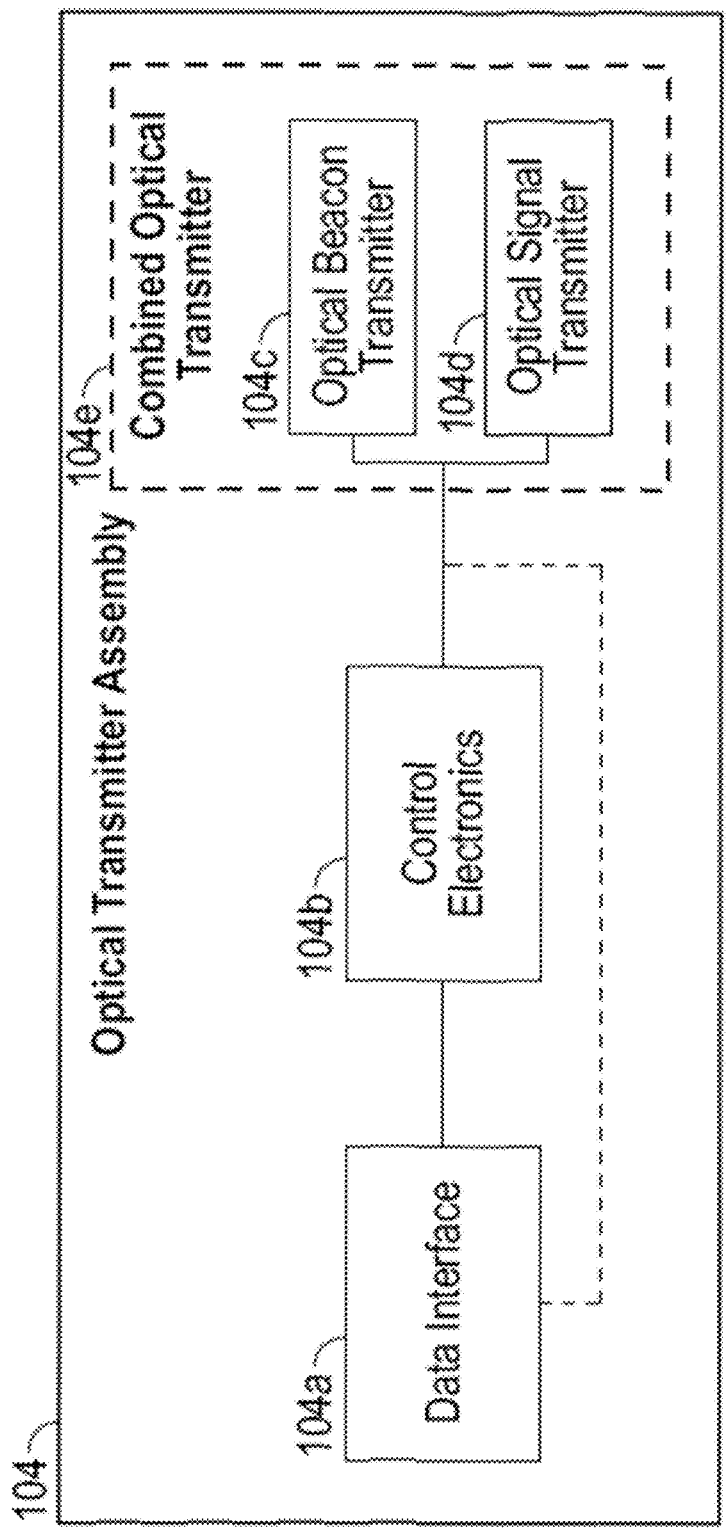
FIG. 2A illustrates example components that may make up an optical transmitter assembly.

FIG. 2A illustrates example components that may make up optical transmitter assembly 104. Optical transmitter assembly 104 may include a data interface 104a. Data interface 104a may comprise electronics and/or circuity, as well as associated software (and/or firmware) adapted to provide an interface between optical transmitter assembly 104 and source device 102 (and/or a user of source device 102). For example, optical transmitter assembly 104 may be controlled by source device 102 via data interface 104a. Data interface 104a may communicate with source device 102 by way of a hardwired and/or wireless (e.g., Bluetooth®) connection. One or more software applications on source device 102 may allow data files to be uploaded to a memory unit of optical transmitter assembly 104 via data interface 104a. These one or more software applications may also allow a user to send commands instructing optical transmitter assembly 104 to optically transmit the contents of one or more data files that have been uploaded to optical transmitter assembly 104. The user may also be able to specify values, such as bit rate, optical output intensity, pulse duty cycle, and other relevant operating parameters for optical transmitter assembly 104.

Optical transmitter assembly 104 may include control electronics 104b. Control electronics 104b may receive the above-noted values that have been input by the user and utilized to control operation of optical transmitter assembly 104. For example, control electronics 104b may supply timing pulses and electrical power to the optical transmitters, control the operation of one or more optical transmitters, e.g., optical beacon transmitter 104c and optical signal transmitter 104d, (for example, by turning them on and off, setting their data-transmission rate, etc.). Control electronics 104b may effectuate the transfer of digital data to one or more of the optical transmitters to be output as one or more digitally modulated optical beams.

In some embodiments, optical transmitter assembly 104 may also comprise one or more tilt actuators, such as microelectromechanical systems (MEMS) actuators, that allow optical transmitter assembly 104 to control direction(s) in which one or more optical beams may be pointed upon being output. For example, optical beacon transmitter 104c, optical signal transmitter 104d, and/or combined optical transmitter 104e may be mounted or otherwise incorporated into optical transmitter assembly 104 via a connection that allows for the one or more tilt actuators to move the transmitters. Control electronics 104b may control operation of the one or more tilt actuators.

Optical transmitter assembly 104 may include one or more optical transmitters adapted to process digital information received from, e.g., source device 102, for transmission as an optical beam. As illustrated in FIG. 2A, some embodiments may have an optical beacon transmitter 104c and an optical signal transmitter 104d. Optical beacon transmitter 104c may be adapted to transmit optical beacons that are specifically intended to be received by optical beacon receivers. Optical beacons allow the presence of optical transmitter assembly 104 to be detected. Optical beacons may allow the source (e.g., user or entity associated with source device 102, source device 102, and/or optical transmitter assembly 104) to be identified. Optical beacons may also allow the horizontal and/or vertical angular position of the optical transmitter assembly 104 within the FOV of an OBR at a different location to be determined. This can be accomplished, for example, by an OBR utilizing a lens, such as an imaging lens, to concentrate (i.e., focus) optical beacons incident on the lens from different directions onto correspondingly different locations on a detector array located in the focal plane of the lens (i.e., an FPA). The location in the detector array, e.g., an ACFPA, at which an optical beacon is currently focused can be a measure of the current angular position relative to the OBR's FOV of the OTA from which the optical beacon is transmitted. That is, optical power in the form of an optical beacon may be currently, primarily or entirely, concentrated (by the OBR's lens) onto a detector located at a particular row and column of the FPA used in the OBR. The OBR may be a camera that is sensitive to the waveband of the optical beacon. The row and column of the FPA at which the optical beacon is concentrated can be a current estimated location (within the FOV of the OBR) of the OTA that sent the beacon. OTA locations in this form can be mapped to analogous locations within the FOV of an associated visible-light camera, such as the forward-looking camera of a smartphone. This allows the locations of OTAs to be represented on a user's real-time video display (e.g., that of the smartphone). An icon representing the OTA can then, for example, be overlaid at this location in the real-time video display. It should be noted that the horizontal and vertical angular location of an OTA can, in general, be a function of time. For example if an OTA moves due to it being mounted on a vehicle that moves, its location within the FOV of an OBR may change. Similarly, if the ORA moves to a new location and/or is tilted, the OTA location within the FOV of the OBR may also change, even though the OTA has stayed in the same physical location.

Optical signal transmitter 104d may be adapted to transmit optical signals specifically intended to be received by optical signal receivers. Optical signals transmit information from optical transmitter assembly 104 to optical receiver assembly 106, where optical transmitter assembly 104 and/or an entity associated with it may have already been detected, identified, and whose horizontal and/or vertical angular position relative to the FOV of an OBR has already been determined. Moreover, two or more optical transmitters may be implemented in optical transmitter assembly 104 to increase the solid angle of an output optical beam and/or to increase output intensity in certain solid-angular regions.

As also illustrated in FIG. 2A, an alternative may be to utilize a "combined" optical transmitter 104e that realizes the functionality of both optical beacon transmitter 104c and optical signal transmitter 104d. For example, combined optical transmitter 104e may comprise a single optical transmitter adapted to transmit both optical beacons and optical signals. That is, combined optical transmitter 104e may be designed to transmit an optical beam intended to be received both by optical beacon receivers and by optical signal receivers. In some embodiments, combined optical transmitter 104e may transmit optical beacons and optical signals, wherein the optical beacons and optical signals are combined for transmission on a single optical communications channel of an optical narrowcasting system, e.g., by temporal interleaving, coded multiple access, or other multiple access method.

An optical transmitter, e.g., optical beacon transmitter 104c, optical signal transmitter 104d, and/or combined optical transmitter 104e, may include one or more optical sources, one or more beam-forming optics, as well as electronics with associated software and/or firmware. The optical sources may be coherent (e.g., lasers) or incoherent (e.g., LEDs). The optical output of each optical source may be electronically modulated at a desired bit rate (or at one of a user-selectable range of bit rates) to transmit digital information in the form of a series of one-bits and zero-bits. The optical source(s) may produce optical radiation in a desired optical waveband. Each beam-forming optic can collect flux emitted by the one or more optical sources and utilizes refraction, reflection, and/or diffraction to concentrate it into a transmitted beam having a desired angular intensity distribution. In some cases, a beam-forming optic may include one or more spectral filters to minimize the amount of flux transmitted outside of a desired waveband.

The electronics and associated software (and/or firmware) of an optical transmitter, e.g., optical beacon transmitter 104c, optical signal transmitter 104d, and/or combined optical transmitter 104e, may perform one or more of the following functions: receiving and, if necessary, modifying timing pulses and/or electrical power received from control electronics 104b; receiving and properly interpreting various control signals sent to it from control electronics 104b; and receiving, from, e.g., data interface 104a by way of control electronics 104b, information or data in digital form that it will then output in digital optical form vis-à-vis an optical beam. It should be noted that in some embodiments, digital information or data may be received directly from data interface 104a, as indicated by the dashed control line shown in FIG. 2A.

Figure 2B:
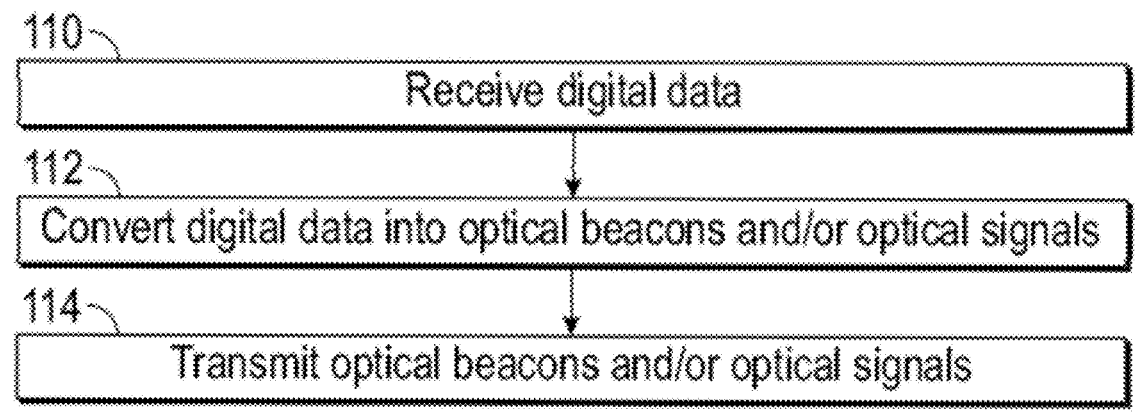
FIG. 2B is a flow chart illustrating example operations that may be performed by the optical transmitter assembly of FIG. 2A and/or its component parts or elements.

FIG. 2B is a flow chart illustrating example operations that may be performed by optical transmitter assembly 104 and/or its component parts or elements. At operation 110, digital data to be optically transmitted may be received by optical transmitter assembly 104. As described above, the digital data to be optically transmitted may be received via data interface 104a. For example, a user, through source device 102 may upload a digital video advertisement to optical transmitter assembly 104. At operation 112, the digital data may be converted into one or more optical beacons and/or optical signals. For example, the digital video advertisement may be converted into an optically formatted representation of the digital video advertisement for transmission in the form of an optical signal. This operation may involve performing one or more conversion, processing, and/or modulation operations at one or more of optical beacon transmitter 104c, optical signal transmitter 104d, and/or combined optical transmitter 104e under the control of control electronics 104b. At operation 114, the optical beacons and/or optical signals are transmitted by one or more of optical beacon transmitter 104c, optical signal transmitter 104d, and/or combined optical transmitter 104e. In the case of an optical beacon, information identifying, e.g., the user of source device 102, may be transmitted with the optical signal or converted into an optical beacon that is transmitted separately.

Figure 3A:
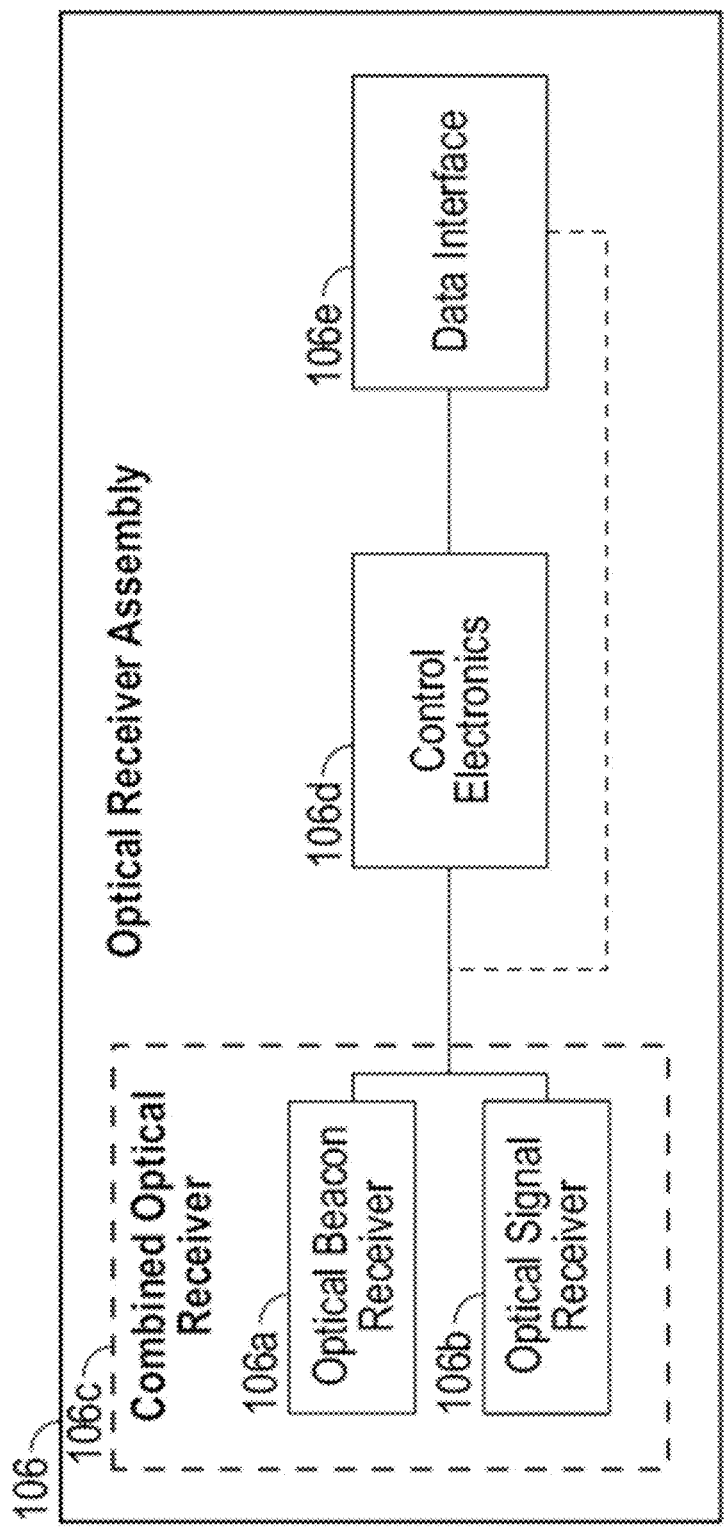
FIG. 3A illustrates an optical receiver assembly, including one or more example components that may make up the optical receiver assembly.

FIG. 3A illustrates optical receiver assembly 106 in more detail including one or more example components that may make up optical receiver assembly 106. For example, optical receiver assembly 106 may include one or more of an optical beacon receiver 106a, and an optical signal receiver 106b, or as an alternative, a "combined" optical receiver 106c that realizes the functionality of both optical beacon receiver 106a and optical signal receiver 106b. For example, combined optical receiver 106c may comprise a single optical receiver adapted to receive both optical beacons and optical signals. In some embodiments, combined optical receiver 106c may be an OCC.

In some embodiments, similar to optical transmitter assembly 104, optical receiver assembly 106 may include one or more tilt actuators allowing optical receiver assembly 106 to control the direction(s) from which its optical beacon receiver(s) and/or optical signal receiver(s) may receive optical beams transmitted by one or more optical transmitter assemblies, e.g., optical transmitter assembly 104.

The purpose of optical receiver assembly 106, as alluded to previously, may be to detect the presence of and/or receive data (in the form of optical beacons and/or optical signals) transmitted by optical transmitter assembly 104. For example, optical receiver assembly 106 may detect the presence of optical transmitter assemblies by detecting optical beacons sent by them, extract identifying information from optical beacons regarding, e.g., entities associated with the optical transmitters that sent the optical beacons, determine horizontal and/or vertical angular positions of optical transmitter assemblies (by sensing the direction of incidence of the optical beacons), and receive information or data in the form of optical signals.

Optical receiver assembly 106 may comprise a data interface 106e that provides an interface between the optical receiver assembly and one or more users and/or user devices, e.g., user device 108. Data interface 106e may be responsible for receiving and transferring to users (or to users' devices, e.g., user device 108) information, such as identifying information and horizontal and/or vertical angular positions obtained by optical beacon receiver 106a regarding detected optical beacons. Data interface 106e may be responsible for receiving and transferring to users (or to users' devices, e.g., user device 108) data received via an optical signal by optical signal receiver 106a, for example. Optical receiver assembly 106 may be interfaced with user device 108 by way of a wired or wireless connection via data interface 106e. Software resident on user device 108 may be utilized by a user to operate optical receiver assembly 106. Additionally, the user may be able to specify the range of bit rates for signals to be received, error-correction methods to be used, and/or various other receiver operating parameters using user device 108, where the operating parameters may be transmitted to optical receiver assembly 106 via data interface 106e.

Optical receiver assembly 106 may comprise control electronics 106d. Control electronics 106d may supply timing pulses and electrical power to optical beacon receiver 106a, optical signal receiver 106b, or alternatively, to combined optical receiver 106e. Control electronics 106d may control the operation of optical beacon receiver 106a, optical signal receiver 106b, or alternatively, combined optical receiver 106c (e.g., turning them on and off, setting the data-output format, etc.). Data interface 106e may control the one or more tilt actuators that can be used to alter the direction(s) in which of one or more optical beacon receivers and/or one or more optical signal receivers may be pointed.

Combined optical receiver 106c, when functioning as an optical beacon receiver, may be adapted to detect the presence of one or more transmitted optical beams, distinguishing them from incident in-band radiation produced by radiation sources other than optical transmitters of an optical narrowcasting system (e.g., natural and artificial illumination sources). Combined optical receiver 106c may be configured to determine a horizontal and vertical angular position of one or more transmitted optical beams within its FOV. Combined optical receiver 106c may receive identifying information from one or more optical transmitter assemblies, e.g., optical transmitter assembly 104, whose optical beacons it has detected and received. For example, an optical transmitter assembly operated by a restaurant may transmit an optical beacon containing the (digitally encoded) name of the restaurant and/or type of restaurant in a format intended to be received by combined optical receiver 106c.

Combined optical receiver 106c, e.g., an OCC, may include one or more optical detectors or detector arrays, one or more imaging optics, each including one or more optical components (e.g., lenses, reflectors, and/or diffractive optical elements), as well as its own control electronics with associated software (and/or firmware). The optical detectors can detect optical flux in the waveband and at the bit rates used by optical transmitters to transmit optical signals and/or optical beacons it is designed to receive. Each imaging optic may collect incident in-band flux over its entrance pupil and within its specified FOV, and utilize refraction, reflection, and/or diffraction to concentrate it onto one or more of the optical detectors. A spectral filter may also be included in each receiver optic to increase communication range by reducing the out-of-band flux incident on the detectors to lower levels. Examples of component parts of combined optical receiver 106c, e.g., an OCC, are described in greater detail U.S. patent application Ser. No. 15/395,739.

Combined optical receiver 106c can perform at least one or more of the following functions: receive optical beacons and optical signals from one or more optical transmitter assemblies, e.g., optical transmitter assembly 104; receive and (if necessary) modify timing pulses and electrical power sent to it by optical receiver assembly 106; receive and properly interpret various control signals sent to it by control electronics 106d; and transfer to control electronics 106d, information (e.g., identifying information and angular position) it has obtained regarding optical beacons it has detected; and convert the optically formatted digital data into digital data in electronic form.

It should be noted that one or more of the aforementioned optics and/or detectors or detector arrays that, in part, make up combined optical receiver 106c may be custom manufactured and/or commercially available. For example, one or more refractive optics may be customized with respect to one or more optical characteristics or properties such that its operation may be optimized for use in optical receiver assembly 106. For example, one or more optical detectors or detector arrays may be commercially available near-IR detectors or detector arrays.

The electronics and associated software (and/or firmware) of optical signal receiver 106b and/or combined optical receiver 106c can perform one or more of the following functions: receive and (if necessary) modify timing pulses and electrical power sent by the control electronics 106d; receive and properly interpret various control signals sent to it by control electronics 106d; and transfer digital data received from one or more optical transmitters, e.g., optical signal transmitter 104d and/or combined optical transmitter 104e, to control electronics 106d. In some embodiments, the electronics and associated software (and/or firmware) may be customized to provide appropriate electrical power to operate the optical detectors. Moreover, it should be noted that electronics hardware and/or software may continuously monitor the output of the optical detectors, determining when an output therefrom may represent information sent by an optical transmitter—as opposed to, for example, flux received from artificial or manmade illumination sources.

Once an optical beacon has been detected, optical receiver assembly 106 may receive a related optical signal and store it as a data file in its memory. For example, optical receiver assembly 106 may buffer its detector outputs using one or more memory units or memory partitions to permit at least a portion of a given optical signal to be received prior to it being recognized as an actual optical signal. Alternatively, optical transmitter assembly 104 may transmit an optical signal that contains at its beginning, a short "alert"-pulse sequence. This alert-pulse sequence may inform optical receiver assembly 106 that transmission of an optical signal dataset has begun, thereby allowing it to store the entire dataset in its memory, without the need for buffering. That is, optical beacon transmitter 104c of optical transmitter assembly 104 may transmit an optical beacon followed by an optical signal that begins with an alert-pulse sequence. These operations may be continuously repeated by optical transmitter assembly 104. In some embodiments, each transmitted optical beacon may end with an alert-pulse sequence, rather than having an alert-pulse sequence be included at the beginning of each transmitted optical signal.

Figure 3B:
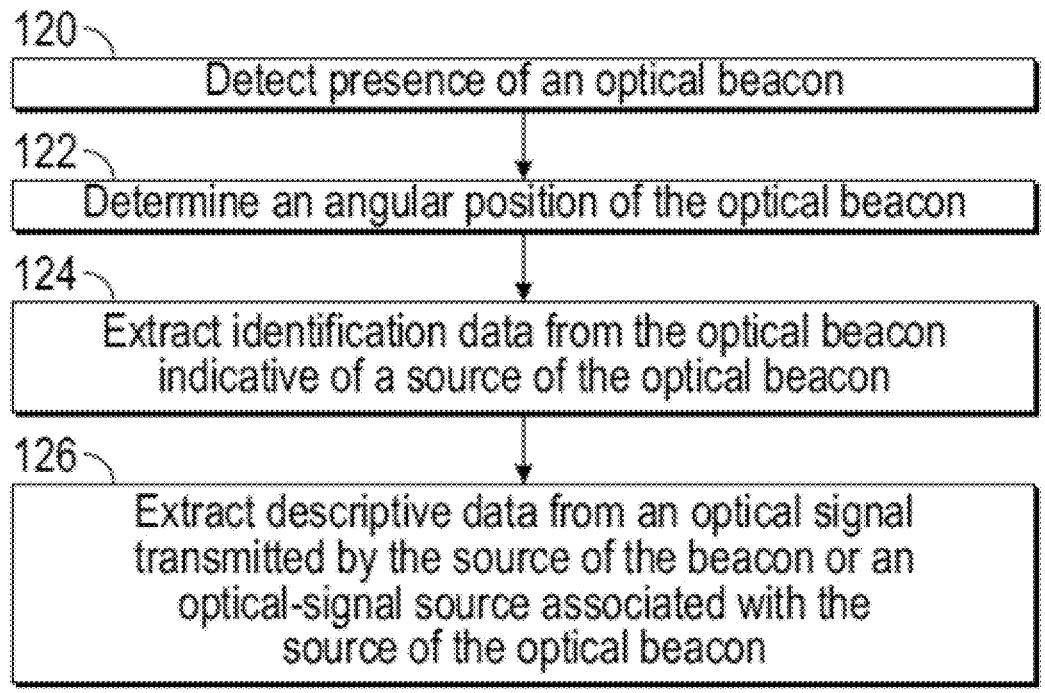
FIG. 3B is a flow chart illustrating example operations that can be performed by the optical receiver assembly of FIG. 3A and/or its component parts or elements.

FIG. 3B is a flow chart illustrating example operations that can be performed by an optical receiver assembly, e.g., optical receiver assembly 106 and/or its component parts or elements. At operation 120, optical receiver assembly 106 may detect the presence of an optical beacon that can be transmitted by optical transmitter assembly 104. As previously discussed, an optical beacon may be an optical beam comprising information identifying a source of the optical beacon. An optical beacon may also allow an optical receiver assembly 106 to estimate the horizontal and vertical angular position of its associated optical transmitter assembly relative to the FOV of one or more optical beacon receivers comprising part of the optical receiver assembly 106. At operation 122, the angular position of the optical beacon relative to the FOV(s) of one or more optical beacon receivers is determined based on its incident propagation direction. Because a plurality of optical beacons and/or optical signals may be transmitted within optical narrowcasting system 100, the angular position of an optical beacon transmission may be utilized to point or focus optical signal receiver 106b or combined optical receiver 106c in the direction of optical transmitter assembly 104 from where the optical beacon and associated optical signal(s) may originate. The angular position of an optical beacon transmission may also be utilized for other purposes, such as to assist a user in navigating to a location at which an OTA is located. At operation 124, the identification information may be extracted from the optical beacon, the identification information being indicative of or otherwise identifying the source of the optical beacon. In this context, the source of the optical beacon may be optical transmitter assembly 104, source device 102 and/or a user or entity utilizing source device 102 to transmit optical beams via optical transmitter assembly 104. At operation 126, information sent in the form of an optical signal by the source of the optical beacon may be extracted. Again, the source of an optical signal and the source of an optical beacon with which it is associated may be one in the same, e.g., source device 102 or optical transmitter assembly 104, or alternatively a user or entity utilizing source device 102 to transmit optical beams via optical transmitter assembly 104.

In some embodiments, optical narrowcasting system elements, such as optical receiver assemblies, may be integrated into a device, e.g., user device 108. That is, user device 108 may have resident optical receiver functionality. Alternatively, optical receiver assemblies may be operatively and communicatively connected to user device 108. In this case, an optical receiver assembly may be added to user device 108 as an attachment or enhancement. Similarly, an optical transmitter assembly may be added to source device 102 as an attachment or enhancement. In some cases, optical receiver assemblies and/or optical transmitter assemblies may be "stand-alone" elements that are fixed at a particular location.

In some embodiments, an OBR may have a relatively wide field of view (FOV). That is, an OBR may search for OTAs in situations in which little, if any, information will be available regarding their locations (e.g., horizontal and/or vertical angular positioning relative to the OBR). For the purposes of detecting and/or receiving an optical beacon, a standard video camera may be used as a sensor for an OBR. Such a camera may include an imaging lens with a focal-plane array (FPA) in its focal plane. The FPA may be a 2D array of optical detectors designed to sequentially capture multiple frames of imagery at a frame rate usually on the order of a few tens of Hz. A narrowband optical filter can also be included in the optical train to improve the signal-to-noise ratio (SNR) by suppressing incident background radiation outside the beacon waveband. With the appropriate choice of imaging lens and FPA, such a video-camera-based OBR can have a sufficiently large FOV to provide a convenient mechanism for searching for, detecting, and receiving data from beacons. The bit rate at which identifying information can be received from optical beacons by such a video-camera-based OBR may be limited by the Nyquist-Shannon sampling theorem to no more than half its frame rate, but because the information content of identifying information is typically quite small (e.g., several bytes), this is not a serious limitation.

Although a conventional video camera may be used as a sensor in an OBR, such a camera may not be useable as a sensor in an OSR, due to the much larger amount of data that will typically be contained in optical signals compared to that contained in optical beacons. To handle the larger amount of data, in some embodiments, an OSR may be required to receive data from signal beams at much higher average data rates than OBRs will typically receive data from beacons. Specifically, signal-beam data rates on the order of 1 Mb/s or higher are contemplated. A video camera used as a sensor in an OSR operating at a data rate of 1 Mbit/sec would have to have a frame rate of at least 2 MHz. The highest frame rates provided by any conventional video cameras are on the order of 1 kHz, which is a factor of about 2000 too low.

As alluded to previously, an OCC configured in accordance with various embodiments allows an OR to receive both optical beacons and optical signals over a large FOV with a high data rate. Because it does not need to produce video imagery, such an OCC can receive optical signals at a much higher data rate than could be achieved using, e.g., a conventional video camera. It should be noted that in some embodiments optical transceiver assemblies may be utilized to provide a two-way optical communications capability. An optical transceiver assembly may comprise both an OTA and an ORA in a single device, allowing information in the form of optical beams to be both transmitted and received by the same unit. Optical communications systems in which optical transceiver assemblies are utilized may result in communications that can be characterized as being "asymmetrical" in that a bit rate for transmitting information from a portable user device, such as a smartphone, will likely be lower than that from a dedicated optical transceiver assembly mounted, e.g., on a building or vehicle, although the range of operation can be approximately the same. For example, a dedicated (or standalone) optical transceiver assembly may comprise a dedicated OTA in combination with a dedicated ORA that utilizes one or more high-frame-rate OCCs operative in one or more near-IR bands to receive both optical beacons and optical signals. This combination can result in an optical transceiver having a combined FOV over which both optical beacons and optical signals can be received, where the combined FOV coincides with the solid-angular region into which the dedicated OTA emits an optical beam.

Figure 4A:
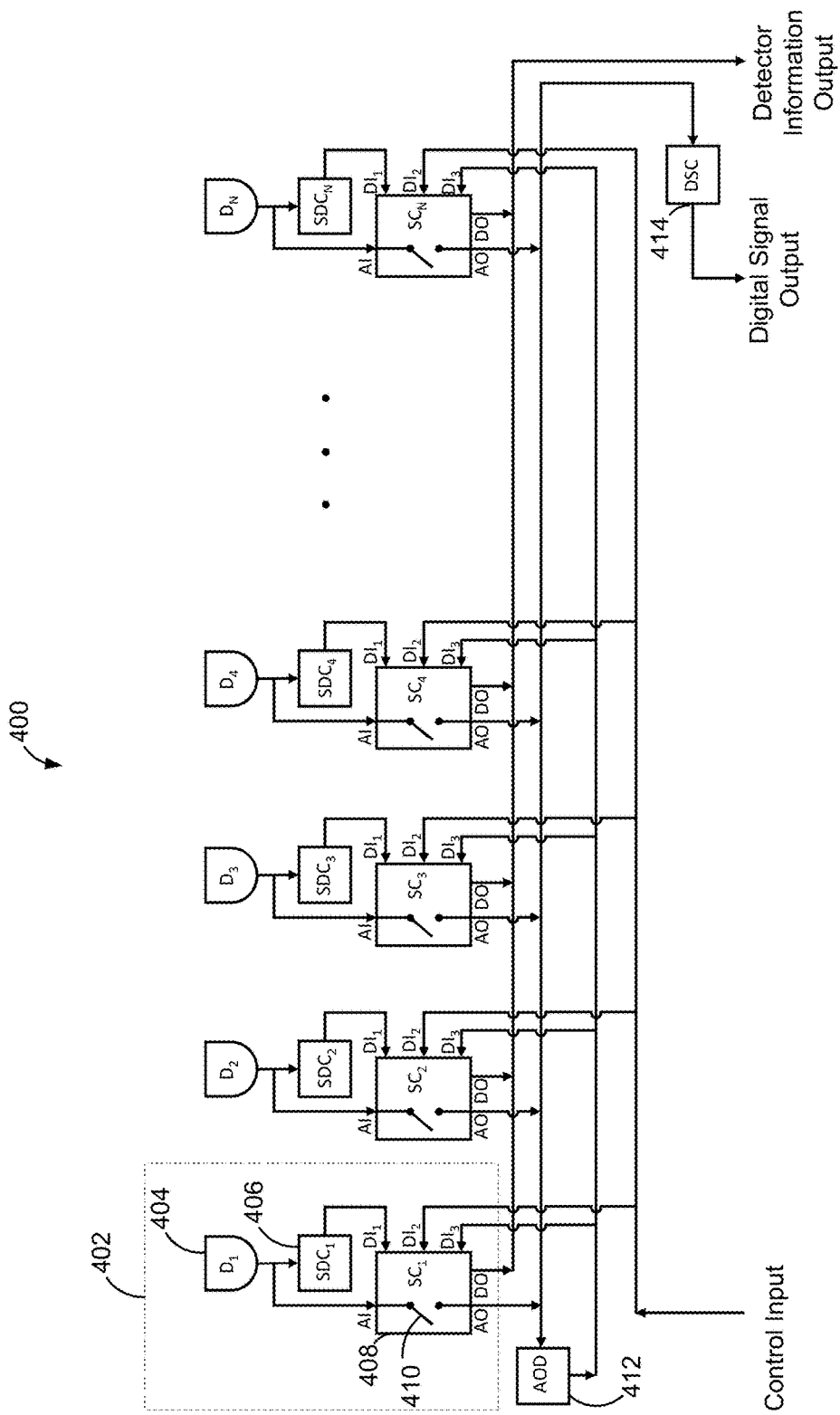
FIG. 4A illustrates an example adaptive communications focal plane array.

FIG. 4A illustrates a simplified schematic representation of an example functional block diagram of an ACFPA 400. For purposes of clarity, certain details have been omitted from the block diagram, although one of ordinary skill in the art would be aware of those details as well as their implementation in accordance with various embodiments. For example, electrical-power lines, clock lines, amplifiers, and automatic gain control (AGC) circuits have been omitted from FIG. 4A. It should be noted that the specific architecture represented in FIG. 4A is an example, and not intended to be limiting in any way. That is, various architectures for ACFPAs that can provide substantially the same or similar functionality are contemplated.

The ACFPA 400 of FIG. 4A may include a plurality (e.g., array) of switched-detector assemblies comprising a detector, e.g., one of $D_1$-$D_N$, a signal-discrimination circuit (SDC), e.g., one of $SDC_1$-$SDC_N$ and a switching circuit (SC), e.g., one of $SC_1$-$SC_N$. For example, one example switched-detector assembly 402 may comprise detector 404, SDC 406, and SC 408. It should be noted that FIG. 4A depicts a one-dimensional array of detectors/switched-detector assemblies for ease of illustration, although a 2D array is contemplated. As would be understood from the operation of ACFPA 400 described in greater detail below, feedback and switching mechanisms are utilized so that only those detectors receiving an optical signal from an OTA are enabled to output signals.

Considering one switched-detector assembly 402 of ACFPA 400, an output of detector 404 may be an analog signal, sampled at a frequency $f_D$ that may be at least twice the maximum desired bit rate at which optical beacon and optical signal data are to be received from OTAs. Although not depicted in FIG. 4A, it should be understood that the output of detector 404 can be amplified and can also be filtered to suppress frequencies outside the desired data bandwidth. The output of detector 404 can be referred to as an analog signal because the output of detector 404 as a function of time is a voltage (or current) that is a sampled monotonic (approximately linear) function of the optical flux incident on it as a function of time. However, it should be noted that when flux from an optical beacon or optical signal is incident on detector 404, this analog signal can include a sequence of pulses representing 1-bits and 0-bits, using a digital modulation scheme such as return-to-zero on-off keying (RZ-OOK).

The output from detector 404 is input into SDC 406. SDC 406 can analyze the output of its associated detector, i.e., detector 404, and determine whether or not it includes an optical data sequence (i.e., optically transmitted information comprising both an optical beacon and an optical signal) sent by an OTA. Upon a determination that the output of detector 404 does include such an optical data sequence, SDC 406 computes an estimate of the SNR of that optical data sequence. The output of SDC 406 at any given time is its current estimate in digital form of the SNR of the optical data sequence being received by detector 404. If SDC 406 does not detect an optical data sequence, the output of SDC 406 (i.e., a digital output) will have a value of zero.

Figure 4B:
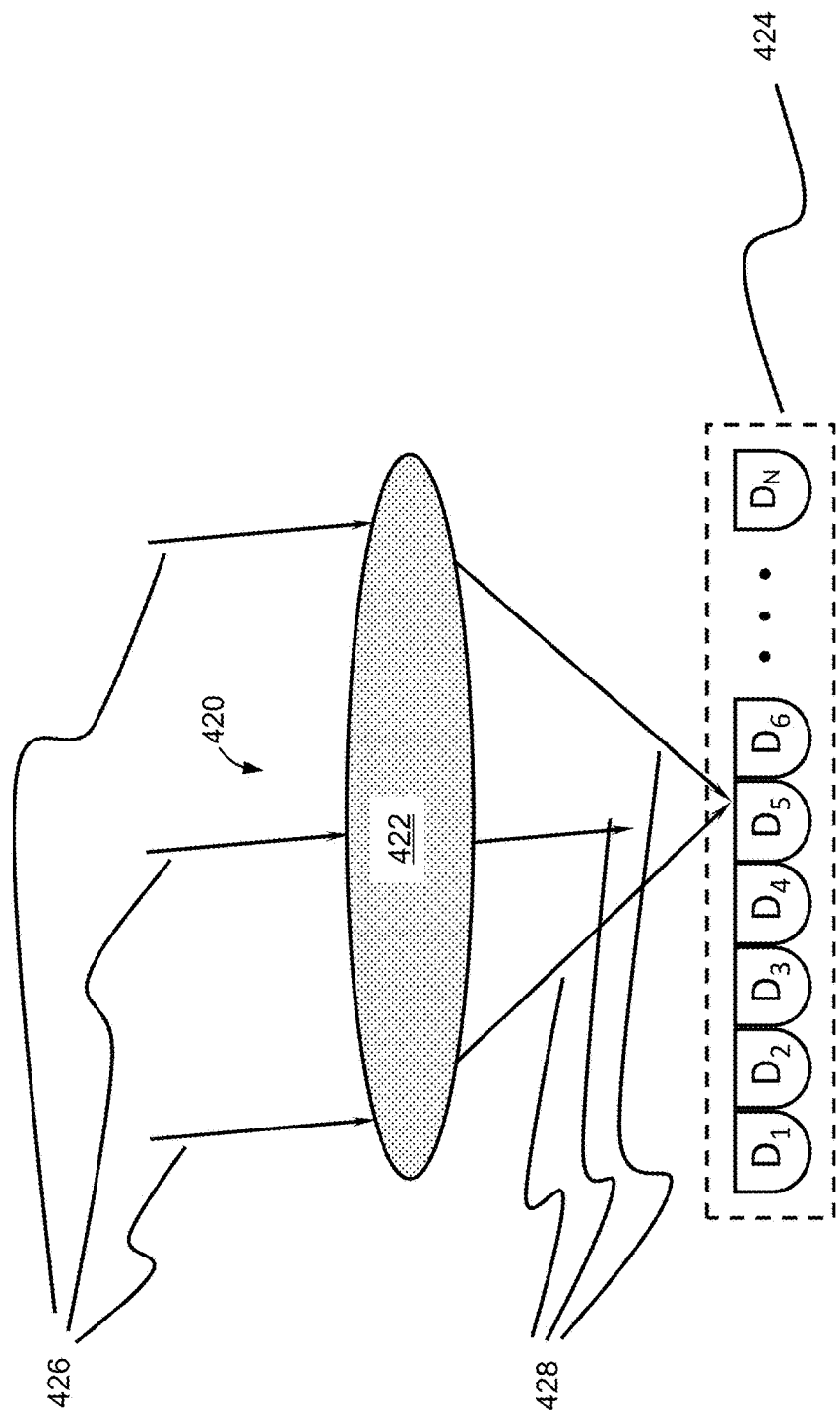
FIG. 4B illustrates an example optical communications camera in which an adaptive communications focal plane array is implemented.

FIG. 4B illustrates an example OCC 420 in which an ACFPA may be implemented in accordance with various embodiments. OCC 420 may comprise an imaging lens 422 and a detector array 424 that is part an ACFPA. OCC 420 may also include additional components, such as a narrow-band optical filter and/or baffles to reduce stray light. However, for purposes of clarity, such additional components have been omitted from FIG. 4B. Although depicted as a singlet lens in the figure, the imaging lens 422 can, in practice, more typically comprise multiple lens elements. In some embodiments, the imaging lens 422 may include one or more reflective optical components (not shown). Multiple individual detectors $D_1, D_2, \ldots, D_N$ comprising the detector array 424 can be arranged in a regular array (e.g., with equal spacing between each pair of adjacent detectors). These detectors are all components of an ACFPA, although the other components of the ACFPA have been omitted from FIG. 4B for purposes of clarity. The optically sensitive surface of each of detectors $D_1, D_2, \ldots, D_N$ in the detector array 424 may lie in the focal plane of imaging lens 422. Although the detector array 424 is depicted as a linear one-dimensional array, in some embodiments, a two-dimensional detector array can be used. FIG. 4B also depicts three parallel optical rays 426 representative of an incident collimated beam of modulated optical radiation produced by a single OTA located at a specific angular position within the FOV of OCC 420. The imaging lens 422 focuses this collimated beam, converting it to a converging beam. This converging beam is represented in FIG. 4B by the three converging optical rays 428, which converge to a small region located on the optically sensitive surface of the detector array 424. The three rays 428 representative of the converging beam may happen to intersect a small region located on the optically sensitive surface of detectors $D_1, D_2, \ldots, D_N$. However, collimated beams incident from different angular positions within the OCC's FOV can be focused by the imaging lens 422 to small regions at different locations on the optically sensitive surface of detector array 424, in such a way that there can be a one-to-one correspondence between positions on the optically sensitive surface of the detector array and angular positions within the OCC's FOV of OTAs transmitting modulated optical beams. Due to this one-to-one correspondence, the angular positions of OTAs within the FOV of OCC 420 can be determined from knowledge of the locations on the optically sensitive surface of detector array 424 to which optical beams produced by said OTAs are caused to converge by imaging lens 422.

Figure 5:
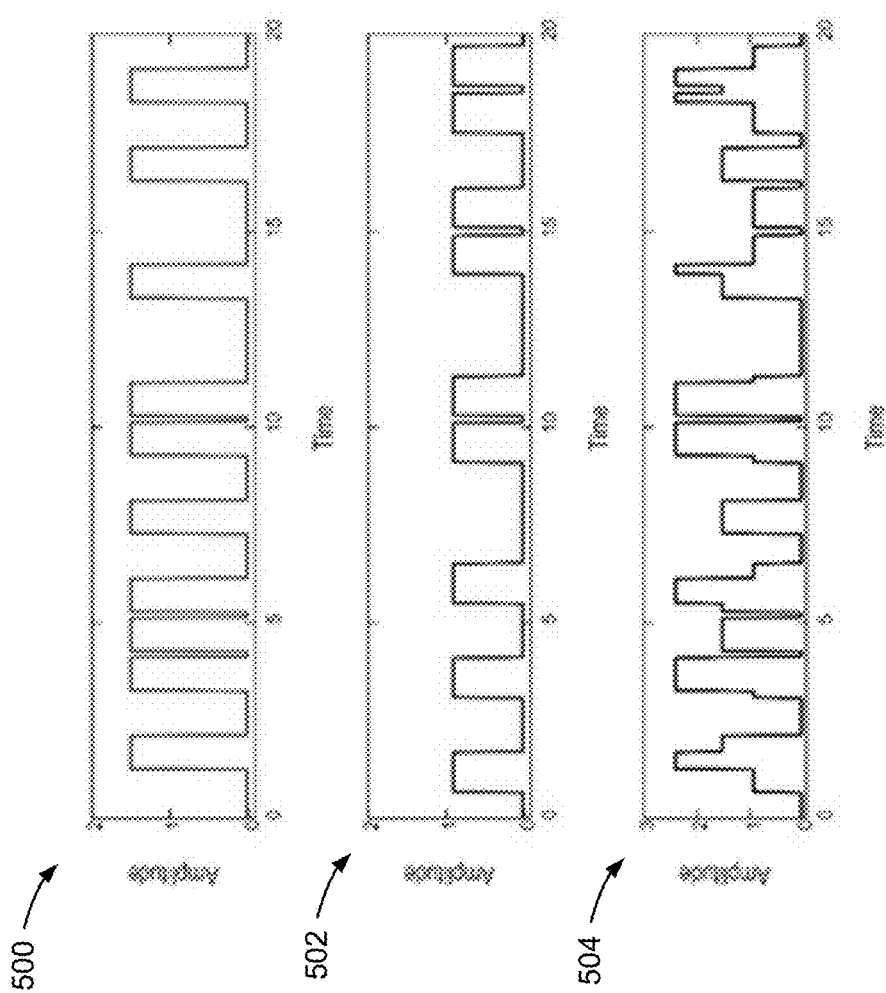
FIG. 5 illustrates example optical waveforms.

If the angular separation between two or more OTAs is sufficiently small, it may be that optical data sequences from two or more OTAs are simultaneously incident on a single detector. An SDC, e.g., SDC 406 (FIG. 4A), can detect this condition because the combination of two or more optical data sequences incident on a single detector may produce a characteristic amplitude as a function of time that differs from that produced by a single optical data sequence. The amplitude may, for example, have units of volts or amperes. We refer to the amplitude as a function of time output by a detector as a waveform. Referring now to FIG. 5, example waveforms produced by two different optical data sequences incident on two different detectors are illustrated, e.g., waveforms 500 and 502, along with the waveform 504 produced when the two optical data sequences that produced the waveforms 500 and 502 are incident on a single detector.

Individually, each of the two optical data sequences produces a waveform having two amplitude levels (e.g., waveform 500 reflects amplitudes of zero volts and approximately 1.5 volts and waveform 502 reflects amplitudes of zero volts and approximately 1 volt), whereas the combination of the two optical data sequences incident on a single detector produces the waveform 504 having four different amplitude levels (e.g., zero volts, approximately 1 volt, approximately 1.5 volts, and approximately 2.5 volts).

In some embodiments, an algorithm may be utilized for extracting the contents of multiple optical data sequences from the single waveform produced when those multiple optical data sequences are incident on a single detector. For example, when four different amplitude levels are determined to be present in a given waveform, such an algorithm could infer that two different optical data sequences contributed to producing the waveform. We refer to these four different waveform amplitude levels as levels 1, 2, 3, and 4, numbered in order from the lowest to the highest levels. We refer to the two OTAs that transmitted the two different optical data sequences as OTAs 1 and 2, where OTA 1 is assumed to be transmitting a weaker signal than OTA 2. All times for which the amplitude equals level 1 could then be considered to be times for which both optical data sequences transmitted by the two OTAs had optical output levels of zero (i.e., no optical flux was transmitted by either of the two OTAs at such times). All times for which the amplitude equals level 2 could be considered by the algorithm to be times at which OTA 1 was transmitting a non-zero optical output level and OTA 2 was not transmitting any optical flux. All times for which the amplitude equals level 3 could be considered by the algorithm to be times at which OTA 2 was transmitting a non-zero optical output level and OTA 1 was not transmitting any optical flux. All times for which the amplitude equals level 4 could be considered by the algorithm to be times at which both OTA 1 and OTA 2 were transmitting a non-zero optical output level. Using this method, the algorithm could separate the two optical data sequences from the single waveform produced by the combined sequences.

In some embodiments, the occurrence of multiple optical data sequences being incident on a single detector can be assumed to be an "invalid" condition that does not represent a detectable optical data sequence, in turn resulting in a digital output value of zero from SDC 406, as such a situation is relatively rare. In such a scenario, a notification may be generated informing a user that multiple OTAs are located too close together at a specified position within the OCC's FOV for the information transmitted by any of them to be received by the OCC. The user may then be informed that by repositioning the OCC or the device in which the OCC is implemented (e.g., by moving the OCC closer to the OTAs so that their angular separation within the FOV is increased), it may become possible for the information transmitted by some or all of the multiple OTAs to be received.

Returning to FIG. 4A, the output of each detector, for example, detector 404, is also input into an associated SC, e.g., SC 408. SC 408 is operative to control the flow of optical data sequences received by detector 404, output the location of detector 404 (in ACFPA 400) from which optical data sequences are currently being received, and output estimated SNR value for the particular optical data sequence currently being received by detector 404. An SC, e.g., SC 408 may have an analog input port (AI), which can receive the output of detector 404. SC 408 may also have three digital input ports, $DI_1$, $DI_2$, and $DI_3$, which are used to control the operation of a switch 410 of SC 408 in a manner that will be described later. SC 408 may have two output ports, one analog and one digital, labeled AO and DO, respectively. When switch 410 of SC 408 is on, the output from port AO is the output of detector 404 input into SC 408 via port AI. When switch 410 is off, there is no (analog) output from port AO. The purpose of output port DO is to output a location of, and estimated SNR as a function of time for, its associated detector, in this case detector 404.

The combined analog outputs from all the SCs, e.g., SC 408, are input into an analog output detector (AOD) 412. The output of the AOD 412 is fed back as an input into the respective $DI_3$ port of each SC. Whenever AOD 412 detects the presence of one or more analog signals being output by at least one of the SCs, AOD 412 outputs a voltage representing a digital 1-bit, which informs all of the SCs of ACFPA 400 that one or more SCs are currently switched on and are outputting a signal received from an OTA. Whenever AOD 412 does not detect the presence of any analog signals being output by one or more of the SCs of ACFPA 400, AOD 412 outputs a voltage representing a digital 0-bit, which informs all the SCs that none of the SCs are currently switched on.

The combined analog outputs from the SCs are also input into a digital-signal converter (DSC) 414. DSC 414 converts the signal pulses it receives into a stream of pulses representing 1-bits and 0-bits at a bit rate of $f_T$ (i.e., the rate at which the corresponding OTA is sending its optical data sequences). Due to the Nyquist-Shannon sampling theorem mentioned previously, the bit rate $f_T$ will be at least a factor of two slower than the sampling frequency $f_D$ of the analog signals from the detectors. DSC 414 is also responsible for scaling the 0-bits and 1-bits it outputs such that their voltage values fall within certain minimum and maximum voltage ranges, e.g., a 0-bit may have an allowed voltage of 0.0±0.1V and a 1-bit may have an allowed voltage of 1.5±0.1V. We assume at this point that if optical data sequences from more than one OTA are incident on any single detector, that condition will have been detected by the SDC associated with each such detector and that the outputs from all such detectors will have been suppressed by having the switches in their associated SCs turned off (or kept off) as a result of inputs (via the $DI_1$ input ports) of values equaling zero from their SDCs. However, when DSC 414 is simultaneously receiving optical data sequences from two or more detectors, it is possible in some cases that it is simultaneously receiving optical data sequences from more than one OTA. In other words, the previously described embodiment had to do with optical data sequences from more than one OTA being incident on a single detector. However, in this embodiment, the situation is considered when optical data sequences from two or more OTAs are being received by different detectors and the switches for those detectors have been turned on, so that two or more optical data sequences are simultaneously being sent to the DSC. When this happens, DSC 414 can determine that this is the case by analyzing the waveform being input to it to see if more than two amplitude levels are present, as seen, for example, in waveform 504 (FIG. 5). In such cases, DSC 414 can output a special error signal (e.g., to control electronics 106d and/or data interface 106e of FIG. 3A) letting the ORA know that more than one optical data sequence is present, so appropriate action can be taken, e.g., restarting the process of searching for new optical data sequences being received by detectors in the ACFPA. It should be noted that the total number of detectors used in an ACFPA may be considerably less than that used in a typical conventional video camera having a comparable FOV, since an ACFPA is not used to capture imagery. The reduced number of detectors may have the advantage of reducing the data processing requirements of an ACFPA.

Figure 6:
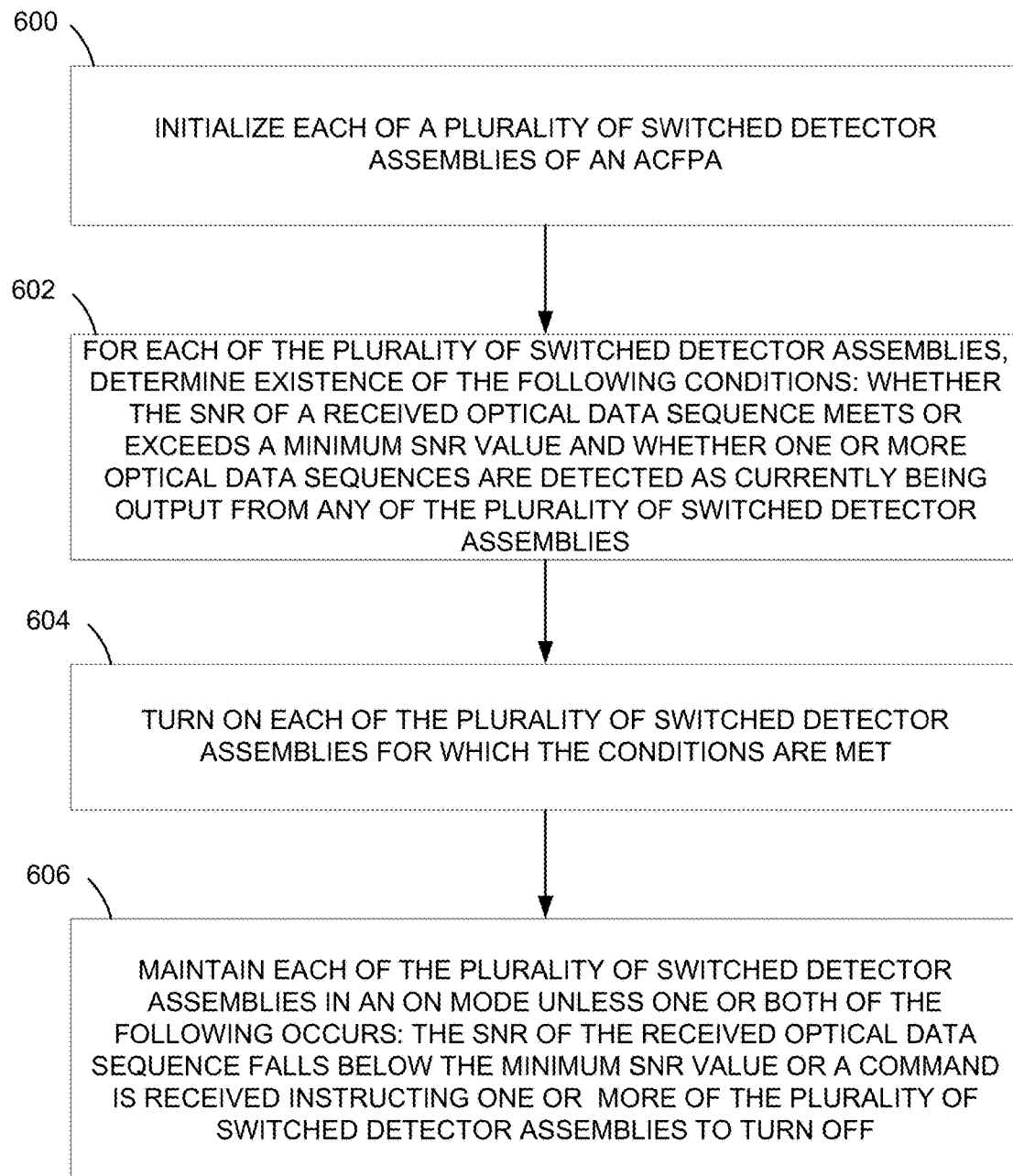
FIG. 6 is a flow chart illustrating example operations performed by an optical communications camera for selective switching of the adaptive communications focal plane array of FIG. 4A.

The aforementioned OCC having an ACFPA configured in accordance with various embodiments may be utilized as a combined optical receiver within an ORA, e.g., OR 106c within ORA 106 (FIG. 3A). FIG. 6 is a flow chart illustrating example operations of an ORA in accordance with various embodiments. At operation 600, an ORA, e.g., ORA 106, may begin receiving optical beacon data by sending ACFPA 400 an OBR-mode initialization command via the respective $DI_2$ ports of its SCs (e.g., $SC_1$-$SC_N$). This command causes each of the SCs' respective switches to be turned off, or to remain off if they already were off. Each SC may then begin to monitor its respective $DI_1$ and $DI_3$ input ports. At operation 602, for each of the plurality of switched-detector assemblies, the existence of the following conditions may be determined: whether the SNR of a received optical data sequence meets or exceeds a minimum SNR value; and whether one or more optical data sequences are detected as currently being output from any of the plurality of switched-detector assemblies. The switch within each SC remains off until/unless both of the following two conditions are simultaneously met: the digital value of the estimated SNR input to the SC via its $DI_1$ port is greater than or equal to a minimum SNR value, designated as $SNR_{min}$; and the input provided by AOD 412 via the $DI_3$ port is a 0-bit, meaning no optical data sequence has yet been detected by the AOD 412 since the last occurrence of an OBR-mode initialization command. The value of $SNR_{min}$ can be chosen to provide at least a minimum required signal quality for optical data sequences received by the ORA.

At operation 604, when both of the above-noted conditions are simultaneously met for a given SC, the SC is put into an on mode, i.e., the SC's switch is turned on. That SC may then output, via its DO port, the position of its associated detector in the detector array, as well as the estimated SNR of the signal being received by that particular detector. At operation 606, each of the plurality of switched-detector assemblies is maintained in an on mode unless one or more of certain conditions exist. That is, an SC that has been turned on in this manner will be kept on until/unless one or both of the following two conditions are met: the digital value of the estimated SNR input to the SC via its $DI_1$ port is less than the minimum SNR value, $SNR_{min}$; and/or a command is received, via its $DI_2$ port, that puts the SC into an off mode, i.e., an operational mode in which it is required to turn its switch off. As long as neither of the these two conditions are met, the switch of the corresponding SC remains on. It should be noted that the SC remains in the on mode despite the fact that the AOD signal input via the $DI_3$ port will have become a 1-bit shortly after the switch turned on, due to the AOD 412 having detected the condition that the switch is turned on. However, once the AOD 412 has started outputting a 1-bit, it will prevent the switches in all the other SCs from turning on, unless one or more new commands from the ORA result in one or more of those other switches being turned on.

It should be appreciated that in most cases, no more than one of the SC switches should be turned on at this point. This is because the first switch to turn on causes a 1-bit to be sent by the AOD 412 to the $DI_3$ ports of all the other SCs, thereby preventing them from turning on. However, it may be possible (in rare instances) for two or more SCs to turn their switches on simultaneously. Such a condition is detectable because the detector location and estimated SNR information output from more than one SC via their respective DO ports will overlap in time and will therefore be garbled. To remedy this situation, the ORA controlling the ACFPA will start over by sending a new OBR-mode initialization command to the $DI_2$ ports of the SCs. In some embodiments, an ACFPA may be configured to receive more than a single optical data sequence at the same time, in which case, the switching of SCs/switched-detector assemblies can be appropriately modified for multi-channel operations (discussed in greater detail below).

If no SC switches turn on immediately following an OBR-mode initialization command, the ORA controlling the ACFPA will be cognizant of this scenario because the ORA will not have received information from any of the DO ports after waiting for some defined time interval (e.g., several microseconds). Such a scenario suggests that no optical data sequences having sufficiently high SNRs to be readable (i.e., SNRs equal to or greater than $SNR_{min}$) exist within the FOV of the OCC. The ORA can report this state or status to a user in some appropriate manner. For example, a notification indicating that "No optical transmitters currently within range" may appear on the user's display screen.

When one (and only one) SC switch turns on, the ORA can save the information that is output by the DO port of the SC in which the switch has turned on. This information is indicative of the location relative to the other detectors in the ACFPA of the detector associated with the SC switch that turned on, as well as the estimated SNR of the optical data sequence being received by said detector. At this point, the ORA will begin receiving and analyzing the optical data sequence output in digital form by DSC 414. Signal analysis of this data is then performed to extract optical beacon information in order to obtain the identifying information associated with the OTA transmitting the optical data sequence.

In some embodiments, an ORA may also enhance the signal strength of an optical data sequence (while continuing to receive the optical data sequence from the one detector whose SC switch is currently turned on) in order to minimize the bit-error rate. In some embodiments, detectors in neighboring switched detector assemblies may also be receiving the same optical data sequence that is being received from an OTA by the one detector whose SC switch is currently turned on. To accomplish this signal strength enhancement, the ORA may sequentially send (via control input 416 (FIG. 4A) commands known as SNR-estimate requests (SERs) individually addressed to each SC whose associated detector is located within a blur circle centered on the detector from which optical data is already being output.

The blur circle is a characteristic of the imaging lens in the OCC (e.g., imaging lens 422 of OCC 420 of FIG. 4B). Due to both optical aberrations and diffraction, the imaging lens 420 may not focus a perfectly collimated incident beam onto a single point. Rather, the optical flux from a perfectly collimated incident beam will be distributed over a small region in the focal plane of the lens. The distribution of this optical flux in the focal plane is referred to as the point-spread function (PSF) of the lens. It should be noted that the functional form of the PSF can vary with incidence direction of the collimated beam due, for example, to variation of off-axis aberrations with incidence direction. Once the PSF is known for a given incidence direction, the blur circle can be defined as the smallest circle that contains inside it a certain fraction (e.g., 80%) of the total optical flux transferred to the focal plane from a beam having that incidence direction. The diameter of the blur circle can be a measure of the size of the PSF of the OCC's imaging lens. To account for variations of the PSF with incidence direction, the value of this diameter can vary with position. In some embodiments, a blur ellipse can be used instead of a blur circle, and values of the semimajor axis, semiminor axis, and angular orientation of the ellipse can vary with position in the focal plane to account for spatial variation in the size and shape of the PSF. Each SC may have a unique address, which allows any SER sent to a specific SC to be ignored by all the other SCs. When an SC receives an SER that has been addressed to it, it can output a current SNR estimate received from its corresponding SDC via the DO port. If this estimate is greater than or equal to $SNR_{min}$, it can turn its switch on so that the analog output from its associated detector is added to the analog output that is already being sent to the DSC 414.

In cases where a new optical data contribution is being received from a different OTA other than the one from which an optical data sequence is already being received, the DSC 414 will detect this condition (e.g., as discussed previously, by examining the waveform to see if there are more than two voltage levels) and output an error signal to the ORA. The ORA may then send a disconnection request addressed to the SC switch that has just been turned on, commanding it to turn off. Any SC switch that has been turned on as a result of SERs can automatically turn off whenever it receives from its SDC an estimated SNR value that falls below $SNR_{min}$. The ORA can repeat the procedure of sending SERs to the SCs whose detectors are within the blur circle or blur ellipse until requests have been sent to all such SCs. By this time, multiple SCs may have been switched on and may be simultaneously transmitting optical data sequences originating from a single OTA to the DSC 414. The ORA can continue monitoring the digitaloutput from the DSC 414 to search for optical beacon information, e.g., information identifying the OTA. In some embodiments, estimated SNR information it has received as responses to SERs can be stored.

To adjust for changes as a function of time of the angular position within the OCC's FOV of the OTA from which an optical data sequence is currently being received, the ORA can periodically carry out a signal-recentering procedure (SRP). In accordance with one embodiment, an estimate of the current position in the focal plane of an optical data sequence received by/incident on ACFPA 400 is computed from the SNR estimates obtained from the most recent series of SERs. After computing this position estimate, the SNR estimates used in computing it can be deleted. The ORA may then issue new SERs to all SCs whose detectors are within the blur circle/blur ellipse centered on the new estimated position of the optical data sequence being received. If necessary, the diameter of the blur circle, or shape/orientation parameters of the blur ellipse, will be adjusted as a function of the new estimated position, based on a priori knowledge of how the blur-circle diameter or shape/orientation parameters of the blur ellipse vary with position in the focal plane. If the OTA from which data are being received has moved within the FOV, the SRP can result in the switches associated with one or more new detectors being turned on such that the outputs from these detectors are now contributing to the combined analog detector outputs being sent to the DSC.

Similarly, changes in the position of the OTA within the FOV may result in the switches associated with one or more detectors being turned off, due to their estimated SNR values no longer being above the minimum value of $SNR_{min}$. The estimated SNR information received as a result of all the SERs sent during the SRP can be temporarily saved in memory for use in estimating the focal-plane position of the optical data sequence during a subsequent SRP. The SRP may be repeated as often as necessary to keep as many SC switches as possible turned on for detectors receiving the optical data sequence with estimated SNR values above the minimum value.

As noted above, OBRs receive optical beacons in order to detect the presence of, determine the angular location of, and identify OTAs. A waveform of an optical beacon designed to be received by OCCs can comprise a series of consecutive optical pulses at a data rate $f_T$ (e.g., 1 MHz), where the pulses represent identifying information. It should be noted that identifying information having such a format is referred to herein as a transmitter identification dataset (TID). An OTA can transmit at regular time intervals an optical beacon in the form of a TID. Between this periodic transmission of TIDs, the OTA can transmit optical signal data, which may also take the form of a series of consecutive optical pulses. In most cases the optical signal data would be transmitted at the same data rate as the optical beacon data (i.e., the TID), although it would not necessarily have to be transmitted at the same data rate. The TID can include the name of the entity (e.g., person, business, or organization) operating the OTA, as well as one or more categories (e.g., restaurant, supermarket, car dealership, private residence) associated with and/or are indicative of the entity.

Figure 7:
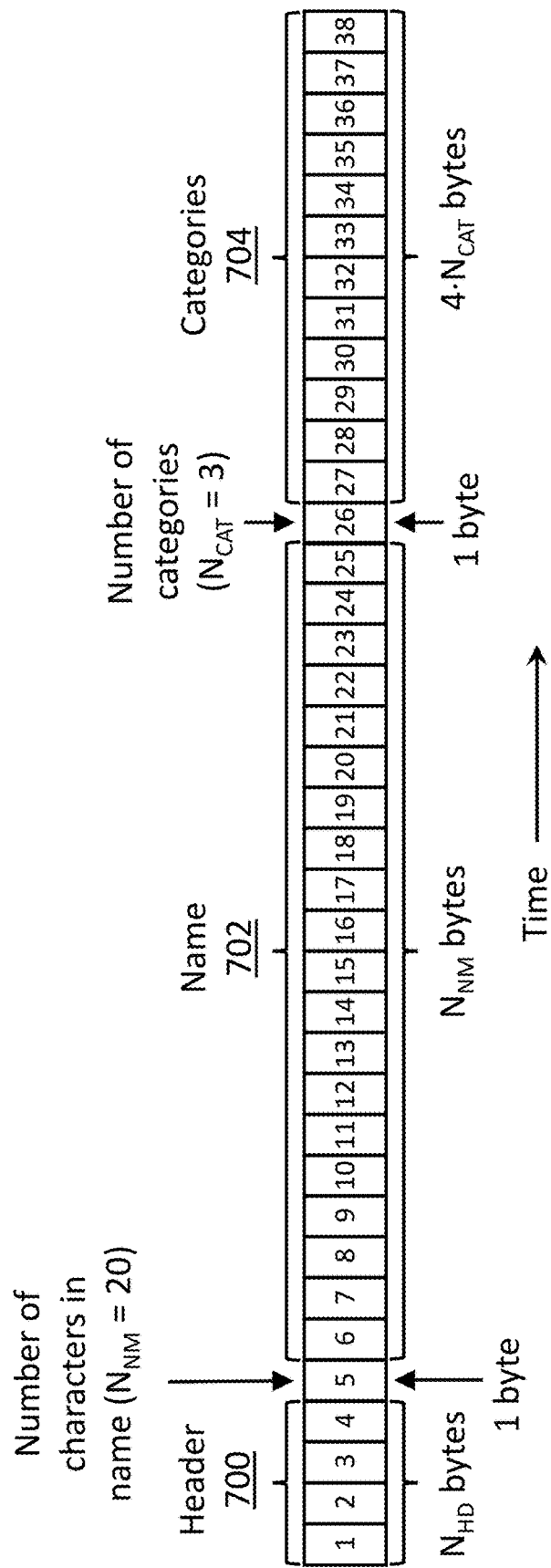
FIG. 7 illustrates an example transmitter identification dataset format.

FIG. 7 illustrates an example TID format that is not intended to be limiting. Other formats are contemplated in accordance with other embodiments. FIG. 7 illustrates that a TID may comprise a series of 38 optically transmitted 8-bit bytes, where the numbering of the bytes are indicative of the order in which the bytes are transmitted. The first $N_{HD}$ bytes may define a unique header that tells an OBR it is about to receive, e.g., name and category information from an OTA. In this example, the header may be 4 bytes, e.g., $N_{HD}=4$. The byte immediately following the header can represent the number of characters, $N_{NM}$, in the name of the entity associated with the OTA. Since it is an 8-bit binary number, the name can have as many as 255 characters. In the illustrated example, $N_{NM}=20$, i.e., a 20-character name is being used. Accordingly, the next $N_{NM}$ bytes in the sequence provides the characters of the name. Each byte can be used to represent a single character, using a coding scheme that is, for example, similar to the American Standard Code for Information Interchange (ASCII) character encoding standard. Since each byte has 256 possible values, this allows as many as 256 different characters to be used, including, for example, 26 lowercase letters, 26 uppercase letters, a blank space, the numerals 0 through 9, and up to 193 additional characters (e.g., punctuation marks and accented characters).

Following the bytes representing the name, a single byte can be used to encode the number, $N_{CAT}$, of categories included in the TID. In this example, $N_{CAT}=3$. Since $N_{CAT}$ is represented as an 8-bit binary number, as many as 255 different categories can be included in a single TID having this format. In the example of FIG. 7, a total of 4 bytes (i.e., 32 bits) is devoted to each category, which means as many as $2^{32}=4.3\times10^9$ distinct categories can be defined. Since $N_{CAT}=3$, a total of $4 \cdot N_{CAT}$ bytes, i.e., 12 bytes, are used to represent the categories in this example.

After the presence of an optical data sequence has been detected, and while periodically updating changes in its location, the optical data sequence can itself be monitored by the ORA until a complete TID has been found within it. The identifying information contained in the TID can be extracted. This identifying information, along with the latest estimate of the position of the OTA within the FOV, can be displayed on the display screen of the device with which the ORA is associated (e.g., a smartphone). It should be noted that a symbol can be overlaid at the position of the OTA on real-time output video imagery produced by the device's resident visible-light camera. For example, the symbol may be used to augment the real-time video imagery in an augmented reality presentation. At the user's discretion, the name and/or category information may also be displayed near the symbol. The type of symbol used may reflect one or more categories obtained from the TID. For example, a representation of a fork and spoon could be used as a symbol for a restaurant. The position of the symbol and name/category information in the display will be updated periodically as necessary to properly account for changes in the position of the signal within the FOV of the OCC. When the user pans the display (e.g., by pointing the device in a different direction) and/or zooms in or out, the position of the symbol and name/category will also be adjusted so that it stays in the correct location with respect to the displayed real-time imagery produced by the visible-light camera.

Once the identifying information contained in the optical beacon transmitted by the first OTA has been extracted and displayed to the user (e.g., overlaid on the real-time video feed from the device's video camera), the ORA can search for, detect, and extract identifying information from the optical beacon transmitted by a second OTA in the same manner as described above, beginning with sending a new OBR-mode initialization command to the ACFPA 400 (FIG. 4A). However, while searching for, detecting, and extracting identifying information from the second OTA's optical beacon, the output of optical data being sent by the first OTA is suppressed. This suppression can be achieved by sequentially sending a turn-off and keep off (TOKO) command addressed to each SC associated with detectors inside the blur circle/blur ellipse centered on the current location in the focal plane of the optical data sequence being sent by the first OTA. If an SC's switch is on, the TOKO command will turn it off and prevent it from being turned back on until it receives a cancel-TOKO (CTOKO) command. If an SC's switch is already off, the TOKO command will prevent it from being turned on until it receives a CTOKO command. The CTOKO command will not itself turn a switch on, but will put an SC to which it is addressed into a state by which other commands (e.g., SERs) will be capable of turning its switch on. Although the TOKO commands will cause all the switches within the blur circle/blur ellipse to be maintained in an off state or mode, the focal-plane position corresponding to data being sent by the first OTA will continue to be monitored and updated by periodically sending SERs to SCs associated with detectors within the blur circle/blur ellipse centered on the current estimated focal-plane position of the optical data sequence being sent by the first OTA.

Due to the previously-sent TOKO commands, these SERs will not be capable of causing any switches to be turned on, but will still provide SNR estimates for the optical data sequence being received by detectors within the blur circle/blur ellipse, thereby allowing updated estimates of the location in the focal plane corresponding to the first OTA to be obtained. Each time the location of the first OTA has been updated in this way, TOKO commands can be sent to all SCs whose detectors were not inside the blur circle/blur ellipse centered on the previous location, but are now inside the blur circle/blur ellipse centered on the updated location. Conversely, CTOKO commands can be sent to all SCs whose detectors were inside the blur circle/blur ellipse centered on the previous location, but are not inside the blur circle/blur ellipse centered on the updated location. The updated location information obtained for the OTAs can also be used to keep the positions of the symbols representing these OTAs up-to-date on the real-time augmented reality presentation on the user's device.

Figure 8:
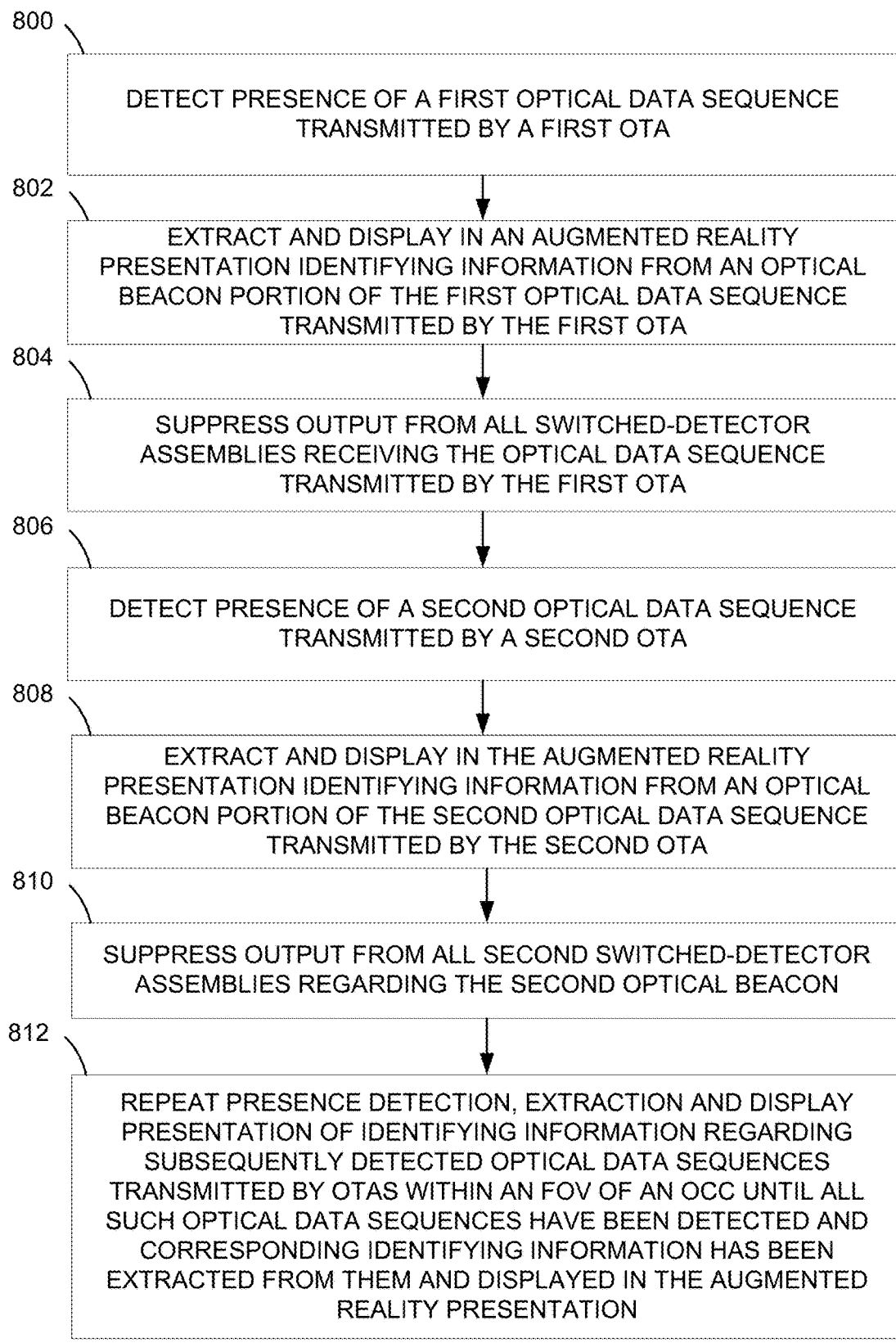
FIG. 8 is a flow chart illustrating example operations performed by an optical communications camera for processing optical beacons and suppressing optical beacon output.

FIG. 8 illustrates example operations for processing and suppressing optical data sequences for the purpose of extracting identifying information transmitted by OTAs in accordance with various embodiments. At operation 800, as described above, the presence of a first optical data sequence transmitted by a first OTA can be detected. At operation 802, identifying information associated with the first OTA is extracted from the optical beacon portion of that OTA's optical data sequence and displayed in an augmented reality presentation. At operation 804, output is suppressed from all the switched-detector assemblies that are receiving the optical data sequence transmitted by the first OTA. At operation 806, as soon as suppression of outputs from the first OTA and periodic updating of its focal-plane location has commenced, an optical data sequence from a second OTA can be detected in accordance with the above-described operations. Once optical data from the second OTA has been detected, its location can be overlaid as a symbol at the appropriate location in the augmented reality presentation. At operation 808, the associated identifying information can be extracted from the TID of the optical beacon transmitted by the second OTA. Some or all of this identifying information, depending on the user's preferences, can be displayed near the symbol representing the second OTA. It should be noted that no command will be capable of turning on SC switches that are currently deactivated due to their having received TOKO commands. The previously-discussed OBR-mode initialization command, for example, will have no effect on such deactivated switches.

Once the second OTA has been detected and located, and its identifying information has been extracted from its TID, the output of all optical data transmitted by the second OTA will also be suppressed at operation 810, and its location periodically updated using the same method described above. While this is happening, the output of all optical data transmitted by the first OTA will continue to be suppressed and its location periodically updated. Once the outputs from both the first and second OTAs have been completely suppressed, an optical data sequence transmitted by a third OTA can be detected, located, and processed to extract identifying information using the previously-described procedure. This procedure can then be repeated indefinitely after it has been performed for the third OTA, until it has been done for all OTAs within the FOV that are sending optical data sequences having detectable SNR levels.

That is, at operation 812, presence detection, extraction and displaying of identifying information obtained from subsequently detected optical data sequences transmitted by OTAs within the FOV of the OCC is repeated until all such optical data sequences have been detected and corresponding identifying information has been extracted and displayed in the augmented reality presentation. That is, this process of suppressing the output of previously detected optical data sequences and periodically updating their locations, while searching for the next new optical data sequence will continue until all OTAs that are transmitting optical data sequences having detectable SNR levels within the FOV have been detected, located, had their identifying information extracted from their TIDs, and had their locations and (optionally) identifying information overlaid on the displayed real-time visible light camera imagery. When all the optical data sequences having detectable SNR levels have been found, the next OBR-mode initialization command sent to the ACFPA 400 will fail to cause any switches to be turned on. When this occurs, the ORA will relay this information to the user by overlaying an appropriate message on the display, such as "All optical transmitters have been detected." Once the ORA determines that no more detectable optical data sequences are present within the FOV, it will stop the OBR process of searching for more such data sequences. However, until further commands are received from the user, it will continue suppressing the output of optical data sequences that have already been detected, while periodically updating their locations and refreshing the locations in the augmented reality presentation on the user's device.

It should be noted that the above-described process of detecting, locating, and extracting identifying information from all optical data sequences that have detectable SNR levels will typically require only a fraction of a second to complete. As an example, in a scenario where a total of 30 detectable optical data sequences are present within the FOV of the OCC, each of the data sequences may have a bit rate of $f_T$=1 MHz and use 38-byte TIDs with 8 bits/byte, as depicted in FIG. 7 and described above. The duration of a single TID is therefore (8 bits/byte)×(38 bytes)×(1 μs/bit)=304 μs. Assuming each OTA outputs optical data sequences having a ratio of optical-beacon bytes to optical-signal bytes of approximately 2%, an OTA may retransmit its TID every 304 μs/2%=15.2 ms, with optical signal data being transmitted between each transmission of the TID. In one embodiment, it should take, at most, 15.2 ms to detect a single optical beacon and read its TID. However, on average it should only take half that amount of time. Therefore, on average, the total time required for the ORA in OBR mode to detect, locate, and extract identifying information from all 30 signals can be approximately 30×0.5×15.2 ms=0.228 s. It should be noted that the above timing and calculations are just one example of the time needed to process optical beacons in accordance with various embodiments.

Once the above-described OBR process has been completed, the user may be prompted to initiate an OSR process for any one of the detected OTAs. The purpose of the OSR process is to receive (i.e., output from the ACFPA and store) information contained in optical signals transmitted by OTAs. As discussed above, an optical data sequence transmitted by an OTA contains both optical beacon data and optical signal data. The optical beacon data may take the form of a series of pulses containing identifying information (e.g., a TID) transmitted repeatedly at regular time intervals. The optical signal data may be interspersed between these repeated transmissions of optical beacon data.

Figure 9:
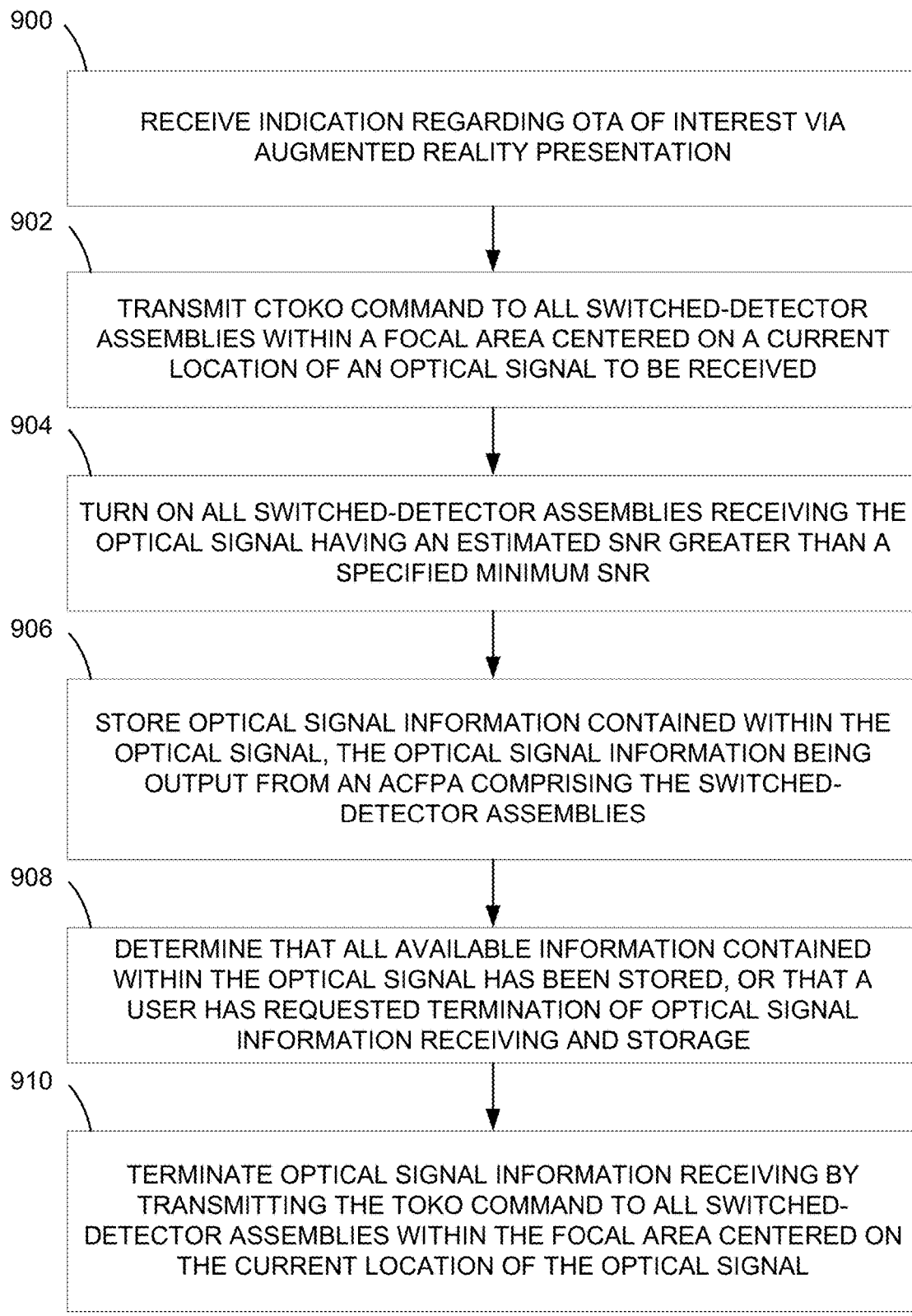
FIG. 9 is a flow chart illustrating example operations performed for obtaining optical signal information from an optical signal.

FIG. 9 illustrates example operations that can be performed to obtain optical signal information from an optical signal in accordance with various embodiments. At operation 900, an ORA may receive an indication regarding an OTA of interest via an augmented reality presentation. For example, a user may select, e.g., by touching the symbol of an OTA on the real-time display (displaying the augmented reality presentation) representing the OTA from which the user wants to receive and store optical signal information. At operation 902, the ORA may send CTOKO commands to all the SCs associated with detectors within a focal area, e.g., blur circle/blur ellipse, centered on the most up-to-date estimate of the location of the optical signal to be received (e.g., the location in the focal plane corresponding to the position within the OCC's FOV of the OTA from which the optical signal is to be received).

At operation 904, all switched-detector assemblies receiving the optical signal having an estimated SNR greater than a specified minimum SNR are turned on. That is, SERs may be sent to each of the aforementioned SCs so that all the SC switches for detectors receiving the selected optical signal that have estimated SNR values greater than $SNR_{min}$ are turned on. This causes the optical signal information contained in that optical signal to be output from the ACFPA via its digital signal output (e.g., ACFPA 400 of FIG. 4A). It should be noted that optical beacon data can also be output at this step, because the optical data sequence being received from an OTA contains both optical beacon data and optical signal data. However, due to the unique format of the optical beacon data (e.g., TIDs), the ORA will be able to differentiate between optical beacon data and optical signal data in the data stream being output from the ACFPA, and will therefore be able to disregard the optical beacon data. At operation 906, the ORA stores the optical signal information contained in the output from the ACFPA, while disregarding (i.e., not storing) the optical beacon information. The optical signal data is then made available to the user in a convenient form. For example, a media player on the user device may be enabled allowing optical signal information in the form of multimedia content to be consumed.

It should be noted that while the aforementioned optical signal information is being output and stored, SRPs as described above are performed at regular time intervals to ensure that as many detectors as possible that have estimated SNR values above the minimum value are contributing to the signal information being output. While this is happening, the focal-plane positions corresponding to detected optical data sequences other than the one from which the optical signal is currently being output and stored will continue to be updated in the manner discussed previously, while the output of said optical data sequences continues to be suppressed.

An optical signal transmitted by an OTA may be either repeating or non-repeating. In the former case, the same optical signal data is transmitted multiple times at regular time intervals over an indefinite period of time. In the latter case, new information is continually being transmitted in the form of an optical signal. An example of a repeating optical signal is information about a store (store hours, product listing, product pricing, etc.) transmitted repeatedly throughout the day by an OTA mounted outside of the store. An example of a non-repeating optical signal is a one-time transmission of a live-streamed video of an ongoing entertainment event transmitted by an OTA mounted outside an entertainment venue.

When a repeating optical signal is being received, it is useful to provide a way for the ORA to determine when all the available optical signal data has been received from an OTA, so that the ACFPA may then be made available for use in receiving optical signal data from another OTA. This can be accomplished in many different ways. For example, a binary code sequence, referred to herein as an end code, may be inserted at the end of all optical-signal datasets that are intended to be transmitted repeatedly by OTAs. This end code can mark the end of one instance of transmitting the dataset and the beginning of the next instance of transmitting it. It may have a unique format that allowing it to be unambiguously recognized as an end code by the ORA. The end code may also provide information regarding the total size (e.g., in units of bytes) of the repeating dataset, so that the ORA is able to determine when the entire dataset has been received. The ORA may monitor the optical signal that it is currently receiving until it detects the presence of the end code and extracts the total size of the optical-signal dataset. This tells the ORA that transmission of the full dataset is about to begin again. It also tells the ORA how much more optical signal data it must receive before it has received the entire optical-signal dataset. Upon receipt of an end code, the ORA may also provide an estimate to the user of the time remaining until the entire optical signal will have finished being received. This estimate may be computed by dividing the remaining amount of data to be received (e.g., in units of bytes) by the rate at which the data is being received (e.g., in units of bytes per second). Once the ORA has determined that the entire optical-signal dataset from a particular OTA has been received, it can stop receiving further optical-signal data from that OTA and inform the user that the complete optical signal has been received from that OTA. It may also use the information provided by the location of the end code in the data sequence to reorder the optical signal data, by placing the portion of the data received after receiving the end code, which comprises a first portion of the optical signal data, in front of the portion received before receiving the end code, which comprises a second portion of the optical signal data.

When a non-repeating optical signal is being received, it is useful to provide the ORA with a way to recognize that the signal is non-repeating and that it may therefore continue to be transmitted for an indeterminate time interval. This can be done in many different ways. For example, a binary code sequence, referred to herein as a non-repeat code, can be included at regular time intervals (e.g., every 15 seconds) in all non-repeating optical signal data transmitted by OTAs for the purpose of informing ORAs receiving the data that it is non-repeating optical signal data. Such a non-repeat code may have a unique format allowing it to be unambiguously recognized as a non-repeat code by the ORA. The non-repeat code may also provide other useful information, such as the time at which the transmission of the current optical signal began. Upon encountering a non-repeat code in an optical signal, an ORA may make the user aware of the fact that the optical signal currently being received is a non-repeating optical signal. The user may also be made aware of the time at which transmission of the optical signal began, as well as any other information provided as part of the non-repeat code. When transmission of a non-repeating optical signal is terminated, a termination code may also be provided. This may include a binary code sequence having a unique format that unambiguously indicates that transmission of the non-repeating optical signal has terminated.

At operation 908, an ORA either determines that all the information available from a first optical signal selected by the user has already been stored, e.g., based on the methods described above utilizing end codes for repeating optical signals or termination codes for non-repeating optical signals, or receives from the user a command to end the process of storing information from that optical signal. This results in operation 910, in which a TOKO command is sent to each of the switched-detector assemblies associated with detectors within a focal area, e.g., blur circle/blur ellipse, centered on the most up-to-date estimate of the focal-plane location of the optical signal. This will turn off all the switches in SCs associated with any detectors that had been receiving the first optical signal, thereby terminating the receipt of any further information from that signal. The ORA will continue keeping all the previously detected optical data sequences suppressed while periodically updating their positions, as described previously. The user may then have the option of selecting a second optical signal for which an OSR process is to be initiated. Information contained in this second optical signal can be output from the ACFPA and stored, using the same method described above. The same procedure can be used to output and store information, e.g., sequentially, from any or all of the optical signals associated with OTAs detected during the OBR process.

Previously-described ACFPAs in accordance with various embodiments have one digital output channel (referred to as "digital signal output" in FIG. 4A). Accordingly, an ACFPA configured in the above-described manner is capable of outputting and storing only one optical signal at a time. To allow more than one optical signal to be output and stored simultaneously, additional digital output channels can be added to an ACFPA. An ACFPA that has more than one digital channel for outputting optical signals can be referred to as a multi-channel adaptive communications focal-plane array (MCACFPA).

Figure 10:
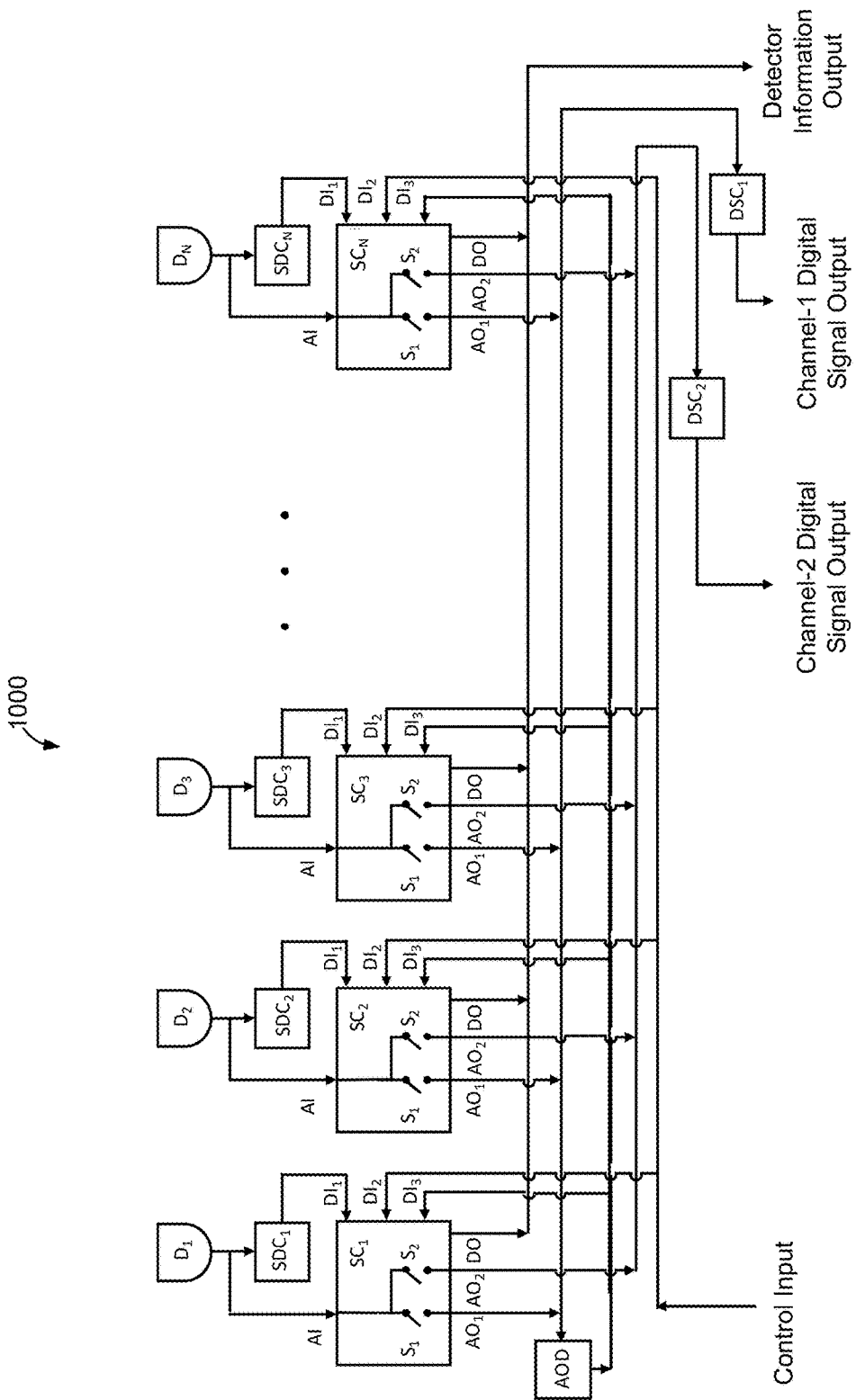
FIG. 10 illustrates an example multiple-channel adaptive communications focal plane array.

FIG. 10 illustrates an example schematic representation of an MCACFPA in accordance with various embodiments. It should be noted that other configurations are contemplated having the same or similar functionality described herein. The example MCACFPA 1000 illustrated in FIG. 10 is depicted as a dual-channel adaptive communications focal-plane array (DCACFPA), which is a special case of an MCACFPA that provides two output channels. However, adaptation to three or more output channels is contemplated and could be performed by one of ordinary skill in the art. As is the case for a single-channel ACFPA, the MCACFPA 1000 utilizes N detectors ($D_1$, $D_2$, . . . , $D_N$), the outputs of which are input into SDCs, represented as the $SDC_1$, $SDC_2$, $SDC_3$, . . . , $SDC_N$, which operate in the same way as the SDCs in the single-channel ACFPA illustrated in FIG. 4A/4B and described above. The detector outputs are also input into SCs, labeled $SC_1$, $SC_2$, . . . , $SC_N$. Unlike the single-channel ACFPA, however, each SC contains, e.g., two switches, rather than just one, e.g., switches $S_1$ and $S_2$ in the DCACFPA of FIG. 10. In some embodiments, the number of switches in each SC may equal the number of its output channels. In the DCACFPA of FIG. 10, the switches labeled $S_1$ and $S_2$ in each SC control the detector outputs sent to the output channels 1 and 2, respectively. Since each SC in an MCACFPA contains more than one switch, any switch-controlling command (e.g., a TOKO command) sent to any SC must specify which of its switches the command applies to. For example, a channel-1 TOKO command sent to an SC would cause the switch $S_1$ in that SC to be turned off (or kept off if it wasn't already on) and not allowed to be turned on by any command until the TOKO command is canceled as a result of a channel-1 CTOKO command being sent to the same SC. The input and output ports for the SCs in an MCACFPA can be the same as those for the single-channel ACFPA, except that in each SC of a DCACFPA two analog output ports, labeled $AO_1$ and $AO_2$ (see FIG. 10), have replaced the single analog output port AO (see FIG. 4A). Each SC in an MCACFPA may have an analog output port dedicated to sending outputs to each one of the multiple output channels. For example, each SC in a four-channel MCACFPA may have four analog output ports.

The combined channel-1 analog outputs from the $AO_1$ ports are input into the AOD. This AOD has the same functionality as that of the AOD of FIG. 4A. The combined channel-1 analog signal outputs are also input into the channel-1 DSC ($DSC_1$), and the combined channel-2 analog signal outputs from the $AO_2$ ports are input into the channel-2 DSC ($DSC_2$). The two DSCs $DSC_1$ and $DSC_2$ of FIG. 10 have the same functionality as that of the single DSC in ACFPA 400 of FIG. 4A.

When used in OBR mode, MCACFPA 1000 operates in the same manner, described above, as a single-channel ACFPA to detect, locate, and obtain identifying information associated with OTAs located within the FOV of the OCC, except that all switches other than the channel-1 switches (i.e., the $S_1$ switches of FIG. 10) are kept turned off by way of channel-specific TOKO commands for the entire time the MCACFPA is in OBR mode. Therefore, all optical data sequences output from MCACFPA 1000 while it is in OBR mode will be made via channel 1. While it is in OBR mode, the $S_1$ switch in each SC of an MCACFPA operates in the same manner and performs the same functions as the single switch in each SC of a single-channel ACFPA in OBR mode. Similarly, in OBR mode, the analog output ports $AO_1$, the digital signal converter $DSC_1$, and the channel-1 digital signal output (see FIG. 10) in an MCACFPA operate in the same manner and perform the same functions as the AO output ports, the DSC, and the digital signal output (see FIG. 4A), respectively, in a single-channel ACFPA in OBR mode.

As is the case with a single-channel ACFPA, once the OBR process using MCACFPA 1000 has been completed, the user will be prompted to initiate an OSR process to receive optical signal data from any one of the detected optical data sequences, e.g., by touching a symbol corresponding to one of the optical data sequences on the real-time augmented reality presentation. For the first optical signal selected by the user, this can be done in the same manner as described above for a single-channel ACFPA, where only channel-1 components (i.e., switches $S_1$, analog output ports $AO_1$, the digital signal converter $DSC_1$, and the channel-1 digital signal output) are used to extract the optical signal from the first OTA in the same manner that the analogous components (i.e., SC switches, analog output ports AO, the digital signal converter DSC, and the digital signal output) are used to perform this function in a single-channel ACFPA. SRPs are used at regular time intervals to correct for possible changes in the focal-plane position of the first optical signal that may occur while it is being extracted. These SRPs are performed in the same manner as described previously for a single-channel ACFPA, except that the switching commands used are addressed only to channel-1 switches.

Unlike the OSR process for the single-channel ACFPA, the user will, if desired, be able to initiate the process of receiving (i.e., outputting and storing) a second optical signal via channel 2 without having to wait for the process of receiving the first optical signal via channel 1 to finish. For example, the user can touch a symbol on the real-time augmented reality presentation representing the OTA from which he or she wants to begin receiving a second optical signal. As a result of this input from the user, the ORA will remove the OTA transmitting this second optical signal from the group of OTAs whose outputs are being suppressed and whose focal-plane positions are periodically being updated using channel-1 switching commands. This removal is accomplished by terminating the process of using channel-1 switching commands to update the location of the second optical signal. During output of the second optical signal via channel 2, its location will instead be monitored by means of channel-2 switching commands. At this point, all the SC switches in channels other than channel 1 will be in an off state, due to their having received TOKO commands during the OBR mode.

The ORA may then send channel-2 CTOKO commands addressed to each of the SCs in the MCACFPA. The effect of these channel-2 TOKO commands will be to cancel the previous channel-2 TOKO commands that had been preventing the channel-2 switches $S_2$ from being turned on. It should be noted that CTOKO commands never cause any switches within SCs to which they are addressed to turn on. However, they do put these SCs into a state that allows later commands to cause switches to be turned on. The ORA may next send channel-2 SERs to each of the SCs associated with detectors within the focal area, e.g., blur circle/blur ellipse centered on the most current estimate of the location of the second optical signal. The effect of this will be to turn on all channel-2 switches in SCs associated with detectors receiving the second optical signal that have estimated SNR values greater than $SNR_{min}$, which will cause the information contained in those optical signals to be output from MCACFPA 1000 via channel 2. The ORA will then store that information and make it available to the user in a convenient form. As described above with regard to the first signal being output via channel 1, SRPs are used at regular time intervals to correct for any changes in the focal-plane position of the second optical signal that may occur while it is being received. Since the second optical signal is being output via channel 2, these SRPs will utilize only channel-2 switching commands.

While either or both of the first and second optical signals are being output and stored, the focal-plane positions of all the optical signals that are not currently being output and stored will continue to be periodically monitored and updated, while their outputs will continue to be suppressed, in the same manner as described above for a single-channel ACFPA, except that channel-1 TOKO, channel-1 CTOKO, and channel-1 SER commands are used to do this in the case of the MCACFPA, rather than the regular (i.e., non-channel-specific) TOKO, CTOKO, and SER commands used for this purpose in a single-channel ACFPA.

If a third output channel is available in an MCACFPA, a third optical signal can be output and its associated optical signal information stored while the first two are still being output and stored. This would be done in a manner analogous to the method described above for outputting and storing a second optical signal. Likewise, an MCACFPA with M channels will be capable of simultaneously outputting and storing as many as M distinct optical signals sent by M independent OTAs. As a result, the process of receiving multiple optical signals can be sped up.

We now consider methods that may be used to terminate the process of receiving (i.e., outputting and storing) a selected optical signal via any channel in an MCACFPA and then making that channel available for use in receiving a different selected optical signal. We consider a particular channel having a channel number of K, where K is an integer greater than or equal to 1 and less than or equal to the total number of channels M. As described above for the case of a single-channel ACFPA, the process of terminating the receipt of optical signal data is initiated either when the ORA determines that all available information has already been output and stored from the optical signal (e.g., based on the methods described above utilizing end codes for repeating optical signals or termination codes for non-repeating optical signals) or when the user requests that the process of receiving data be terminated.

We first consider the case where K=1, meaning that the receiving process is to be terminated for an optical signal that is being received via channel 1. In this case, the termination process is identical to that already described above for a single-channel ACFPA, except that channel-1-specific switching commands are used. Specifically, channel-1 TOKO commands are sent to each of the switched-detector assemblies associated with detectors within a focal area, e.g., blur circle/blur ellipse, centered on the most up-to-date estimate of the focal-plane location of the optical signal. This will turn off all the $S_1$ switches in SCs associated with any detectors that had been receiving the optical signal, thereby suppressing the output of information from the optical signal by the MCACFPA. Meanwhile, the ORA will continue to perform its ongoing process of keeping suppressed all the previously detected optical data sequences that are not currently being output and stored via any of the MCACFPA's channels, while periodically updating their positions, as described previously. The optical data sequence for which the process of outputting and storing its optical signal data via channel 1 has just been terminated will now be added to this group of optical data sequences for which this ongoing output-suppression and position-updating process is being performed.

We next consider the case where K=2 or higher, meaning that the receiving process is to be terminated for an optical signal that is being received via any channel other than channel 1. In this case, the termination process begins by sending channel-K TOKO commands to each of the switched-detector assemblies associated with detectors within a focal area, e.g., blur circle/blur ellipse, centered on the most up-to-date estimate of the focal-plane location of the optical signal. This will turn off all the $S_K$ switches in SCs associated with any detectors that had been receiving the optical signal, thereby suppressing the receipt of information from the optical signal. The next step in the process is to send channel-K CTOKO commands to all the SCs that have just received channel-K TOKO commands. This results in the MCACFPA being in a state in which all of its channel-K switches are off, but are capable of being turned on by new channel-K-specific switching commands (e.g., channel-K SERs). Thus channel K is left in a state in which it is ready to begin outputting optical signals from other OTAs selected by the user. Meanwhile, the ORA will continue to perform its ongoing process of keeping suppressed all the previously detected optical data sequences that are not currently being output and stored via any of the MCACFPA's channels, while periodically updating their positions, as described previously. The optical data sequence for which the process of outputting and storing its optical signal data via channel K has just been terminated will now be added to this group of optical data sequences for which this ongoing output-suppression and position-updating process is being performed.

To provide increased sensitivity, and therefore increased communications range, it may be desirable to utilize an array of OCCs in an ORA, rather than a single OCC. In accordance with such embodiments, optical data sequences in the form of analog electrical signals output from the multiple OCCs are added together to improve the SNR, thereby increasing the range at which optical data sequences can be received from OTAs. Although we here consider only ORAs using single-channel ACFPAs, the extention to ORAs using MCACFPAs is straightforward and would be understood by one of ordinary skill in the art.

Figure 11:
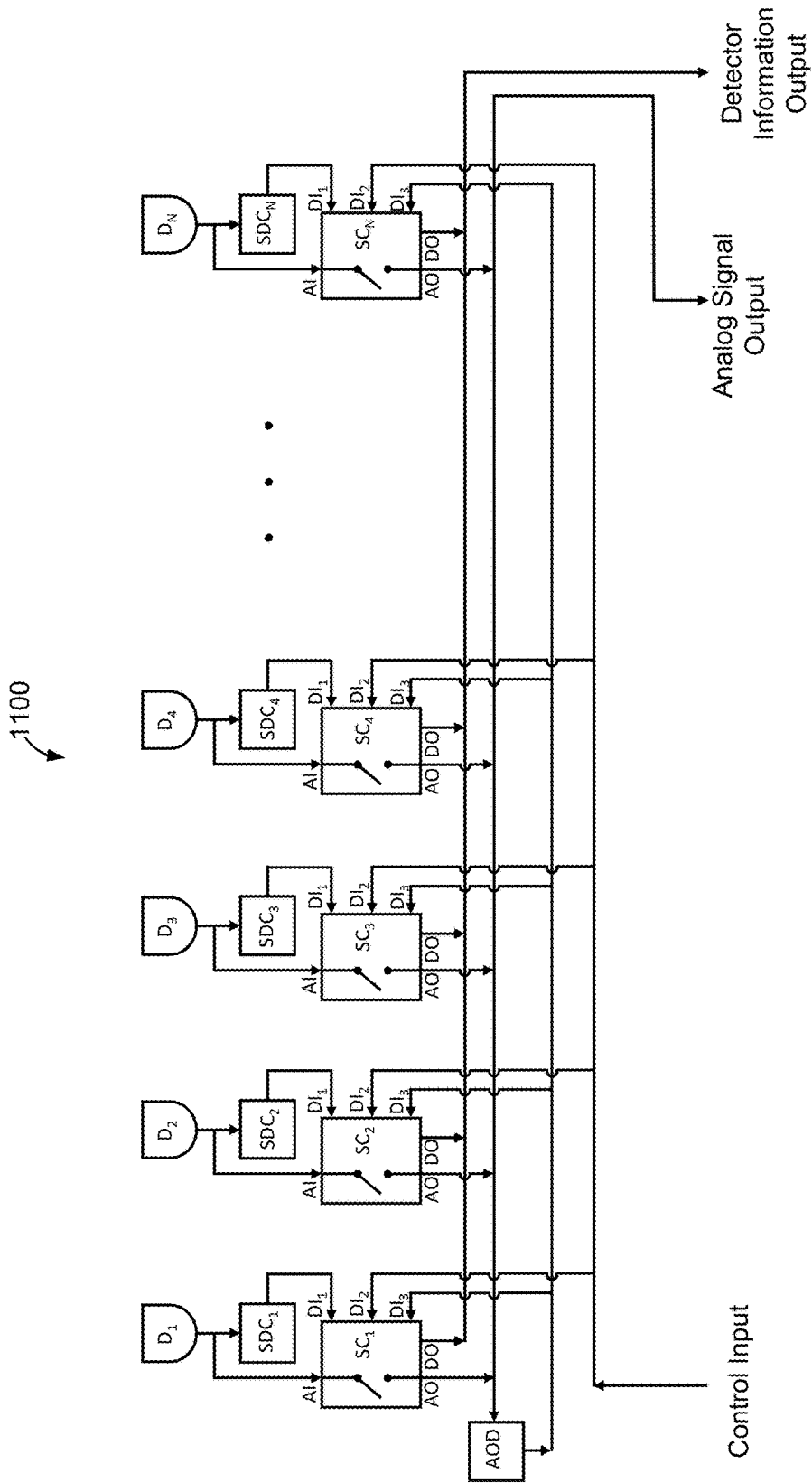
FIG. 11 illustrates an example single-channel adaptive communications focal plane array modified for use in an array of optical communications cameras.

FIG. 11 illustrates an example of a single-channel ACFPA 1100 modified for use in such an array of OCCs. Comparing the ACFPA of FIG. 11 with that of FIG. 4A, it can be appreciated that DSC 414 of FIG. 4A is not utilized in ACFPA 1100. This is done so the analog detector outputs from the multiple ACFPAs in an OCC array can be summed together to improve the SNR for both optical beacons and optical signals prior to inputting the combined signal to a single DSC.

Figure 12:
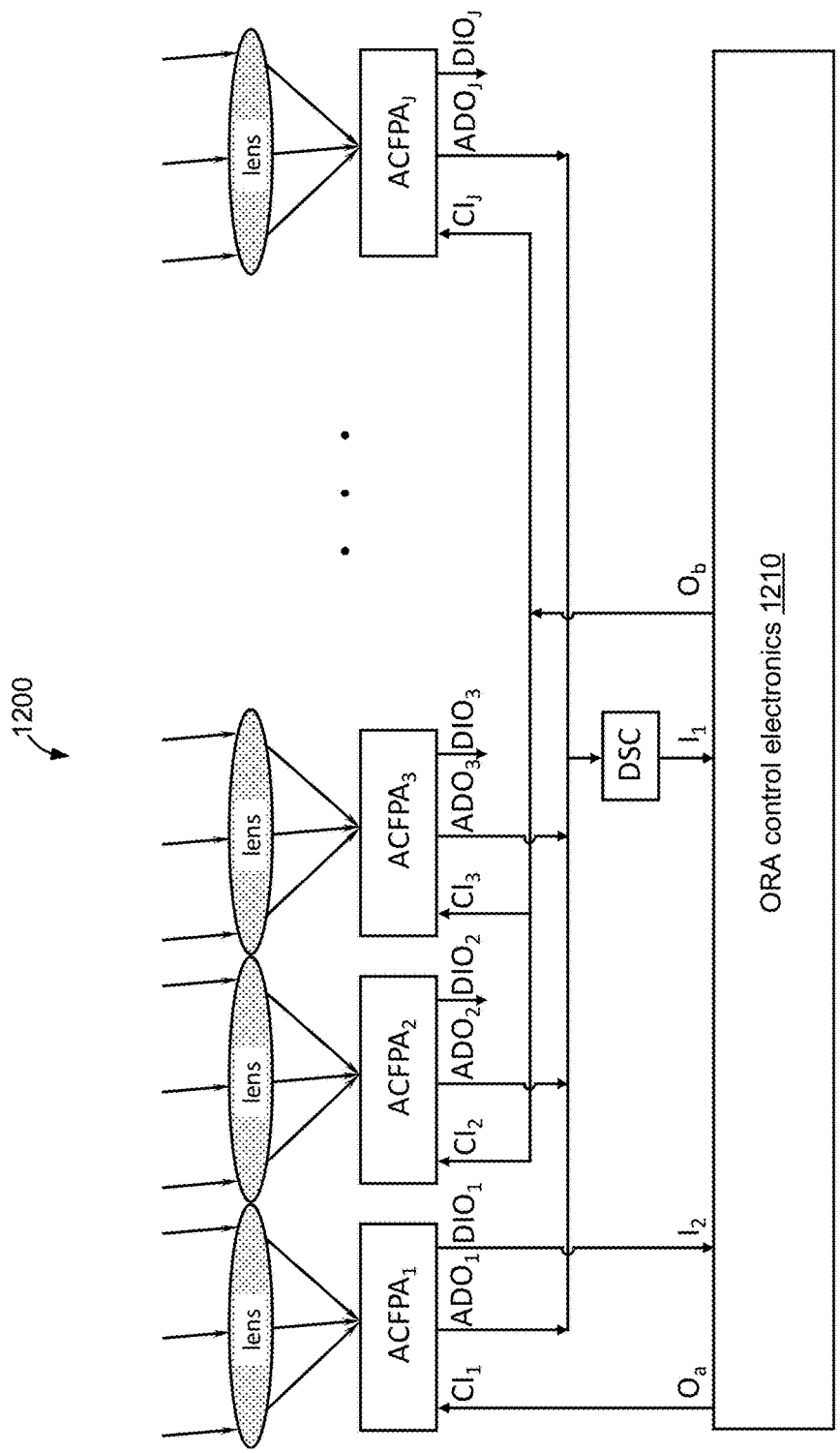
FIG. 12 illustrates an array of optical communications cameras interfaced with control electronics of an optical receiver assembly.

FIG. 12 illustrates an example schematic representation of an array of OCCs 1200 interfaced with the control electronics 1210 of an ORA. FIG. 12 illustrates each OCC as comprising a single lens and a single ACFPA ($ACFPA_L$, $ACFPA_2$, $ACFPA_3$, ..., $ACFPA_J$, where J is the total number of OCCs). Parallel arrows representing light rays from a single distant OTA are depicted being focused by each OCC's lens onto the focal plane of its ACFPA. Although not shown, each OCC may also include a narrow-band optical filter, as well as light-absorbing baffles to prevent optical cross-talk between the OCCs. Although the OCC array is depicted as being linear, some embodiments utilize a two-dimensional array of OCCs, such as a rectangular or hexagonal array.

Each ACFPA in FIG. 12 has one digital control input port, one analog data output port, and one digital detector information output port. The digital control-input ports, $CI_1$, $CI_2$, $CI_3$, ... $D_J$, each correspond to an ACFPA control input (see FIG. 11). These input ports allow the ORA to control the operation of the ACFPAs by sending them various commands. As illustrated in FIG. 12, all but one of the ACFPAs are controlled collectively by way of commands sent via output port $O_b$ of ORA control electronics 1210. The first ACPFA, $ACFPA_L$ however, may be controlled independently of the others by commands sent via output port $O_a$. The outputs from the ACFPAs' analog-data-output ports, i.e., $ADO_1$, $ADO_2$, $ADO_3$, ..., $ADO_J$ of FIG. 12, may be summed together and input to the DSC. The output of the DSC is input to the ORA control electronics 1210 via port $I_1$. The digital detector-information-output ports, i.e., $DIO_1$, $DIO_2$, $DIO_3$ ..., $DIO_J$ of FIG. 12, each correspond to a detector information output (see FIG. 11). The first of these, $DIO_1$, is used to send detector information for $ACFPA_1$ to the ORA control electronics via its digital input port $I_2$. In some embodiments, ACFPAs are configured without the capability to generate and output detector information for use as ACFPAs (other than $ACFPA_1$) in ORAs utilizing arrays of OCCs.

In OBR mode using an array of OCCs, e.g., OCC array 1200, all the ACFPAs except the first (i.e., $ACFPA_1$) may initially be deactivated by sending them a global turn-off (GTO) command from the $O_b$ port. This command causes each SC switch in all ACFPAs except $ACFPA_1$ to be in the off state and to remain in the off state until it receives another command (e.g., an SER) that results in it being turned on. An OBR-mode initialization command may then be issued to $ACFPA_1$ via the $O_a$ port. If at least one detectable signal from an OTA is present within the FOV of the OCC array 1200, the initialization command causes the switch within one SC to be turned on in $ACFPA_1$, causing an optical data sequence containing a first optical beacon to begin to be output via the $ADO_1$ port. The same SC would also output, via the $DIO_1$ port, the position of its associated detector in the detector array of $ACFPA_L$ as well as the estimated SNR of the optical beacon being received by that detector.

As discussed above, in those instances when two or more SCs turn their switches on simultaneously as a result of an OBR-initialization command, ORA control electronics 1210 "resets" or starts over by sending a new OBR-mode initialization command to $ACFPA_1$ via the $O_a$ port.

Once a single SC switch in $ACFPA_1$ has been turned on and is outputting an optical beacon, the ORA can begin enhancing the strength of that beacon by sending SERs via port $O_a$ to SCs within the blur circle/blur ellipse centered on the current estimate of the beacon's location in the focal plane of $ACFPA_1$, similar to the manner in which signal strength is enhanced in the case of a single ACFPA described above. This will also produce an updated estimate of the focal-plane location of the optical beacon, computed by averaging together the detector positions for which optical beacon data are now being output, weighted by their estimated SNR values. At this point, only switches in ACFPA$_1$ will be turned on and outputting signals sent by the first detected OTA. However, optical beacons from the same OTA will exist at approximately the same location in the focal planes of other ACFPAs (i.e., ACFPA$_2$, ACFPA$_3$, . . . , ACFPA$_J$), due to fact that all the OCCs will be approximately coaligned optically.

To turn on the switches corresponding to this optical beacon in these ACFPAs, SERs will be sequentially sent via the O$_b$ port to all SCs within those ACFPAs that are associated with detectors located within the blur circle/blur ellipse centered on the current estimate of the optical beacon location. It should be noted that in some embodiments, each such SER sent by ORA control electronics 1210 simultaneously targets a total of J–1 SCs (i.e., one SC in each of the ACFPAs other than ACFPA$_1$). However, the effect of such an SER command will not necessarily be the same in each such targeted SC, due, for example, to differences in the SNR estimates produced by the SDC associated with each SC, as well as differences in the optical alignment of the OCCs relative to each other.

Once the appropriate switches corresponding to the first detected optical beacon have been turned on in all the ACFPAs, the optical beacon contributions will all be combined, thereby producing a full-strength signal. This result will be converted into a digital signal at the correct 0-bit and 1-bit voltage levels by the DSC and input to ORA control electronics 1210 via port I$_1$. As soon as this full-strength signal is available, the ORA control electronics will begin searching it for the TID. When the TID has been found, the identifying information will be extracted from it. A symbol representing the OTA that is sending the optical beacon may be overlaid at the appropriate location in the real-time display (displaying an augmented reality presentation) of the user's device, along with (optionally) some or all of the identifying information.

Once an optical beacon has been detected, the angular position of its OTA within the FOV of the OCC array 1200 will be periodically updated. This is done so that its location in the real-time display can be kept up-to-date and so that a sufficiently high SNR level can be maintained by keeping those detectors having estimated SNR values at or above SNR$_{min}$ switched on, and keeping those detectors having estimated SNR values below SNR$_{min}$ switched off.

At this point, the ORA is ready to begin searching for a second optical beacon sent by a second OTA. To begin this process, the output of the first optical beacon is suppressed by sending TOKO commands via the O$_a$ and O$_b$ ports to all SCs having associated detectors located inside the current blur circle/clur ellipse. Despite its output being suppressed, the first optical beacon will continue to have its position within the FOV monitored and updated by periodically sending SERs via port O$_a$ to SCs associated with detectors in ACFPA$_1$ that are within the blur circle/blur ellipse centered on the current location of the optical beacon. Each time the location of the first optical beacon has been updated in this way, TOKO commands can be sent to all SCs whose detectors were not inside the blur circle/blur ellipse centered on the previous location, but are now inside the blur circle/blur ellipse centered on the updated location. Conversely, CTOKO commands will be sent to all SCs whose detectors were inside the blur circle/blur ellipse centered on the previous location, but are not inside the blur circle/blur ellipse centered on the updated location. The updated location information for the first optical beacon can also be used to keep the optical beacon's position up-to-date on the display screen (in the augmented reality presentation) of the user's device.

Once the process of suppressing the first optical beacon is complete, a second optical beacon can be detected and strengthened using the method described above for detecting and strengthening the first optical beacon. Once the second optical beacon has been detected, its location will be overlaid as a symbol at the appropriate location on augmented reality presentation displayed on the user's device. As soon as the second optical beacon has been fully strengthened by turning on all the SCs having associated detectors for which the estimated SNR is above the SNR$_{min}$, the identifying information for that optical beacon can be extracted from the TID. Some or all of this identifying information, depending on the user's preferences, can then be displayed near the symbol representing the second optical beacon in the augmented reality presentation.

Once the second optical beacon has been detected, located, strengthened, and identified, its output will also be suppressed and its location periodically updated using the same method described above, a similar process can be performed to detect, locate, strengthen, and extract identifying information from a third optical beacon. This process of suppressing the output of and periodically updating the locations of all previously detected signals while searching for the next new optical beacon will continue until all optical beacons that have detectable SNR levels within the FOV have been detected, located, strengthened, had their identifying information extracted from their TIDs, and had their locations and (optionally) identifying information overlaid on the augmented reality presentation. When all the beacons having detectable SNR levels have been found, the next OBR-mode initialization command will fail to cause any switches to be turned on. When this occurs, the ORA will relay this information to the user by overlaying an appropriate message on the display, such as, "All optical beacons have been detected." Once the ORA determines that no more detectable beacons are present within the FOV, it will stop the OBR process of searching for more such signals. However, until further commands are received from the user, it will continue suppressing the output of optical beacons that have already been detected, while periodically updating their locations and refreshing these locations in the augmented reality presentation.

When the above-described OBR process has been completed, the user can be prompted to initiate an OSR process in order to receive an optical signal from any one of the OTAs from which optical beacons were received during the OBR process. The user can select, e.g., a symbol, representing the OTA from which the user wants to receive and store optical signal information. The ORA sends CTOKO commands via the O$_a$ and O$_b$ ports to all the SCs associated with detectors within the blur circle/blur ellipse centered on the current location of the optical signal to be received. It may then send SERs to each of these SCs. This will turn on all the SC switches for detectors receiving the selected optical signal that have estimated SNR values greater than SNR$_{min}$, which will cause the information contained in that optical signal to be output from the ACFPAs via ports ADO$_1$, ADO$_2$, ADO$_3$ . . . , ADO$_J$. After conversion to digital form by the DSC of the combined outputs from these ports, the ORA can store that information and make it available to the user in a convenient form. While this optical signal is being output and stored, the positions of all the optical beacons will continue to be monitored and periodically updated. Except for the optical signal that has been selected by the user to be received and stored, the output of all optical beacons will continue to be suppressed using the method described above.

When the information from the first optical signal selected by the user has all been stored, or the user has issued a command to end the process of storing information from that signal, TOKO commands will be issued via the $O_a$ and $O_b$ ports to turn off the switches in all SCs associated with detectors receiving that first optical signal. The ORA will continue keeping all the optical beacons suppressed while periodically updating their positions. The user will then have the option of selecting a second optical signal for which an OSR process is to be initiated. Information contained in this signal will then be output from the ACFPAs, stored, and made available to the user by virtue of the same procedure above. This procedure can be used to output and store data sequentially from any or all of the optical signals associated with OTAs detected during the OBR process.

Figures 13A, 13B:
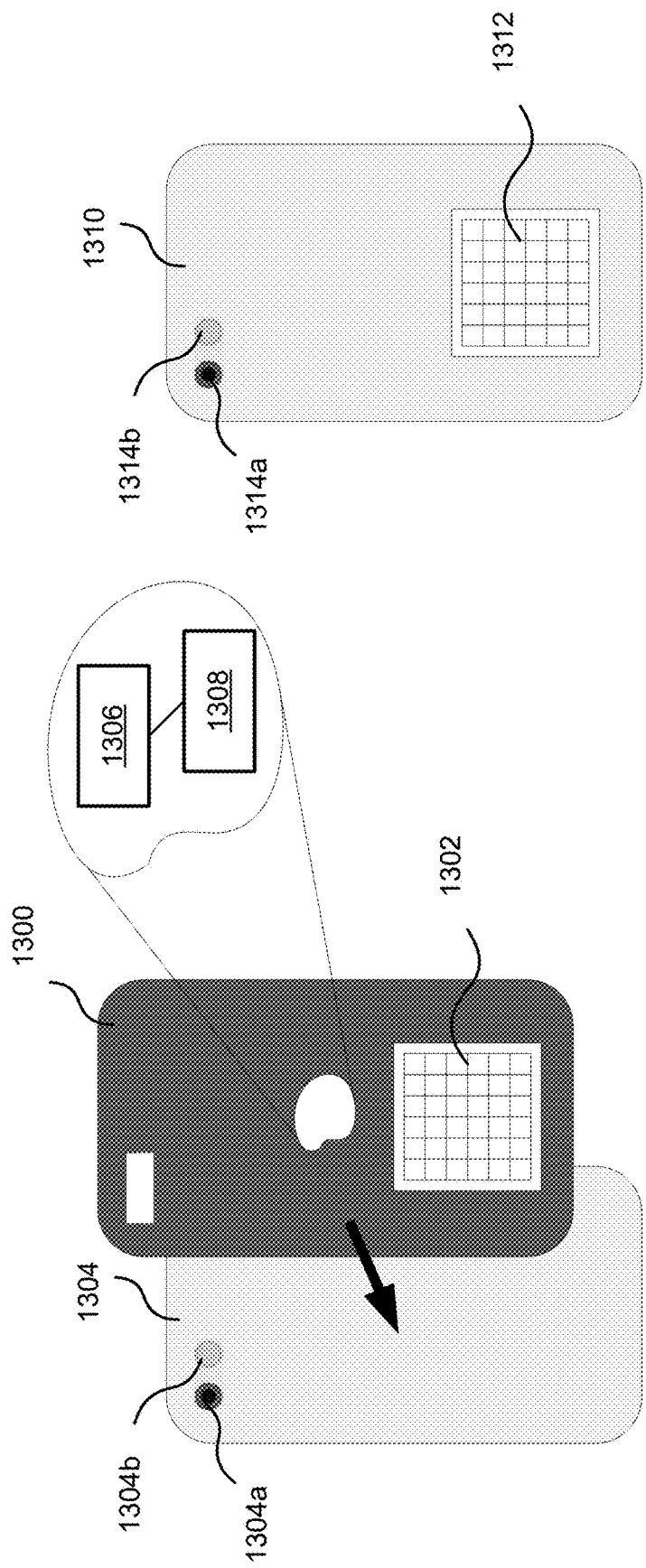
FIG. 13A illustrates an example of an optical receiver assembly attachment.
FIG. 13B illustrates an example of an optical receiver assembly that is incorporated into a device.

FIG. 13A illustrates an example of an ORA attachment, where the ORA may utilize either a single OCC or an OCC array. If a single OCC is used, it may comprise an imaging optical component (e.g., a camera lens) with the optically sensitive detector surfaces of either a single-channel ACFPA 400 (FIG. 4A) or an MCACFPA 1000 (FIG. 10) in its focal plane. If an OCC array is used, it may comprise two or more imaging optical components (e.g., two or more camera lenses), each with the optically sensitive detector surfaces of an ACFPA in its focal plane. The ACFPAs used in the OCC array may all either be single-channel ACFPAs adapted for use in OCC arrays (e.g., ACFPA 1100 of FIG. 11) or may all be MCACFPAs adapted for use in OCC arrays. In the illustrated embodiment, optical receiver assembly 1302 may be incorporated into a user device case 1300 for user device 1304 (e.g., a smartphone case for a smartphone device). It should be noted that the "visible" aspects of optical receiver assembly 1302 may include one or more imaging optical components, such as camera lenses. It should be noted that no optical detector arrays are visible in FIG. 13A because they are hidden behind the imaging optics. Other component parts of optical receiver assembly 1302 may be incorporated into user device case 1300, but may not be visible when user device case 1300 is placed on user device 1304.

FIG. 13B illustrates an example of an optical receiver assembly that is incorporated into a device. In particular, ORA 1312 may be incorporated directly into user device 1310. For example, during the manufacturing of user device 1310, ORA 1312 may be installed. Again, although only visible aspects of ORA 1312 are shown, other components of optical receiver assembly 1312 may be incorporated into user device 1310 within the housing of user device 1310.

As alluded to previously, a user may utilize a device to interact with an optical receiver assembly to input operating parameters, receive transmitted data, control the optical receiver assembly, etc. The software/software applications may be utilized by the user to manage messages received optically. In addition, if the user is a subscriber of a social media service, the controlling software may allow the user to access all of the capabilities of that service, such as posting optically received messages, images, videos, or other information on a social media "page," viewing and responding to posts on other users' pages, sharing posts, etc., in the usual manner in which such tasks are performed within the context of social media services.

To that end, FIG. 13A illustrates that user device case 1300 may also include one or more communications elements that allow user device 1304 and optical receiver assembly 1302 to communicate and/or interact. For example, as described above, user device 1304 may be utilized by a user to input operating parameters for ORA 1302, etc. As illustrated in FIG. 13A, one such communications element 1306 may be a Bluetooth® transceiver, an NFC transceiver or other communications element. If needed, a power supply 1308 (e.g., a compact battery, an energy harvesting sensor, or other appropriate power source) may be provided to energize communications element 1306. Here, communications element 1306 and power supply 1308 may embedded in or located on the device-facing side of case 1300 for aesthetics and/or to gain closer operating proximity to user device 1304. It should be noted that power supply 1308 may also provide power to ORA 1302, or ORA 1302 may have its own power source that can be used to power communications element 1306. In some embodiments, ORA 1302 and/or communications element 1306 may be integrated into a single unit or device that may be attached to an input/output port, such as a micro-USB or Lightning port of user device 1304.

In the case of user device 1310, a user may control ORA 1312 and/or perform the above-noted functions and/or interactions via a hardwired connection between ORA 1312 and one or more processors, memory units, and/or other applicable components of user device 1310.

Referring back to FIGS. 3B, 8, and 9, various operations may be performed by an ORA to detect the presence of optical beacons, determine the angular position of optical beacons, receive identifying information from optical beacons, and ultimately receive information transmitted via an optical signal. From a user's perspective, interactions with an optical narrowcasting system (aside from, e.g., controlling the operation of an ORA) can involve selecting visual representations of sources of one or more optical beacons that have been detected and receiving and/or interacting with information received from one or more optical signals.

Figure 14:
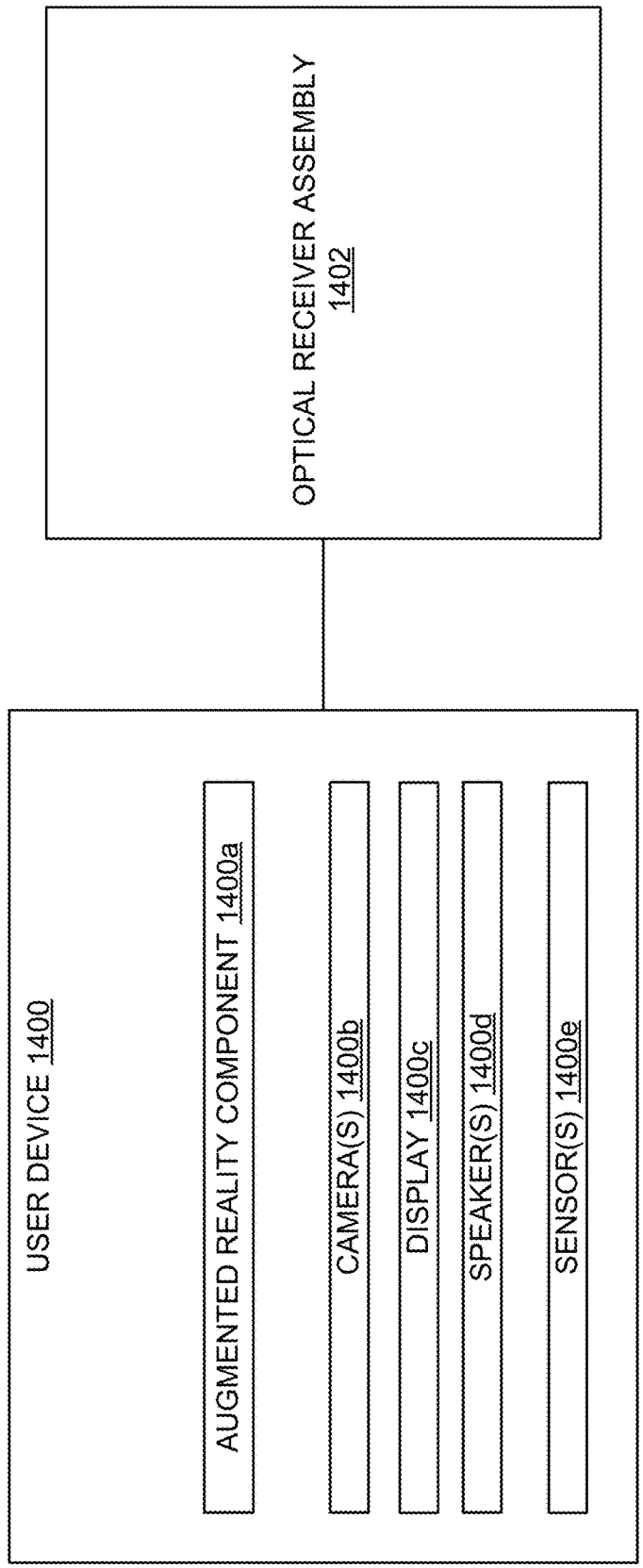
FIG. 14 illustrates an example user device for generating an augmented reality presentation that is operatively and/or communicatively connected to an optical receiver assembly.

In some embodiments, augmented reality functionality resident in or available through a user device, e.g., user device 108 (see FIG. 1), may be utilized to facilitate the above-noted user interactions with one or more aspects of optical narrowcasting system 100. FIG. 14 illustrates a user device 1400 (which can be one embodiment of user device 108) that is operatively and/or communicatively connected to an ORA 1402 (which can be one embodiment of optical receiver assembly 106 comprising an OCC or OCC array utilizing either single-channel ACFPA(s) or MCACFPA(s) in accordance with various embodiments).

User device 1400 may comprise an augmented reality component 1400a, one or more cameras 1400b, a display 1400c (which may be a touchscreen or non-touchscreen display), one or more speakers 1400d, and/or one more sensors 1400e. User device 1400 may, in part, embody an augmented reality device that is capable of displaying a real-time view of a physical, real-world environment while altering elements within the displayed view of the environment. As such, unlike a virtual reality device which displays a view of an entirely computer-generated world, an augmented reality device displays a view of the real world but augments (e.g., adds or modifies) elements using computer graphics technology. Such an augmented reality device may include and/or be communicatively coupled to a camera device (or multiple camera devices) used to capture a view of the real-world environment and may further include computer software and/or hardware configured to augment elements of the captured scene. For example, and as will be described in greater detail herein, an augmented reality device could capture a series of images or a scene representative of a user's view of a street, city, or other location, and modify the series of images so that detected optical beacons appear as overlaid, selectable items or icons in real-time to a user. As such, the user can be presented with an augmented view of the physical real-world environment in which the user is located.

The one or more cameras 1400*b* may include cameras for capturing the visual scene. The one or more cameras 1400*b* may be an existing camera(s) of user device 164, which may be, for example, a smartphone. As used herein, a visual scene refers to one or more views of the real-world environment in which user device 1400 is being used (and in which one or more optical beacons and/or optical signals are being transmitted in an optical narrowcasting system).

For example, video imagery captured by one or more cameras 1400*b* and presented on display 1400*c* may be a live feed of an urban scene viewed from the perspective of a user who is utilizing user device 1400 to explore a particular city. An icon representative of an optical beacon detected by ORA 1402 may be overlaid on the scene commensurate with the location of a source of the optical beacon, as described above. As previously discussed, optical beacons may be transmitted by OTAs, and ORA 1402 may detect the optical beacon and extract identifying information therefrom. For example, the overlaid icon may be representative of a hotel in the line of sight of the user that is transmitting descriptive or advertising information. There may be accompanying text that indicates the name and location of the source of the optical beacon, e.g., the name and address of the hotel.

One example of one or more sensors 1400*e* may be an accelerometer capable of measuring the physical acceleration of user device 1400, e.g., when manipulated by the viewer (as the user scans the urban scene to obtain information about one or more businesses, points of interest, etc.). User device 1400 may use the accelerometer to determine when the position of user device 1400 is changing, for example, which could indicate that the position of user device 1400 is changing relative to one or more transmitted optical beacons and/or the scene itself. Augmented reality component 1400*a* may also on its own or with assistance from the accelerometer, determine the positioning of an optical beacon relative to user device 1400*a*. It should be noted that other sensors, such as GPS receivers, compasses, gyroscopes, and/or other sensors may be utilized to more accurately characterize or further enhance one or more aspects of an augmented reality experience provided by augmented reality component 1400*a*.

Augmented reality component 1400*a* may control aspects of presenting the augmented reality view of the urban scene on display 1400*c*, such as how optical-beacon-derived information may be presented, e.g., via static icons, animated elements. Augmented reality component 1400*a* may control the incorporation of position or location-aiding cues or visuals, as well as the presentation of information extracted from one or more optical signals associated with the optical beacons, reacting to user inputs and/or selections, among other aspects.

For example, information received by an OBR of ORA 1402 may be cached after it has been received. Caching may occur immediately after receipt. Icons/markers used to represent detected optical beacons can be located in the augmented reality visual scene such that the location of each of the icons/markers may coincide with the corresponding optical transmitter assemblies' actual location within one or more cameras 1400*b*'s FOV. The icons/markers may "stay" in their correct locations as one or more cameras 1400*b* is zoomed, panned, or otherwise moved, resulting in a location-accurate augmented reality experience, in accordance with various embodiments described herein.

For example, a user may select an icon or symbol representative of a particular OTA by touching or otherwise actuating the icon or symbol, and as described above, information regarding the entity (e.g., person, business, or organization) associated with the OTA may be presented, e.g., via a pop-up window or as text near the icon or symbol. It should be noted that touching different areas of the pop-up window may bring up different types of additional information regarding the entity. In some embodiments, the additional information may be considered identifying information associated with the entity that can extracted from the optical beacon. In some embodiments, the additional information may be information that has been extracted from an optical signal transmitted by the OTA. For example, the additional information may comprise advertising multimedia that can be presented to the user via display 1400*c* and/or the one or more speakers 1400*d*.

The augmented reality experience comprising at least the augmented reality scene, which include one or more selectable representations (and/or associated information) of one or more detected optical beacons and/or signals may be thought of an optical narrowcasting graphical user interface (GUI).

In some embodiments, augmented reality component 1400*a* may permit recording of the augmented reality scene and embedding any optical beacon-extracted information, angular positioning information, as well as optical signal-extracted information in the resulting media file. If desired, the user may disseminate the recorded scene via, e.g., social media outlets, to be accessed by others. This embedding technique can allow optically transmitted information to be accessed in a non-real-time manner, not only by the user, e.g., at a later time, but by social-media subscribers or others (e.g., on social-media sites), which may provide an enhanced social-media experience for social-media subscribers and may significantly increase the number of viewers of optically narrowcast information (e.g., advertisements), as well as provide new opportunities for social-media services to generate online advertising revenue.

It should be noted that the example applications described herein are not limiting, and that an optical narrowcasting system may be utilized in many other applications or scenarios. For example, an optical narrowcasting system may be used to enhance merchandise displays in stores or store windows, where information regarding one or more products for sale may be presented to consumers through an augmented reality experience that leverages the information exchange made possible by an optical narrowcasting system. For example, the optical narrowcasting system may be used to optically transmit not only product information, but other information, such as store hours and/or other information of interest to potential customers. Billboards and other locations where out-of-home advertising is utilized may leverage optical narrowcasting to make visual aspects of the advertising more appealing and/or viewable from farther away, while also providing much more information than can currently be provided via, e.g., a billboard image/text.

New social media sites and/or applications may be based on the sharing of content obtained via optical narrowcasting, and if desired, generating income though online ads appearing on these sites and applications. For example, a social media application may allow individuals to use smartphones and other portable devices to create and share videos and photos containing embedded optically transmitted content.

In various embodiments, optical narrowcasting may be considered highly localized in nature, where the term "localized" can refer to the ability to transmit data from one location to another with a sufficiently small path length to prevent excessive bit errors. This characteristic can be leveraged in a social media context to obtain information that might otherwise be difficult or impossible to obtain regarding the location of people sending the information. For example, one or more optical receiver assemblies may be mounted in the ceiling of a store to collect customer feedback. The optical receiver assemblies' respective FOVs can be designed to only pick up information optically transmitted by people actually in the store. In addition, optical information does not pass through walls, floors, or ceilings, as WiFi signals may often do. Using an array of optical receiver assemblies, detailed information about where people are within the store could also be obtained. This could be used to provide accurate navigation within the store, with a search feature to help people locate specific products they're interested in.

The localized nature of the optical narrowcasting may also be used to motivate people to visit a particular geographic location, e.g., by encouraging people to transmit contact information to an optical receiver assembly (found in a store, for example) using an optical transmitter assembly controlled by a social media application on a user device. Optical narrowcasting may provide superior localization relative to what could be achieved using WiFi or built-in location sensors. A network of optical receiver assemblies may be created at certain locales allowing users to share information about the surrounding area, share relevant text, photos, videos, etc.

Security, privacy, and/or anonymity can be achieved through the use of an optical narrowcasting system. Unlike, e.g., WiFi networks, that require users to log into the network in order to obtain service, a user may receive an optical beam without disclosing any sensitive information (or any information for that matter). Moreover, the optical beam transmitted by an optical transmitter assembly can be made quite narrow, if desired, to limit the receipt of the optical beam to only those optical receiver assemblies in line with the narrow width of the optical beam.

An appealing characteristic of optical narrowcasting is that the transmittal of information is unobtrusive, indeed invisible. That is, only people who are interested in obtaining optically transmitted information can see (e.g., via an augmented reality experience) the information.

Figure 15:
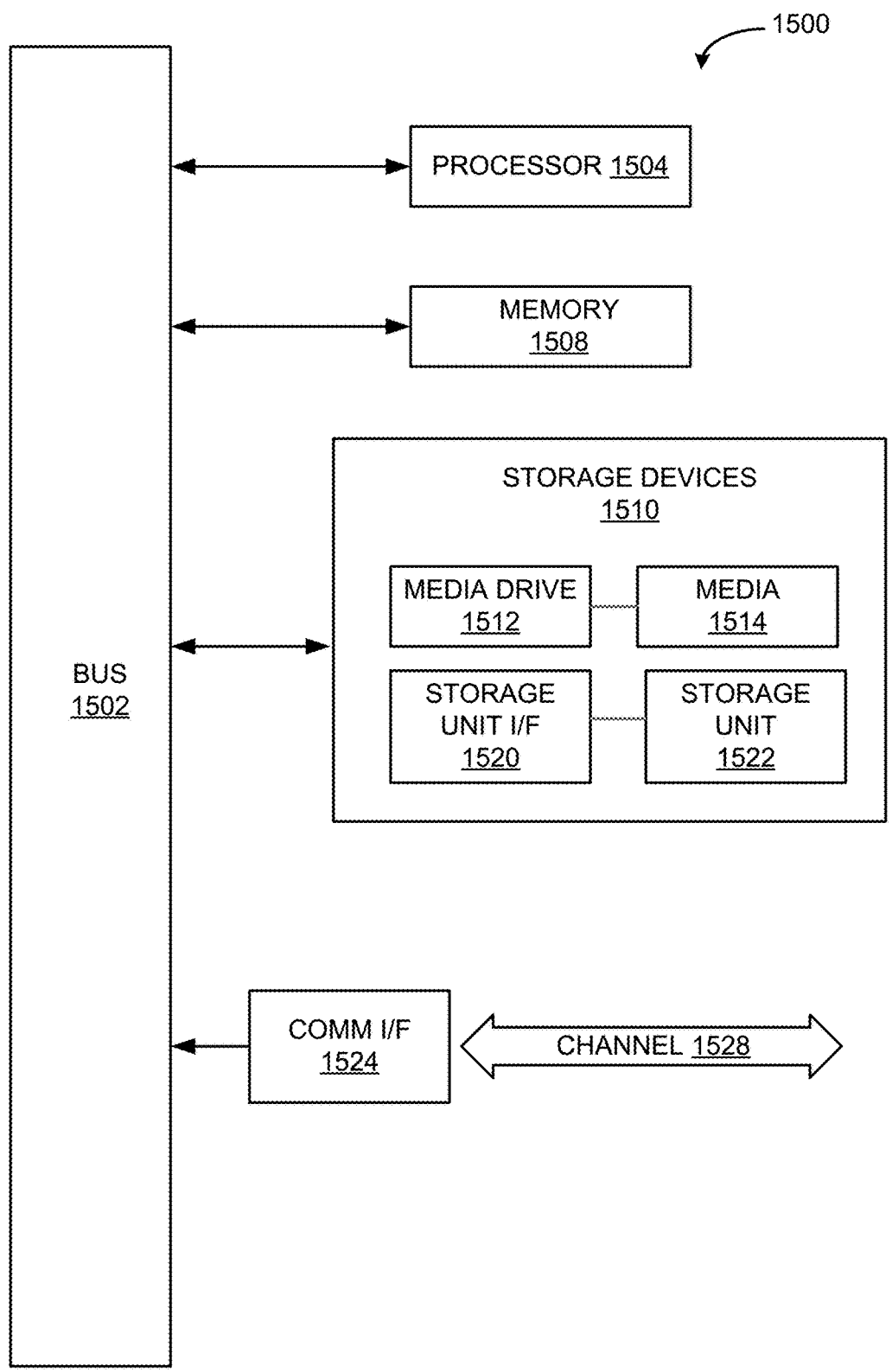
FIG. 15 illustrates an example computing component that may be used to implement various features of the systems and methods disclosed herein.

FIG. 15 illustrates an example computing component that may be used to implement various features of the methods and/or components disclosed herein, such as the aforementioned ORAs, OTAs, OBRs, OSRs, OCCs, etc.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 15. Various embodiments are described in terms of this example-computing component 1500. After reading this description, it will become apparent to a person skilled in the relevant art how to implement the application using other computing components or architectures.

Referring now to FIG. 15, computing component 1500 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing component 1500 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 1500 might include, for example, one or more processors, controllers, control components, or other processing devices, such as a processor 1504. Processor 1504 might be implemented using a general-purpose or special-purpose processing engine such as, for example, a microprocessor, controller, or other control logic. In the illustrated example, processor 1504 is connected to a bus 1502, although any communication medium can be used to facilitate interaction with other components of computing component 1500 or to communicate externally.

Computing component 1500 might also include one or more memory components, simply referred to herein as main memory 1508. For example, preferably random access memory (RAM) or other dynamic memory, might be used for storing information and instructions to be executed by processor 1504. Main memory 1508 might also be used for storing temporary variables or other intermediate information during execution of instructions to be executed by processor 1504. Computing component 1500 might likewise include a read only memory ("ROM") or other static storage device coupled to bus 1502 for storing static information and instructions for processor 1504.

The computing component 1500 might also include one or more various forms of information storage mechanism 1510, which might include, for example, a media drive 1512 and a storage unit interface 1520. The media drive 1512 might include a drive or other mechanism to support fixed or removable storage media 1514. For example, a hard disk drive, a solid state drive, a magnetic tape drive, an optical disk drive, a CD or DVD drive (R or RW), or other removable or fixed media drive might be provided. Accordingly, storage media 1514 might include, for example, a hard disk, a solid state drive, magnetic tape, cartridge, optical disk, a CD, DVD, or Blu-ray, or other fixed or removable medium that is read by, written to or accessed by media drive 1512. As these examples illustrate, the storage media 1514 can include a computer usable storage medium having stored therein computer software or data.

In alternative embodiments, information storage mechanism 1510 might include other similar instrumentalities for allowing computer programs or other instructions or data to be loaded into computing component 1500. Such instrumentalities might include, for example, a fixed or removable storage unit 1522 and an interface 1520. Examples of such storage units 1522 and interfaces 1520 can include a program cartridge and cartridge interface, a removable memory (for example, a flash memory or other removable memory component) and memory slot, a PCMCIA slot and card, and other fixed or removable storage units 1522 and interfaces 1520 that allow software and data to be transferred from the storage unit 1522 to computing component 1500.

Computing component 1500 might also include a communications interface 1524. Communications interface 1524 might be used to allow software and data to be transferred between computing component 1500 and external devices. Examples of communications interface 1524 might include a modem or softmodem, a network interface (such as an Ethernet, network interface card, WiMedia, IEEE 802.XX or other interface), a communications port (such as, for example, a USB port, IR port, RS232 port Bluetooth® interface, or other port), or other communications interface. Software and data transferred via communications interface 1524 might typically be carried on signals, which can be electronic, electromagnetic (which includes optical) or other signals capable of being exchanged by a given communications interface 1524. These signals might be provided to communications interface 1524 via a channel 1528. This channel 1528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium," "computer usable medium" and "computer program medium" are used to generally refer to non-transitory media, volatile or non-volatile, such as, for example, memory 1508, storage unit 1522, and media 1514. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1500 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise. It should be understood that the steps may be reorganized for parallel execution, or reordered, as applicable.

What is claimed is:

1. A multi-channel adaptive communications focal plane array comprising:
   a plurality of optical detectors, a subset of which receive one or more optical beams transmitted by one or more optical transmitter assemblies;
   a plurality of signal discrimination circuits, each of which is operatively connected to a corresponding one of the plurality of optical detectors, and performs the following:
      detects the presence of an optical beam that is currently being received by its corresponding optical detector;
      computes an estimated signal-to-noise ratio associated with an optical beam it has detected; and
      sets a value of the estimated signal-to-noise ratio to a set value when it has not detected the presence of the optical beam;
   a plurality of switching circuits, each of which is operatively connected to a corresponding one of the plurality of optical detectors and a corresponding one of the plurality of signal discrimination circuits, and each of the plurality of switching circuits comprising two or more analog output ports where each analog output port corresponds to a different channel of the multi-channel adaptive communications focal-plane array, wherein each of the plurality of switching circuits performs the following:
      controls a flow of information being received in the form of an optical beam by either suppressing the flow completely or by outputting the flow to any one of the two or more analog output ports;
      outputs a location relative to other detectors of the plurality of optical detectors indicative of the corresponding optical detector receiving the optical beam; and
      outputs the estimated signal-to-noise ratio provided by its corresponding signal discrimination circuit; and
   an analog output detector operatively connected to a first of the two or more analog output ports of each of the plurality of switching circuits, the analog output detector informing each of the plurality of switching circuits whether or not information being received by an optical detector from an optical beam is currently being output via the first of the two or more analog output ports of any one of the plurality of switching circuits.

2. The multi-channel adaptive communications focal plane array of claim 1, wherein the plurality of optical detectors are configured in a two-dimensional array.

3. The multi-channel adaptive communications focal plane array of claim 1, wherein each of the plurality of signal discrimination circuits distinguishes between a single optical beam being received by the corresponding optical detector and two or more optical beams simultaneously being received by the corresponding optical detector.

4. The multi-channel adaptive communications focal plane array of claim 1, wherein each of the plurality of signal discrimination circuits outputs an indicator representative of an invalid condition upon a determination that two or more optical beams are simultaneously being received by the corresponding optical detector.

5. The multi-channel adaptive communications focal plane array of claim 1, wherein each of the plurality of switching circuits receives a command initializing an optical beacon receiver mode, and wherein the optical beam comprises an optical beacon.

6. The multi-channel adaptive communications focal plane array of claim 5, wherein the command causes each of the plurality of switching circuits to be disabled, or to remain disabled if one or more of the plurality of switching circuits is already disabled, such that a disabled switching circuit suppresses an output of an electrical signal being produced by its corresponding optical detector, preventing the electrical signal from contributing to the flow of information being output by any output channels of the multi-channel adaptive communications focal plane array.

7. The multi-channel adaptive communications focal plane array of claim 6, wherein one of the plurality of switching circuits becomes enabled for output via its first analog output port when both of the following conditions are simultaneously met: one of the plurality of signal discrimination circuits corresponding to the one of the plurality of switching circuits sends the one of the plurality of switching circuits an estimated signal-to-noise ratio value that is greater than or equal to a minimum signal-to-noise ratio threshold, and the analog output detector informs the one of the plurality of switching circuits that the others of the plurality of switching circuits are all currently suppressing outputs from their respective first analog output ports.

8. The multi-channel adaptive communications focal plane array of claim 7, wherein the one of the plurality of switching circuits remains enabled for output via its first analog output port unless it receives from its corresponding signal-discrimination circuit, a value of the estimated signal-to-noise ratio that is less than the minimum signal-to-noise ratio threshold, such that upon receiving the value of the estimated signal-to-noise ratio less than the minimum estimated signal-to-noise ratio, the one of the plurality of switching circuits is disabled.

9. The multi-channel adaptive communications focal plane array of claim 7, wherein one or more of the plurality of switching circuits whose corresponding optical detectors are neighboring the optical detector to which the one of the plurality of switching circuits that has already been enabled is operatively connected are enabled for output via their respective first analog output ports enhancing the signal strength of the optical beacon.

10. The multi-channel adaptive communications focal plane array of claim 9, wherein the one or more of the optical detectors corresponding to the plurality of switching circuits are determined to be neighboring based upon a focal area centered on the optical detector corresponding to the one of the plurality of switching circuits that has already been enabled for output via its first analog output port.

11. The multi-channel adaptive communications focal plane array of claim 10, wherein the focal area comprises one of a blur circle or blur ellipse, one or more parameters of which depends upon a size of a point-spread function of an imaging lens associated with the multi-channel adaptive communications focal plane array.

12. The multi-channel adaptive communications focal plane array of claim 9, wherein the enabling of the one or more neighboring plurality of switching circuits for output via the first analog output port is initiated by receipt of a signal-to-noise ratio request and a determination that an estimated signal-to-noise ratio output from a corresponding one of the plurality of signal discrimination circuits is greater than or equal to the minimum signal-to-noise ratio threshold.

13. The multi-channel adaptive communications focal plane array of claim 12, wherein the multi-channel adaptive communications focal plane array performs a re-centering procedure to re-center a focal area based upon recent signal-to-noise ratio estimates, the focal area being centered on the optical detector corresponding to the one of the plurality of switching circuits that has already been enabled for output via its first analog output port.

14. The multi-channel adaptive communications focal plane array of claim 1, wherein the multi-channel adaptive communications focal plane array is operatively implemented within an optical receiver assembly, the optical receiver assembly monitoring and processing the optical beacon portion of an optical beam until optical beacon information embedded in the optical beacon is extracted.

15. The multi-channel adaptive communications focal plane array of claim 14, wherein the optical receiver assembly outputs the optical beacon information to an augmented reality device, the augmented reality device presenting one or more aspects of the optical beacon information in an augmented reality presentation displayed to a user of the augmented reality device.

16. The multi-channel adaptive communications focal plane array of claim 15, wherein all of the plurality of switching circuits except one or more of the plurality of switching circuits operatively connected to the one or more of the plurality of optical detectors receiving the optical beam are suppressed by being maintained in a disabled state until the optical beacon information has been extracted from the optical beam.

17. The multi-channel adaptive communications focal plane array of claim 16, wherein another one or more of the plurality of switching circuits operatively connected to another one or more of the plurality of optical detectors receiving another optical beam are enabled while outputs from all of the remaining plurality of switching circuits are suppressed by the remaining plurality of switching circuits being maintained in the disabled state until optical beacon information embedded in the other optical beam has been extracted.

18. The multi-channel adaptive communications focal plane array of claim 1, wherein the optical beam comprises an optical beacon and an optical signal.

19. The multi-channel adaptive communications focal plane array of claim 18, wherein one or more of the plurality of optical detectors, one or more of the plurality of signal discrimination circuits, and one or more of the plurality of switching circuits process the optical beam to extract optical signal information embedded in the optical beam and output it to one of a plurality of output channels of the multi-channel adaptive communications focal plane array upon selection of an augmented reality representation of the optical beacon, and wherein control electronics perform a re-centering procedure periodically during the extraction to re-center a focal area from which the optical signal is being extracted based upon recent signal-to-noise ratio estimates.

20. The multi-channel adaptive communications focal plane array of claim 19, wherein ones of the plurality of switching circuits having corresponding ones of the plurality of optical detectors that are not receiving the optical beam are operationally suppressed during the extraction of the optical signal information.

21. The multi-channel adaptive communications focal plane array of claim 1, wherein analog signals representative of the optical beam output from one or more of the plurality of switching circuits via a subsequently ordered analog output port of each of the one or more of the plurality of switching circuits are combined to create a single analog output in a corresponding channel representative of the optical beam output, wherein the subsequently ordered analog output ports correspond to a total number of channels of the multi-channel adaptive communications focal plane array.

22. The multi-channel adaptive communications focal plane array of claim 21, further comprising digital-signal converters, the total number of which corresponds to the total number of channels of the multi-channel adaptive communications focal plane array, adapted to convert the combined analog signals representative of the optical beam in each of the channels into digital signals representative of the optical beam.

23. The multi-channel adaptive communications focal plane array of claim 22, wherein each of the digital-signal converters transmits the digital signals in each of the channels to an optical receiver assembly.

24. The multi-channel adaptive communications focal plane array of claim 23, wherein optical signal information is simultaneously extracted from two or more different optical beams and simultaneously output via two or more channels.

\* \* \* \* \*